United States Patent [19]
Jones et al.

[11] Patent Number: 5,543,475
[45] Date of Patent: Aug. 6, 1996

[54] COMPOUNDS WITH LIQUID CRYSTALLINE PROPERTIES AND COATING BINDERS BASED THEREON

[75] Inventors: Frank N. Jones, Ann Arbor, Mich.; Cong Du, Shanghai, China; Ganghui Teng, Fargo, N. Dak.; Adel F. Dimian, Hudson, Wis.; Daozhang Wang, Shanghai, China

[73] Assignee: North Dakota State University, Fargo, N. Dak.

[21] Appl. No.: 117,146

[22] PCT Filed: Mar. 18, 1992

[86] PCT No.: PCT/US92/02155

§ 371 Date: Sep. 13, 1993

§ 102(e) Date: Sep. 13, 1993

[87] PCT Pub. No.: WO92/16588

PCT Pub. Date: Oct. 1, 1992

Related U.S. Application Data

[63] Continuation-in-part of Ser. No. 672,537, Mar. 20, 1991, abandoned.

[51] Int. Cl.$^6$ .................................................. C08L 67/02
[52] U.S. Cl. .......................... 525/444; 525/437; 525/438; 525/440; 525/443; 528/176; 528/190; 528/297; 528/298; 528/308; 528/308.6; 528/288
[58] Field of Search ....................... 525/437, 444, 525/438, 440, 443; 528/297, 298, 308, 308.1, 308.6, 288, 176, 190

[56] References Cited

U.S. PATENT DOCUMENTS

| | | | |
|---|---|---|---|
| 2,465,319 | 3/1949 | Whinfield et al. | 260/75 |
| 2,589,688 | 3/1952 | Flory et al. | 260/75 |
| 2,600,376 | 6/1953 | Caldwell | 260/47 |
| 2,755,273 | 7/1956 | Bock et al. | 260/47 |
| 2,863,855 | 12/1958 | Wilson et al. | 260/75 |
| 3,052,653 | 9/1962 | Iannicelli | 260/75 |
| 3,185,668 | 5/1965 | Meyer et al. | 260/75 |
| 3,418,276 | 12/1968 | Izard | 260/47 |
| 3,476,697 | 11/1969 | Clements et al. | 260/22 |
| 3,551,380 | 12/1970 | Kobayashi et al. | 260/45.7 |
| 3,646,108 | 2/1972 | Jones et al. | 260/473 G |
| 3,650,999 | 3/1972 | Martins et al. | 260/22 D |
| 3,652,502 | 3/1972 | Jackson, Jr. et al. | 260/75 R |
| 3,772,064 | 11/1973 | Mendelsohn et al. | 117/22 P |
| 3,787,370 | 1/1974 | Shima et al. | 260/75 R |
| 3,804,805 | 4/1974 | Kuhfuss et al. | 260/47 C |
| 3,804,920 | 4/1974 | Cunningham et al. | |
| 3,836,491 | 9/1974 | Taft et al. | 260/22 TN |
| 3,836,574 | 9/1974 | Achsel et al. | 260/475 P |
| 3,857,817 | 12/1974 | Henshaw et al. | |
| 3,869,427 | 3/1975 | Meschke et al. | |
| 3,926,920 | 12/1975 | Georgoudis et al. | 260/75 R |
| 3,932,326 | 1/1976 | Hoh et al. | 260/26 |
| 3,954,900 | 5/1976 | Schmalz et al. | 260/850 |
| 3,991,034 | 11/1976 | Takeo et al. | 260/75 NK |
| 3,994,851 | 11/1976 | Chang. | |

(List continued on next page.)

FOREIGN PATENT DOCUMENTS

| | | |
|---|---|---|
| 014808 | 9/1980 | European Pat. Off. . |
| 086309 | 8/1983 | European Pat. Off. . |
| 0138768 | 4/1985 | European Pat. Off. .......... G03F 7/10 |
| 0252358 | 7/1986 | European Pat. Off. ...... C07D 303/24 |
| 1252359 | 1/1988 | European Pat. Off. . |
| 0252357 | 1/1988 | European Pat. Off. ........ C07C 69/88 |
| 394589 | 10/1990 | European Pat. Off. . |
| 0419088 | 3/1991 | European Pat. Off. . |
| 3622613 | 1/1988 | Germany . |
| 51-44130 | 4/1976 | Japan .............. C09D 3/64 |
| 51-56839 | 5/1976 | Japan .............. C09D 5/00 |
| 52-73929 | 6/1977 | Japan .............. C09D 3/66 |
| 56-5275 | 2/1981 | Japan .............. C09D 5/00 |
| 1378480 | 12/1974 | United Kingdom ........... C08G 17/12 |

OTHER PUBLICATIONS

Aharoni, Shaul M., "Hydrogen–Bonded Highly Regular Strictly Alternating Aliphatic–Aromatic Liquid–Crystalline Poly (ester amides)," Macromolecules, vol. 21, No. 7, 1941–1957 (1988).

Aviram, "Crosslinking of Lyotropic Liquid Crystals in Magnetic Fields," Polymer Letters Edition, 14, 757–760, John Wiley & Sons, Inc. (1976).

Batzer et al., "Struktur und Eigenschaften segmentierter Polyetherester, 3$^{a)}$ Syntheses definiereter Oligomerer des Polybutylene–terephthalats," Makromol. Chem., 181, 301–323 (1980).

Berry, "Alkyd resin modifiers," Chemical Abstracts 3766y, vol. 67, 368 (1967).

Blumstein et al., "Oriented Polymer Growth in Thermotropic Mesophases," Oriented Polymer Growth in Thermotropic Mesophases, 8, 1, 73–76, Jan.–Feb. (1975).

Brostow et al., "Transmission of Mechanical Energy Through Polymeric Liquid Crystals and Their Blends," Polymer Engineering and Science, 28,12, 785–796 (1988).

Browstow, "Polymer Liquid Crystals and Their Blends," Kunststoffe German Plastice 78 (1988) 5, pp. 15–20 (Translated from Kunststoffe 78 (1988) 5, pp. 411–419.

Chen and Jones, "Graft Copolymers of para–Hydroxybenzoic Acid (PHB). I. A General Method for Grafting Mesogenic Oligo–PHB to Oligomers," Journal of Polymer Science: Part A: Polymer Chemistry, 25, 1109–1125, John Wiley & Sons, Inc. (1987).

Chen and Jones, "Liquid Crystalline Acrylic Copolymers as Binders for Non–Bake Coatings," Polym. Mater. Sci. Eng., 57, 217–221 (1987).

(List continued on next page.)

*Primary Examiner*—Patricia A. Short
*Attorney, Agent, or Firm*—Fitch, Even, Tabin & Flannery

[57] ABSTRACT

Polymeric vehicles with liquid crystalline-like properties, solvent dispersible polymeric vehicles, formulated coating compositions with liquid crystalline-like properties and a method for imparting liquid crystalline properties to a coating binder are described. The materials with liquid crystalline-like properties lack structural segments previously regarded as mesogenic.

37 Claims, No Drawings

U.S. PATENT DOCUMENTS

| | | | |
|---|---|---|---|
| 4,012,363 | 3/1977 | Bruning et al. | 260/75 R |
| 4,045,399 | 8/1977 | Suzuki et al. | 260/29.6 N |
| 4,054,681 | 10/1977 | Bruning et al. | 427/27 |
| 4,060,516 | 11/1977 | Kuratsuji et al. | 260/75 T |
| 4,072,662 | 2/1978 | van der Linde et al. | 260/47 C |
| 4,075,173 | 2/1978 | Maruyama et al. | 260/47 C |
| 4,094,721 | 6/1978 | Sturm et al. | 156/309 |
| 4,104,240 | 8/1978 | Buter | 260/39 P |
| 4,130,549 | 12/1978 | Ueno et al. | 528/93 |
| 4,223,125 | 9/1980 | Bier et al. | 528/305 |
| 4,261,873 | 4/1981 | Lagarus et al. | 260/29.2 E |
| 4,267,239 | 5/1981 | Thankachan et al. | 428/425.1 |
| 4,267,304 | 5/1981 | Feasey et al. | 528/193 |
| 4,271,062 | 6/1981 | Boomgaard et al. | 260/39 P |
| 4,331,782 | 5/1982 | Linden | 525/173 |
| 4,335,188 | 6/1982 | Igi et al. | 428/458 |
| 4,338,412 | 7/1982 | von Bonin | 521/157 |
| 4,340,519 | 7/1982 | Kotera et al. | 523/414 |
| 4,352,924 | 10/1982 | Wooten et al. | 528/302 |
| 4,387,214 | 6/1983 | Passmore et al. | 528/296 |
| 4,398,022 | 8/1983 | Sublett | 528/302 |
| 4,401,805 | 8/1983 | Weemes et al. | 528/302 |
| 4,419,507 | 12/1983 | Sublett | 528/302 |
| 4,435,546 | 3/1984 | Bier et al. | 525/418 |
| 4,436,896 | 3/1984 | Okamoto et al. | 156/332 |
| 4,439,586 | 3/1984 | Kawakami et al. | 525/169 |
| 4,442,270 | 4/1984 | Passmore et al. | 525/440 |
| 4,446,302 | 5/1984 | Sandhu et al. | 528/302 |
| 4,465,815 | 8/1984 | Chattha | 525/443 |
| 4,522,971 | 6/1985 | DeBergalis | 524/547 |
| 4,552,814 | 11/1985 | Cavitt et al. | 428/414 |
| 4,554,343 | 11/1985 | Jackson, Jr. et al. | 528/274 |
| 4,560,741 | 12/1985 | Davis et al. | 528/302 |
| 4,585,854 | 4/1986 | Tung et al. | 528/295 |
| 4,600,768 | 7/1986 | Jackson, Jr. et al. | 528/308 |
| 4,609,691 | 9/1986 | Geist et al. | 523/414 |
| 4,617,371 | 10/1986 | Blumstein et al. | 528/194 |
| 4,643,937 | 2/1987 | Dickinson et al. | 428/215 |
| 4,652,591 | 3/1987 | Londrigan | 521/172 |
| 4,659,763 | 4/1987 | Gallucci et al. | 524/358 |
| 4,665,150 | 5/1987 | Tesch et al. | 528/98 |
| 4,689,424 | 8/1987 | Shalaby et al. | 560/61 |
| 4,694,061 | 9/1987 | Pfeifer | 528/125 |
| 4,698,397 | 10/1987 | Toya et al. | 525/125 |
| 4,701,477 | 10/1987 | Altenberg et al. | 521/167 |
| 4,713,196 | 12/1987 | Praefcke et al. | 252/299.1 |
| 4,725,664 | 2/1988 | Halmess et al. | 528/176 |
| 4,728,718 | 3/1988 | Morris et al. | 528/306 |
| 4,745,135 | 5/1988 | Thomas et al. | 521/114 |
| 4,745,137 | 5/1988 | Thomas et al. | 521/137 |
| 4,758,616 | 7/1988 | Okano et al. | 524/399 |
| 4,762,901 | 8/1988 | Dhein et al. | 528/73 |
| 4,764,581 | 8/1988 | Muller et al. | 528/100 |
| 4,767,830 | 8/1988 | Kageyama et al. | 525/450 |
| 4,782,132 | 11/1988 | Nozawa et al. | 528/193 |
| 4,785,074 | 11/1988 | Pfeifer | 528/353 |
| 4,798,883 | 1/1989 | Tung et al. | 528/272 |
| 4,814,426 | 3/1989 | Utsumi et al. | 528/272 |
| 4,835,247 | 5/1989 | Wilson et al. | 528/272 |
| 4,855,484 | 8/1989 | Muller et al. | 560/72 |
| 4,859,760 | 8/1989 | Light, Jr. et al. | 528/45 |
| 4,861,860 | 8/1989 | Ohishi et al. | 528/272 |
| 4,868,230 | 9/1989 | Rao et al. | 523/403 |
| 4,877,858 | 10/1989 | Hachiya et al. | 528/100 |
| 4,892,912 | 1/1990 | Hayashi et al. | 525/437 |
| 4,892,926 | 1/1990 | Suenaga et al. | 528/305 |
| 4,922,022 | 5/1990 | Calbo, Jr. et al. | |
| 4,973,646 | 11/1990 | Witzeman et al. | 428/45 |
| 5,025,061 | 6/1991 | Ishidoya et al. | |
| 5,028,682 | 7/1991 | Witzeman et al. | 528/45 |
| 5,166,289 | 11/1992 | Yezrielev et al. | |
| 5,210,155 | 5/1993 | Yezrielev et al. | |

OTHER PUBLICATIONS

Chen and Jones, "Binders for Higher–Solids Coatings Part III: Model Alkyd Resins Modified by Liquid Crystalline Groups," Journal of Coatings Technology, 60, 756, 39–45 (1988). Presented at the 65th Annual Meeting of the Federation of Societies for Coatings Technology, In Dallas, TX, on Oct. 6, 1987.

Cowie and Wu, "Thermotropic Liquid Crystalline Main–Chain Polyesters Containing Cyclooctyl Units. 4. Influence of the Methylene Spacer Length on the Nature of the Mesophase," Macromolecules, 21, 2865–2869 (1988).

Dimian and Jones, "Model Crosslinkable Liquid Crystal Oligoester Diols as Coatings Binders," Polymer. Mater. Sci. Eng., 56, 640–644 (1987).

Fornasier et al., "The Synthesis and Characterization of a New Class of Liquid Crystals based on Bis–triazinic Compounds," Liquid Crystals, 8, 6, 787–796 (1990).

Hässlin et al., "Struktur und Eigenschaften Segmentierter Polyetherester, $3^{a)}$ Synthese Definierter Oligomerer des Polybutylene–terephthalats," Makromol. Chem., 181, 301–323 (1980).

Hobbs et al., "Multiple melting in poly(butylene terephthalate)," Polymer, 16, 462–464 (1975).

Jones et al. "Liquid Crystalline Three–Dimensional Crosslinked Networks," Proceeding of the First Meeting of the European Polymer Federation at Lyon, France, Sep. 1987.

Lembicz and Slonecki, "Soft–segment crystallization and properties of copoly(ether–ester) elastomers," Makromol. Chem., 191, 1163–1373 (1990).

Mardyama et al. "Resin Powder Coating Compositions," Chem. Abst. 133572y, vol. 83, 1975.

Molyneux, *Water–Soluble Synthetic Polymers: Properties and Behavior*, pp. 1–2, vol. II, CRC Press, Inc.

Muizebelt et al., "Permeabilities of Model Coatings: Effect of Crosslink Density and Polarity," pp. 110–114, Polymeric Materials for Corrosion Control © 1986 American Chemical Society.

Muizebelt et al., "Permeabilities of Model Coatings. Effect of Crosslink Density and Polarity," pp. 454–456.

Nogami et al., "Polyester Resin Powder Coating Compositions," Chem. Abst. 79835n, vol. 85, 1978.

Nogami et al., "Polyester Powder Coating Compositions," Chem. Abst. 8624u, vol. 88, 1978.

Ober et al., "Liquid Crystal Polymers with Flexible Spacers in the Main Chain," Advances in Polymer Science, 59, Springer–Verlag Berlin Heidelberg, 104–121 (1984).

Percec and Puch, "3 Molecular Engineering of Predominantly Hydrocarbon–Based LCPs," *Side Chain Liquid Crystal Polymers*, pp. 30–43, Chapman and Hall, 1989.

Percec and Tsuda, "Liquid Crystalline Polyethers Based on Conformational Isomerism. 10. Synthesis and Determination of the Virtual Mesophases of Polyethers Based on 1–(4–Hydroxyphenyl)–2–(2–methyl–4–hydroxphenyl)ethane and α,w–Dibromoalkanes containing from 17 to 20 Methylene Units," Macromolecules, 23, 3509–3520 (1990).

Schroeder et al. "Liquid Crystals, 6 Mesomorphic Phenols and Primary Amines. p–Phenylene Dibenzoates with Terminal Hydroxy and Amine Groups," J. of Org. Chem. 41, 2566–2571 (1976).

Sun et al., "Crystal Lattice Deformation and the Mesophase in Poly(ethylene terephthalate) Uniaxially Drawn by Solid-State Coextrusion," Polymer, vol. 29, 2115–2120 (1988).

Wang and Jones, "Synthesis of Crosslinkable Liquid-Crystalline Oligoester Diols by Direct Esterification; Use in Coatings Binders," Polym. Mater. Sci. Eng. 56, 645–649 (1987).

Zentel and Reckert, "Liquid Crystalline Elastomers based on Liquid Crystalline Side Group, Main Chain and combined Polymers[a]," Makromol. Chem. 187, 1915–1926 (1986) ([a] Presented in part at the: 2nd Macromolecular Symposium, BRD–USSR, 30.9.–4.10.1985, Mainz, West Germany).

COMPOUNDS WITH LIQUID CRYSTALLINE PROPERTIES AND COATING BINDERS BASED THEREON

This application is a 371 of PCT/US92/02155, filed Mar. 18, 1992, which is a continuation-in-part of application Ser. No. 07/672,537, filed Mar. 20, 1991, now abandoned.

This application relates to compounds with liquid crystalline (LC)-like properties and polymeric vehicles for coatings binders which include such LC-like compounds. More particularly, this application relates to compounds with LC-like properties wherein parts or sections of the compounds lack structural segments previously regarded as mesogenic. The structural segments of the compounds of the invention, however, provide certain properties that are similar to mesophases, but surprisingly these structures have heretofore not been identified as mesogens.

BACKGROUND

The properties of liquid crystalline (LC)-polymers differ from those of amorphous or crystalline polymers in ways that often have commercial value. Heretofore, the term "mesomorphous" has been synonymous with "liquid crystalline". LC polymers are known to form mesophases having order intermediate between crystalline polymers and amorphous polymers. See Flory, P. J., *Advances in Polymer Science, Liquid Crystal Polymers I;* Springer-Verlag; New York (1984) Volume 59; Schwarz, J. Mackromol, Chem. Rapid Commun. (1986) 7, 21. Further, mesophases are well known to impart strength, toughness and thermal stability to plastics and fibers as described by Kwolek et al. in *Macromolecules* (1977) 10, 1390; and by Dobb et al., *Advances in Polymer Science, Liquid Crystal Polymers II/III* (1986) 255(4), 179. Very recently it has been recognized that polymeric networks made by cross-linking LC polymers and oligomers also have greatly enhanced properties.

Because of their inherent scientific interest and of their many actual and potential commercial applications, LC polymers have been extensively studied. Many published studies have focused on identifying and classifying the kinds of chemical structures that are associated with liquid crystallinity in polymers. These studies have led to formulation of a principle, which has been generally accepted: that liquid crystallinity in polymers is invariably associated with the presence of "mesogenic groups". Mesogenic groups are chemical structures within the polymer which are capable, in certain circumstances, of imparting liquid crystallinity. Lengthy review articles cataloging and classifying mesogenic groups have been written. Most commonly, mesogenic groups are chemical structures that contain a rigid sequence of at least two aromatic rings connected in the para position by a covalent bond or by rigid or semi-rigid chemical linkages. Optionally, one of the rigid aromatic rings may be naphthalenic rings linked at the 1,5- or 2,6- positions. Of several broad classes of mesogenic groups, the most common contains two or more 1,4-arylene (or, less commonly, 1,4-trans-cyclohexenyl) rings covalently connected by rigid or semi-rigid linkages which include but are not limited to

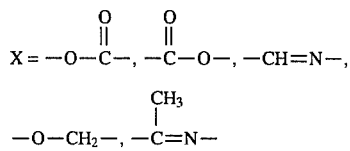

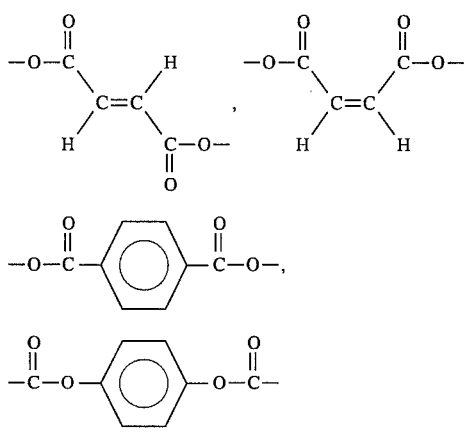

and various mesogens described in Ober et al., *Liquid Crystal Polymers with Flexible Spacers in the Main Chain, Advances in Polymer Science* 59, 104 at 105–117 which is incorporated by reference herein.

Until recently the study of LC polymers as potential coatings binders has received little attention. Chen et al., *J. Coat. Technol.* 1988, Vol. 60 (756), p. 39 prepared alkyd resins with mesogenic poly p-hydroxybenzoic (PHBA) acid segments (a common LC monomer) pendant to the polymer backbone. Improved dry times and film properties were observed for the alkyds. Chen et al., *J. Appl. Polym. Sci.* 1988, Vol. 36, p. 141 also prepared LC acrylic polymers with pendant poly PHBA groups that gave excellent lacquer and enamel properties. Wang et al., *Polym. Mater. Sci. Eng.* 1987, 56, 645, prepared oligoester diols which were end-capped with PHBA units. Cross-linked enamels were prepared that displayed excellent properties. Dimian et al., *Polym. Mater. Sci. Eng.* 1987, 56, 640, synthesized LC oligomer diols based on the mesogen 4,4'-terephthaloy-dioxydibenzoyl chloride. The LC diols were cross-linked to give enamels with excellent properties.

Japanese patents have claimed that PHBA enhances the properties of polyester powder coatings; Japanese Kokai 75/40, 629 (1975) to Maruyama et al.; Japanese Kokai 76/56/839 (1976) to Nakamura et al.; Japanese Kokai 76/44, 130 (1976) to Nogami et al.; and Japanese Kokai 77/73,929 (1977) to Nogami et al.

In classifying "mesogenic groups" one also, overtly or by implication, classifies other groups as "non-mesogenic". Such groups are chemical structures that are outside the boundaries of the various types of mesogenic groups. They are generally considered incapable of imparting liquid crystallinity under any circumstances. Two types of non-mesogenic groups are of particular interest: (1) single 1,4-arylene units that are connected to other aromatic rings in the polymer structure by flexible rather than rigid or semi-rigid linkages and (2) 1,3-arylene rings connected in any way. Examples type of (1) and groups derived from terephthalic acid, hydroquinone and 4-hydroxybenzoic acid are:

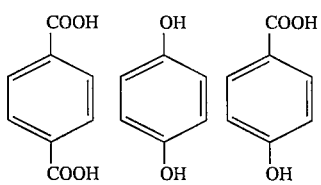

Examples of non-mesogenic groups of type (2) are those derived from isophthalic acid, resorcinol and 3-hydroxybenzoic acid:

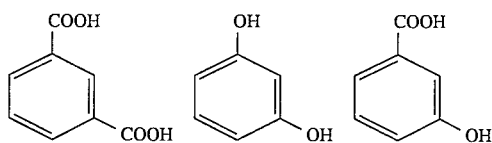

In a recent publication [Kricheldor, Pakull and Buchner, *Macromolecules,* 21, 1929–1935 (1988)] it was reported that a polymer containing two electronically different aromatic non-mesogenic groups is "liquid crystalline". The structure of this polymer is:

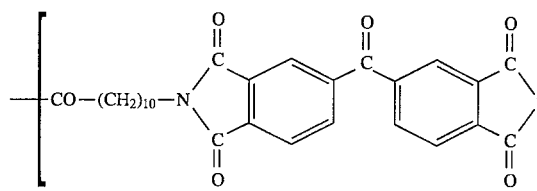

Krichedor et al. considered their finding very surprising. They explained the formation of liquid crystallinity by postulating a "special co-operative effect, presumably a charge-transfer interaction, between the aromatic monomer units." They stated " . . . the mesophase of 4e (the above Formula 1) is formed despite the absence of mesogenic groups. Obviously, special interaction between the bisphenol and the benzophenone imide unit is responsible for the observed smectic phases. This interaction is most likely a weak charge-transfer (CT) complexation." It was taken as a given that the isolated bisphenol unit is not a mesogenic group which may be a matter of semantics when the resulting compound exhibits LC-like properties. Indeed, semantically because the resulting compounds have LC-like properties certain linkages or parts of the compounds may be considered mesogens or mesogenic.

In another publication [Bilibin, et al. *Makromol. Chem., Rapid Commun.* 6, 209–213 (1985)] it was reported that chemical compounds of the structure

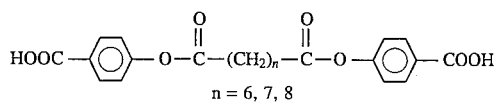

n = 6, 7, 8

" . . . exhibit monotropic mesomorphism. This can be accounted for by intermolecular hydrogen bonding as in the case of the 4-alkoxybenzoic acid melt." Also see Fornasier et al. Liquid Crystals 8, 787–796 (1990).

It is an object of this invention to provide polymeric vehicles for coatings binders which have LC-like properties.

It is another object of this invention to provide a method of imparting LC-like properties to coatings binders.

It is still another object of this invention to provide solvent dispersible polymeric vehicles for coatings binders which have LC-like properties.

It is yet another object of the invention to provide a method which provides polymeric vehicles with new thixotropic and anti-sagging properties.

Still further objects and advantages of the invention will be found by reference to the following description.

SUMMARY OF THE INVENTION

In this invention new polymeric vehicles with LC-like properties, solvent dispersible polymeric vehicles and formulated coating compositions with LC-like properties and a method for imparting liquid crystal-like properties to a coating binder and a method for providing a polymeric vehicle with thixotropic and anti-sagging properties have been discovered. The method and new polymeric vehicles of the invention provide coating binders with LC-like properties; and as a result, the method and polymeric vehicle of the invention provide coating binders and coatings with improved properties including hardness and impact resistance heretofore generally associated with known mesogenic groups and known LC polymers in the polymeric vehicle.

When applied to a substrate, some of the polymeric vehicles of the invention having LC-like properties, provide coating binders having a pencil hardness of at least about 3H and a reverse impact resistance of at least about 60 inch-lbs. at a binder thickness of about 1 mil. In one aspect of the invention, the polymeric vehicle comprises a dispersible polyester having the general Formula I shown below or dispersible adducts of the polyester having the general formula shown below:

HO-V-Al'-(W-Ar-X-Al-Y)$_{\overline{m}}$-Ar'-Z-OH     I wherein

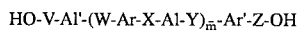

or a covalent bond;

Al'=$(CH_2)_n$ or a covalent bond;

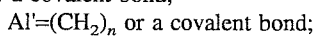

or a covalent bond;

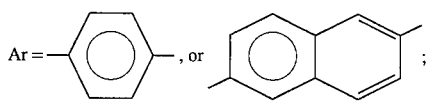

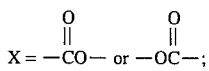

Al = $(CH_2)_n$;

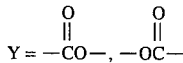

or a covalent bond, but if

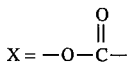

and if V=bond, and if Al'=bond, and if W=bond and if Z=bond, then

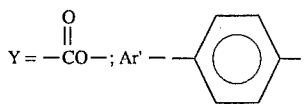

or a covalent bond; and

or a covalent bond wherein $\overline{m}=1$ to 20, but when V=bond, Al'=bond, W=bond and Z=bond, $\overline{m}\geq 2$ n=2 to 20.

As used herein the term "dispersible" means that the polyester of the general formula or the adducts (amine salts or mono-oxirane addition products) of that polyester are dispersible in a medium at 25° C. which medium may also include a dispersant. The medium for the dispersion may be water, organic solvent, cross-linking agent, reactive diluent and may be or include the adducts of the polyester of general Formula I. The adducts of the polyester of Formula I also may act as a dispersant as well as serve as the medium. While the term "polyester" is used in connection with the compounds of the general formula, the compounds defined by the above general formula have molecular weights of less than about 10,000, and as a result, are oligomers.

In another aspect of the invention, the polymeric vehicle of the invention comprises adducts of the hydroxyl or carboxyl terminated polyester with the above general formula and a cross-linking agent in an amount effective for cross-linking the polyester to provide the coating binder. Many of polyesters which form part of the polymeric vehicle of the invention are not dispersible in solvents commonly used in connection with coatings. When there is a predominately aqueous media, to achieve solvent dispersibility, polymers which form a part of the polymeric vehicle of the invention are made water reducible by converting the polymers into salts (such as amine salts) by reacting a base (such as an amine) with the polyesters having acid functionality. In this aspect of the invention, a polyester having the above general formula which is a diol is converted into a diacid, tri or tetracid with a polyfunctional acid or anhydride thereof having from 4 to 20 carbon atoms. This conversion provides a carboxylated polyester or a partly carboxylated polyester where all of the hydroxy groups on the polyester have not been reacted with an acid or anhydride. In this aspect of the invention, the polyester of the general formula is reacted with at least about 10 percent and preferably 25 percent of the stoichiometric amount of acid or anhydride required to carboxylate all of the hydroxyls of the diol polyester of general formula to provide a carboxylated polyester. When the carboxylated polyester is combined with a base, such as an amine, it forms a water dispersible salt. This provides water dispersibility of the polyester and polymeric vehicle of the invention. Preferably the base has a boiling point of less than about 200° C.

In another aspect of the invention, dispersibility of the polymeric vehicle of the invention in organic solvents is effected (1) by grafting a mono-oxirane having not more than 25 carbon atoms onto the polyester of the above general formula to provide a modified polyester which is dispersible in organic solvents in a non-aqueous media or (2) by dispersing the polyester of the above general formula in a reactive diluent in combination with the organic solvent. Broadly the reactive diluent is a hydrocarbon organic liquid having from about 2 to about 5, preferably 2, functional groups such as carboxyl and hydroxyl, preferably hydroxyl. Through its functional groups, the reactive diluent is capable of reacting with the cross-linking agents described herein (preferably an aminoplast or polyisocyanate) and has a viscosity at 25° C. of from about 0.5 Pa.s to about 25 Pa.s. By way of example, the reactive diluents may be a reaction product of (1) an aromatic hydroxy acid or diacid such as terephthalic acid, para hydroxy benzoic acid or 2,6-naphthalenic acid with a mono-oxirane having not more than 25 carbon atoms such as the oxiranes described in connection with making a modified polyester by grafting a mono-oxirane thereon or (2) is the reaction product of a straight chain aliphatic diacid having 4 to 14 carbon atoms with the cyclohexyl diol 1,4-dimethylol cyclohexane which has the structure

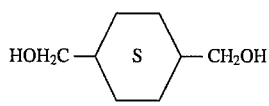

or is the reaction product of 1,6-cyclohexane dicarboxylic acid with a straight chain diol having 4 to 14 carbon atoms.

In the aspect of the invention which includes grafting the mono-oxirane onto the polyester to provide a modified polyester, the modified polyester is the reaction product of the mono-oxirane, the mono-oxirane being in an amount effective for making the polyester dispersible in an organic solvent. In this aspect of the invention, if the polyester of the general formula is a polyol such as diol, that diol first is reacted with a polyfunctional carboxylic acid or anhydride, having from about 4 to 20 carbon atoms as described above, to carboxylate the diol polyester (and make it a carboxylated polyester) prior to reacting the polyester with the oxirane to graft it onto the polyester. The modified polyester with the oxirane grafted thereon may be dispersed into an organic solvent medium by itself or as a part of a blend of modified polyester and polyester of the general formula. The modified polyester in the blend is in an amount effective for making the blend dispersible in an organic solvent which amount is a function of the solvent and the amount of oxirane grafted onto the polyester. In general for a polyester which has been reacted with a stoichiometric amount of oxirane, the blend of polyester and modified polyester will include at least about 70 weight percent and preferably at least about 80 weight percent modified polyester in dispersions having at least about 50 weight percent polyesters (both modified and unmodified polyester).

In the aspect of the invention which uses the reactive diluent as opposed to the modified polyester, the reactive diluent may be used to disperse carboxylic polyesters without hydroxy groups, but hydroxy polyesters are preferred. In addition to using organic solvents as the media for such dispersion, the reactive diluent may be used as a part of the media or function as a dispersant in such dispersions. Stable nonaqueous dispersions of hydroxy polyesters, such as diol polyesters of the general formula are formed at polyester to diluent ratios of from about 10:1 to about 1:4 and preferably from about 4:1 to about 1:4 at solids levels of from about 40 to about 80 weight percent. These dispersions provide a formulated coating composition which includes the polyester of the general formula, cross-linking agent, reactive diluent, and in and a preferred aspect a second dispersant additional to the reactive diluent and optionally organic solvent as an additional medium. While not intending to be bound by any theory, in the aspect of the invention which includes the reactive diluent with the polymeric vehicle in a nonaqueous media, it is believed that sometimes the reactive diluent associates with both the polyester of the general formula and solvent. This association coupled with the bulky structure of the reactive diluent results in steric stabilization. Additionally, the reactive diluent is di- or polyfunctional which functionality allows cross-linking by polyisocyanate and melamine resins during the curing of the polymeric vehicle into a coating binder.

Without using polyesters with mesogens or groups thought to be mesogenic, the invention also provides a method of imparting liquid crystalline properties to a coating binder with resulting, in certain cases, improved hardness and impact resistance associated with liquid crystalline polymeric vehicles. This method includes mixing a polyester without mesogens or groups which impart L/C properties, a modified polyester or adducts of the polyester of the general formula with a cross-linking agent to provide, in some cases, a polymeric vehicle or a formulated coating composition which will provide a resulting coating binder having a pencil hardness of at least 3H and a reverse impact resistance of at least about 60 inch-lbs. at a binder thickness of about 1 mil.

The invention provides polymeric vehicles and formulated coating compositions with "non Newtonian" viscosities and rheological properties which are well suited for polymeric vehicles for paint coatings. The invention provides compositions which have high viscosities at low shear rates, viscosities of at least about 15 Pa.s at shear rates of not greater than 1,000 $sec^{-1}$ in the temperature range of from about 25° C. to about 60° C., but low viscosities at high shear rates, viscosities of not greater than 5 Pa.s at shear rates of at least about 3,000 $sec^{-1}$ in the temperature range of from about 25° C. to about 60° C. Moreover, the invention provides polymeric vehicles and formulated coating compositions which have a viscosity which increases when the temperature of the polymeric vehicle is raised such as raised above about 25° C. for curing. Such properties are well suited for polymeric vehicles for coating binders for paint. Low viscosities at high shear rates provide a coating composition which can be readily applied by means which provide for high shear rates: spraying, rolling or brushing. Moreover, the invention provides for the design of polymeric vehicles and formulated coating compositions which thicken and increase in viscosity at critical bake or cure temperatures as the polymeric vehicle is heated above 25° C. This avoids oven sagging of the coating composition during curing at temperatures higher than ambient. Oven sagging is a common problem for many enamels due to a dramatic drop in viscosity at higher temperatures. The invention provides a polymeric vehicle which has a viscosity which increases with temperature in certain temperatures ranges until a maximum; as a result, the viscosity is sufficiently high at baking temperatures to minimize sagging.

Besides the latter special viscosity-vs-temperature behavior, the polymeric vehicles of the invention are thixotropic as well as shear thinning and exhibit yield stress below a certain temperature (such as $T_m/T_c$). While thixotropic compositions are not new, the extent of "shear thinning" permitted by the invention in polymeric vehicles of the invention is novel and has not been heretofore observed in polymeric vehicles comprising oligomeric mixtures which are substantially free of polymers having molecular weights greater than about 10,000. The thixotropic and yield-stress properties of the polymeric vehicles of the invention enhance the anti-sagging properties of the formulated coatings of the invention, since they will allow lower viscosity at application conditions (such as brushing, rolling, and spraying) while remaining at a higher viscosity at baking condition (without pre-shearing or at lower shearing force). While higher viscosity during curing is good for anti-sagging, it may lead to poor levelling. Thus, an intermediate viscosity should be chosen for formulated coating compositions in order to obtain both good levelling and sagging resistance. This can be achieved by adjusting the curing temperature or the type and amount of solvent around the viscosity maximum.

The polyester of the invention is the reaction product of an aromatic compound selected from the group consisting of (I) a 1,4-disubstituted benzene which has hydroxyl or carboxylic substitution such as terephthalic acid, hydroquinone, (II) a 2,6-disubstituted naphthalene which has hydroxyl or carboxylic substitution, such as 2,6-dihydroxy- or dicarboxy naphthalene, and (III) mixtures thereof with a linear diacid or diol having 6 to 17 carbons and 4 to 15 methylene groups. The linearity of the acid or diol co-reactant provides flexible spacer groups between aromatic groups; yet, surprisingly, the polymeric vehicle of the invention has LC-like properties.

DESCRIPTION OF THE PREFERRED EMBODIMENTS

The polyesters of Formula I as a part of a dispersible polymeric vehicle, including but not limited to being dispersible in an aqueous or organic solvent media, amino salt adducts thereof, oxirane adducts of the hydroxyl and carboxyl terminated polyester of Formula I and blends according to the invention may be used to make a polymeric vehicle or a formulated coating for a coating binder for improved properties such as would be expected in polymeric vehicles with known mesogenic groups. In certain aspects of the invention, some of the polymeric vehicles of the invention provide coating binders having a pencil hardness at least about 3H and a reverse impact resistance of at least about 60 inch-lbs. at a binder thickness of about 1 mil.

The polymeric vehicle of the invention includes cross-linking agents which react with the polyester of the general Formula I, amine salts thereof or oxirane adducts of carboxyl or hydroxyl terminated polyesters of Formula I to provide a coating binder which has a reverse impact resistance of at least about 60 inch-lbs. and a pencil hardness of at least about 3H. The cross-linking agent has a functionality of two or more, that is, it contains at least two and preferably three or more reactive groups; examples are polycarboxylic acids, polyols, aminoplast resins, polyisocyanate resins such as the trimer of toluenediisocyanate, hexamethylene diisocyanate (HMDI) and a biuret thereof, isophrone diisocyanate (IPDI), isocyanates and mixtures thereof. The aminoplast resin may be a melamine resin, such as hexakis (methyloxymethyl) melamine resin (HMMM). The polyisocyanate resin may be a blocked polyisocyanate resin which is blocked with active hydrogen compounds such as alcohols, phenols, oximes or lactams.

Solvents and known additives such as pigments may be added to the polymeric vehicle to provide a formulated coating composition which is a dispersion. In the aspect of the invention which provides a polymeric vehicle for a coating binder, the coating binder gives a coating film with high hardness, flexibility, and impact resistance heretofore associated only with polymeric vehicles which include known mesogens. After the formulated coating is applied to a base or substrate, solvents (if present) evaporate leaving a solvent-free film. Evaporation and cross-linking may be accelerated by heating, as by baking. An improved film provided by the polymeric vehicle with improved hardness, flexibility and impact resistance, and the coating binder therefor, are a particularly important part of this invention. Moreover, an important aspect of this invention is that the raw materials for the polymeric vehicle are inexpensive and readily available. Since the coating binder primarily provides the desired film characteristics, the properties of the coating binder are particularly described primarily by tests which measure hardness and impact resistance.

Definitions

As used in this application, "polymer" means a polymer with repeating monomeric units as defined by the general formula and includes oligomers as defined herein. "Polyester" means a polymer which has

linkages in the main chain of the polymer. "Oligomer" means a compound that is a polymer, but has a number average weight not greater than about 10,000 with repeating monomeric units. "Adduct of the polyester" means the following chemical addition products of the polyester of the general formula I: (1) the amine salt of acid polyester of general Formula I or of the carboxylated hydroxyl terminated polyester of general Formula I; and (2) a mono-oxirane bonded onto the polyester of the general Formula I or onto the carboxylated hydroxyl terminated polyester of general Formula I. "Cross-linking agent" means a di- or polyfunctional substance containing functional groups that are capable of forming covalent bonds with hydroxyl and carboxyl groups that are present on the polymer; aminoplast and polyisocyanate resins are members of this class; melamine resins are a sub-class of aminoplast resins. "Modified polyester" means a polyester having covalently bound modifying mono-oxirane groups as described herein and the term "grafted" or "grafting" used herein in connection with mono-oxiranes means that such oxiranes are covalently bound to the polyester; that is, the oxirane adduct is made in a process of adding the oxirane to an existing polyester. "Polymeric vehicle" means all polymeric and resinous components in the formulated coating, i.e., before film formation, including but not limited to modified polymers. The polymeric vehicle may include a cross-linking agent and reactive diluent as described herein. "Coating binder" means the polymeric part of the film of the coating after solvent has evaporated and after cross-linking. "Formulated coating" means the polymeric vehicle and solvents, pigments, catalysts and additives which may optionally be added to impart desirable application characteristics to the formulated coating and desirable properties such as opacity and color to the film.

"Solvent" means water and/or an organic solvent.

"Organic solvent" means a liquid which includes but is not limited to carbon and hydrogen which liquid has a boiling point in the range of from about 35° C. to about 300° C. at about one atmosphere pressure.

"VOC" means volatile organic compounds and "low VOC" means about 1 pound per gallon or about 120 grams of volatile organic compounds per liter of formulated coating composition, not including water. "Volatile organic compounds" are defined by the U.S. Environmental Protection Agency as any organic compound which participates in atmospheric photochemical reactions, except for specific designated compounds which have negligible photochemical activity. Water and $CO_2$ are not VOCs. VOCs have been generally designated to include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromoethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylester-sulphuric acid, dimethylbutanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloro ethane, trichloroethene, 2,3-dimethylbutane, tetrachloroethane, dimethyl-3-methylene-bicyclo-heptane, A-pinene, hexachloro-butadiene, methylnaphthalene, naphthalene, quinoline, methylnaphthalene, phenyl-propanone, dimethylbenzene, O-cresol, chloro-methylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzychloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichloro-benzene, trimethyl-pyridine, bromobenzene, methylcyclohexane, toluene, chlorobenzene, phenol, 2-methylpyridine, pentene, 2-pentane, bromo-chloropropane, 1H-pyrrole, tetrahydrofuran, hexane, 1,4-dichlorobutane, cyclohexane, cyclohexene, pyridine, octaine, 1-octene, nonane, dodecane, propene, 2-methyl-1-pentene, 2-methyl-1-propene, isoquinoline, trichlorobenzene, propanal, butanal, 1,4-(dioxane), 1-nonene, decane, dibromochloromethane, 2-chloroburadiene, tetrachloroethene, dimethyl-methylene-bicyclo-heptane, 1,2-diethylbenzene, (1-methylpropyl)-benzene, Acetic Acid ethyl-ester, 1,3-diethylbenzene, cyclopentene, heptane, cis-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethyl-cyclo-pentasil-oxane, 1,3-dichlorobenzene, hexadecane, 2-methylthiophene, 3,3-dimethylpentane, 3-methyl-2-butene, 2-methyl-1-burene, 2,2,3-trimethyl-pentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicyclo-heptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzenamine, dimethylcyclohexane, dichloronitrobenzene, dichloronaphthalene, dimethylcyclopentane, bromoethylbenzene, dichloromethyl-benzene, benzenedicarboxaldehyde, benzoyl nitro peroxide, bromochloropropane, dibromo-chloro-propane, pentachlorobutadiene, dibromochloropropane, 2-butoxyethanol, bromopentachloro ethane, tetradecamethylcycloheptasiloxane, trimethyl-pentanediol, dodeca-methylcyclohexasil-oxane, hexamethylcyclotri-siloxane, octamethylcyclo-tetrasil-oxane, hexadecamethylcyclo-octasil-oxane, tridecane, tetradecane.

A "high solids formulated coating composition" means a nonaqueous formulated coating containing not more than about 400 grams of volatile organic substances per liter of formulated coating composition and preferably less than about 300 grams of VOCs per liter of formulated coating composition. "Film" is formed by application of the formulated coating to a base or substrate, evaporation of solvent, if present, and cross-linking. "Air-dried formulated coating" means a formulated coating that produces a satisfactory film without heating or baking. "Baked formulated coating" means a formulated coating that provides optimum film properties upon heating or baking.

Although many of the polymers and copolymers exhibit LC-like properties, the criteria for liquid crystallinity is varying. The X-ray structure analysis can in certain instances prove liquid crystallinity, but such analysis is costly and the results are sometimes ambiguous. Less costly techniques are widely used to gain evidence for the presence of liquid crystallinity and to study it. The most common are polarizing microscopy, differential scanning calorimetry (DSC), dynamic mechanical-thermal analysis (DMTA), wide angle X-ray scattering (WAXS), and rheological studies.

The quality of evidence of liquid crystallinity obtained from such studies may range from quite convincing to highly questionable in a given instance. Often a single technique, such as polarizing microscopy or DSC, can provide very strong, if not absolutely unchallengeable, evidence that a given polymer is liquid crystalline.

Given the above situation, applicants do not necessarily assert the polymers, polyesters and adducts thereof and polymeric vehicle of the invention are liquid crystalline. They may be, but rather, applicants assert that the polymers, polyesters and adducts thereof and polymeric vehicle of the invention exhibit liquid crystalline-like properties, or alternatively provide a polymeric vehicle with desired hardness and impact resistance. As used herein a composition or polymer exhibits liquid crystalline-like or liquid crystalline properties if at minimum a substantially homogeneous compound or polymer displays first order transitions at two different temperatures by DSC.

Hydroxyl Terminated Polyesters Of The General Formula—Nonaqueous Systems

Broadly in one aspect of the invention, the hydroxyl terminated polyester of Formula I is dispersed in a media such as a mono-oxirane adduct of the polyester of the general Formula I, an organic solvent and cross-linking agent with a dispersant such as a nonionic surfactant or lecithin to provide a formulated coating composition which provides unique coating binders with properties as previously described. The cross-linking agent is required and is in an amount effective for providing the coating binder and the media is in an amount effective for providing the dispersion for a low VOC formulated coating composition. Dispersants may or may not be required to complete or stabilize the dispersions.

In one aspect of the invention using an organic solvent as a part of a low VOC nonaqueous formulated coating composition, the polymeric vehicle of the invention comprises a cross-linking agent together with from about 20 to about 92 weight percent, based upon the weight of the weight of the polymeric vehicle, of an organic solvent dispersible oxirane adduct of a hydroxyl terminated polyester having LC properties and having the general Formula I:

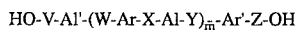                                                                I wherein

or a covalent bond;

Al'=(CH$_2$)$_n$ or a covalent bond;

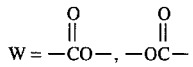

or a covalent bond;

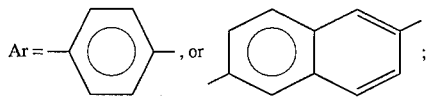

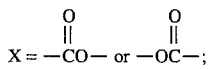

Al = (CH$_2$)$_n$;

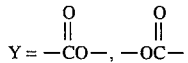

or a covalent bond, but if

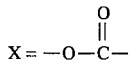

and if V=bond, and if Al'=bond,
and if W=bond and if Z=bond, then

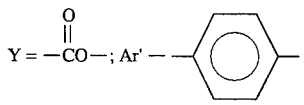

or a covalent bond; and

or a covalent bond wherein $\overline{m}$=1 to 20, but when V=bond, Al'=bond, W=bond and Z=bond, $\overline{m}$≧2 n=2to20.

The above polyester is hydroxyl terminated where

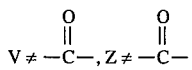

and Al'=(CH$_2$)$_n$ or bond and

Ar' = 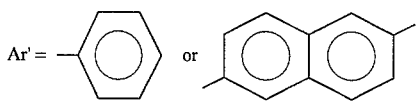 or bond, but if Al'=bond then

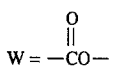

or bond and if Ar=bond then

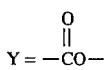

or bond.

The remainder of the polymeric vehicle optionally may comprise other polyesters. Cross-linking agents which may be used in such nonaqueous systems are aminoplasts, amines, regular and blocked di- and polyisocyanates and epoxies.

The hydroxyl terminated polyesters of the above general formula such as

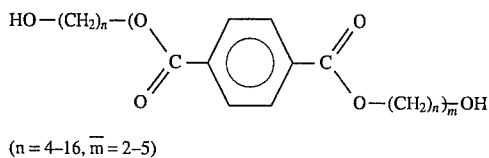

(n = 4–16, m̄ = 2–5)

have low or no dispersibility in most common organic solvents, such as xylene or toluene. According to the invention, however, these hydroxyl terminated polyesters may be modified with a mono-oxirane having not more than 25 carbon atoms to provide an oxirane adduct of the polyester, which modified polyester (or adduct) is dispersible in organic solvents. The polyester modified to the oxirane adduct may be used either alone or as a blend with the polyester of the general formula along with a cross-linking agent to provide a polymeric vehicle which is dispersible such as in an organic solvent. The blend which includes the polyester, modified polyesters and cross-linking agent are particularly important in providing polymeric vehicles which are a part of a high solids formulated coating composition.

In making the oxirane adduct of hydroxyl terminated polyesters, it is preferable to first carboxylate the hydroxyl terminated polyester and then react it with the oxirane as described in other portions of this specification. This is an adduct of the polyester of general Formula I according to the invention.

In another important aspect of the invention, hydroxyl terminated or diol polyesters of the general formula can be part of non-aqueous dispersions including high solids coating dispersions by combining the diol polyester with a reactive diluent. Broadly the reactive diluent is a hydrocarbon organic liquid having from about 2 to about 5, preferably 2, functional groups such as carboxyl and hydroxyl, preferably hydroxyl. Through its functional groups, the reactive diluent is capable of reacting with the cross-linking agents described herein (preferably an aminoplast or polyisocyanate) and has a viscosity at about 25° C. of from about 0.5 Pa.s to about 25 Pa.s. The reactive diluent includes a reaction product of (1) an aromatic hydroxy acid or diacid such as terephthalic acid, para hydroxy benzoic acid or 2,6-naphthalenic acid with a mono-oxirane having not more than 25 carbon atoms such as the oxiranes described in connection with making a modified polyester by grafting a mono-oxirane thereon, or (2) the reaction product of a straight chain aliphatic diacid having 4 to 14 carbon atoms with the cyclohexyl diol 1,4-dimethylol cyclohexane which has the structure

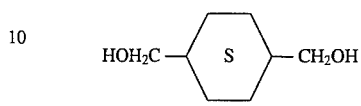

or the reaction product of 1,6 cyclohexane dicarboxylic acid with a straight chain diol having 4 to 14 carbon atoms. In the case of the aromatic acid, the oxirane and the aromatic acid such as terephthalic acid are reacted in stoichiometric amounts with heating and a catalyst such as triphenyl benzyl phosphonium chloride (TPBPC). While not intending to be bound by any theory, mono-oxiranes having bulkier structures such as

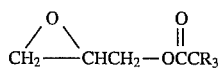

as will be further described herein provide a diluent which appears to stabilize the dispersion through steric stabilization. In this connection a particularly useful diluent is the reaction product of terephthalic acid and a mono-oxirane sold under the name of Glydexx N-10 from Exxon Chemical Company. The reactive diluent also appears to be capable of association with the polyester and solvent for further stabilization. Moreover, the reactive diluent is difunctional which permits it to participate in the cross-linking reaction of the polyester and cross-linking agents such as melamines and polyisocyanates during curing. The dispersions formed with the reactive diluent and diol polyesters of the general formula are stable at solids levels of from about 40 to about 80 weight percent.

Where reactive diluent is used as a part of dispersions according to the invention, polymeric vehicles comprise the hydroxyl terminated polyester of the general formula together with amounts of reactive diluent and cross-linking resins in amounts effective for providing a coating binder having a pencil hardness of at least about 3H and a reverse impact resistance of at least about 60 inch-lbs. at a binder thickness of 1 mil. Generally, where reactive diluent is used the polymeric vehicle will have at least about 10 weight percent and preferably at least about 25 weight percent of the reactive diluent. Dispersants such as lecithin, a nonionic surfactant, or adduct of the polyester of Formula I together with organic solvents also may be added to the formulated coating composition to stabilize the system.

Hydroxyl Terminated Polyesters Of The General Formula—Aqueous Systems.

In yet another aspect of the invention where the polyester is hydroxyl terminated or a diol, that polyester may be made dispersible in an aqueous solvent. To disperse the hydroxyl terminated polyester in an aqueous system, the hydroxyl terminated polyester of the general formula is carboxylated with a polyacid or anhydride, the anhydride being preferred, with a stoichiometric amount or less of the acid or its anhydride. In a particularly important part of this aspect of the invention, from about 10 to about 50 mole percent of the stoichiometric amount (the amount of acid or anhydride that would be required to have one acid or anhydride molecule react with each available hydroxyl on the polyester) of polyacid is particularly effective in providing the carboxylated polyester having an acid value in the range of at least about 30 to provide water dispersibility after the polyester is converted into an amine salt. The polyester may be carboxylated with trimellitic anhydride, phthalic, succinic and maleic anhydrides or polyacids such as adipic and isophthalic acid with trimellitic anhydride being preferred.

In this aspect of the invention, the amine salt of the carboxylated hydroxyl terminated polyester of the general formula will provide a water dispersible polymeric vehicle which comprises a cross-linking resin reactive with the amine salt of the carboxylated polyester. The amine salt comprises from about 20 to about 92 weight percent, based upon the weight of the polymeric vehicle, of the water dispersible amine salt of the carboxylated polyester. The cross-linking agent in the polymeric vehicle is an amount effective for cross-linking the carboxylated polyester to provide a coating binder having a pencil hardness of at least about 3H and a reverse impact resistance of at least about 60 inch-lbs. at a binder thickness of 1 mil. Generally, the cross-linking agent will comprise at least about 10 to about 50 weight percent of the polymeric vehicle. Cross-linking agents which may be used in the aqueous system generally are the same as those used in the aqueous system except that unblocked isocyanates can not be used in the aqueous system and blocked isocyanates can be used only with difficulty in an aqueous system.

Carboxyl Terminated Polyesters Of The General Formula—Aqueous Systems.

In another aspect of the invention the carboxyl terminated polyester of the above general formula permits a water dispersible polymeric vehicle. In this aspect of the invention, the polymeric vehicle comprises a cross-linking agent together with about 20 to about 92 weight percent, based upon the weight of the polymeric vehicle, of an aqueous solvent dispersible polyester which is the amine salt adduct of the acid terminated polyester of the above general formula. This amine salt polyester has LC properties and provides a coating binder having a pencil hardness of at least about 3H and a reverse impact resistance of at least about 60 inch-lbs. at a binder thickness of 1 mil. In this aspect of the invention, the general Formula I defines the acid terminated polyester where V and

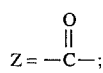

or where V, Ar', Al' and Z all are covalent bond then

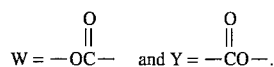

In this aspect of the invention, the remainder of the polymeric vehicle may optionally comprise other water dispersible polyesters or amine salts thereof. As previously stated, cross-linking agents which may be used in this aqueous system are generally the same as those used in the nonaqueous system except that unblocked isocyanates can not be used in an aqueous system and even blocked isocyanates are used only with difficulty in an aqueous system. The cross-linking agent is used in an amount effective for providing the coating binder with the hardness and impact resistance as previously described.

Carboxyl Terminated Polyesters Of The General Formula—Nonaqueous Systems.

Broadly in one aspect of the invention as to the carboxyl terminated polyester of the general Formula I, these polyesters are dispersed in a media such as a mono-oxirane adduct of the polyester of the general Formula I, an organic solvent and cross-linking agent with a dispersant such as lecithin or a nonionic surfactant to provide a formulated coating composition which will give a coating binder with properties as previously described. The cross-linking agent may form part of the media and is in an amount effective for providing the coating binder, and the media is in an amount effective for providing the dispersion for a low VOC formulated coating composition. Dispersants may or may not be required to complete or stabilize the dispersions.

In an important aspect of the invention, to make the acid terminated polyester of the general formula dispersible in many nonaqueous systems, it is reacted with the mono-oxirane having not more than 25 carbon atoms with heating to form a modified polyester which is an oxirane adduct of such polyester. (If the polyester of the general formula is hydroxyl terminated, the carboxylated form thereof, e.g. is made with a polycarboxylic acid or anhydride such as trimellitic, phthalic, succinic and maleic anhydride with trimellitic anhydride. This carboxylated form is reacted with the oxirane to form such adduct.) In connection with general Formulas II and III, set forth infra, the hydroxyl terminated polyesters may be carboxylated to an acid value in the range of from about 5 to about 230. Thereafter the carboxylated polyester is reacted with the mono-oxirane. The oxirane adduct of the acid resin as previously described with nonaqueous systems including the mono-oxirane adduct of the hydroxyl terminated polyesters.

The Mono-Oxirane Adduct Aspect Of The Invention

The invention contemplates dispersions of or which include the mono-oxirane adducts of the polyester of Formula I as formulated coating compositions. The medium for the dispersion may include the mono-oxirane adduct, reactive diluent, cross-linking agent or organic solvents. The mono-oxirane reacted with a carboxyl terminated polyester or the hydroxyl terminated polyester (which is carboxylated prior to reaction with the mono-oxirane) may be propylene oxide, ethylene oxide, butylene oxide, phenylglycidyl ether, butylglycidyl ether, styrene oxide or the glycidyl esters of C-6 to C-22 mono acids. A particularly useful oxirane in the invention is a glycidyl ester of a C-10 oxo acid represented by the general formula

where R represents a mixture of aliphatic groups, the three R groups in the oxirane having a total of 8 carbon atoms. That oxirane is commercially available from Exxon Chemical Company under the name of Glydexx N-10.

The amount of mono-oxirane grafted onto either of the carboxyl or hydroxyl terminated polyester of the general formula will vary from about 0.2 to about 2.0 or more moles of oxirane per mole of polyester, but the amount of mono-oxirane used should be effective for making the polyester of the general formula dispersible such as in non-aqueous organic solvents such as hydrocarbon solvents, aromatic solvents, esters and ketones. In general at 25° C., the modified polyester will comprise at least about 10 mole percent and preferably from about 25 to about 50 mole percent of the oxirane radical bonded onto the polyester. High mole-cular weight aliphatic oxiranes are more efficient dispersing agents in aliphatic solvents. The modified polymer may be designed with the oxirane to disperse in less expensive hydrocarbon solvents which are more likely to effect dispersion of modified polyesters with long chain oxiranes. Long chain oxiranes may adversely affect liquid crystalline or other properties which will cause the use of a shorter chain oxirane and a shift to a stronger solvent such as an aromatic or ketone. The invention contemplates the use of solvent blends and even the use of more than one oxirane to make the modified polymer.

The modified polyester which has mono-oxirane grafted thereon may be a media for a dispersion of the polyesters of general Formula I (as opposed to the adducts thereof) together with cross-linking agent. The modified polyester which has the mono-oxirane grafted thereon also may be dispersed in a nonaqueous solvent media by itself or may be mixed into a blend with an unmodified polyester of the general formula where the amount of modified polyester is effective to disperse all of the polymeric vehicle of the blend into the solvent. For a polyester of the general formula which has been reacted with a stoichiometric amount of mono-oxirane, the blend of polyester and modified polyester will include at least about 70 weight percent and preferably at least about 80 weight percent modified polyester in dispersions having at least about 50 weight percent modified and unmodified polyester.

Blending The Polyesters With Other Resins.

As described above, polyesters of the general Formula I or amine or oxirane adducts of these polyesters may be dispersed with other polyesters or other coating resins such as epoxy resins, e.g. the carboxyl terminated polyester with a poly functional epoxy resin which serves as a cross-linking agent. In the blends which include poly functional epoxy resins, the oxirane adduct will comprise from about 5 to about 20 mole percent of the polymeric vehicle. In organic solvent systems, the oxirane adduct of the polyesters may be dispersed with other resins reactive with such adduct to provide a polymeric vehicle with L/C-like properties. In aqueous solvent systems, the amine salt adduct of the polyesters of the general formula may be blended with other water dispersible resins reactive with such amine salt adduct to provide a polymeric vehicle. In these circumstances, to maintain the liquid crystalline characteristics of the polymeric vehicle, if the other resins are not liquid crystalline, a minimum of about 30 weight percent, and preferably about 50 weight percent of the polymeric vehicle, based upon the weight of the polyester of the general formula or such polyester as a part of any adduct thereof, i.e. the weight in the latter instance would not include the weight of the mono-oxirane portion of the polyester. This will provide a polymeric vehicle which will result in a coating binder with a hardness and impact resistance as previously described.

Specific Important Polyesters As A part Of The Invention

Polyesters having the general Formulas II, III, IV and V are important aspects of the invention as follows.

The oxirane adducts of Formulas II or III or Formulas II or III as part of the previously described reactive diluent are particularly important aspects of the invention.

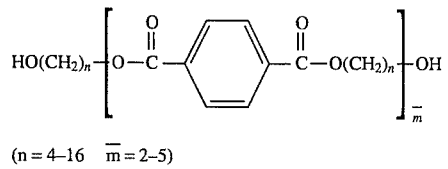

(n = 4–16  $\overline{m}$ = 2–5)

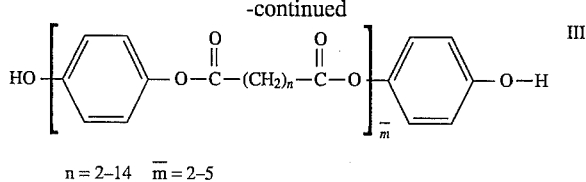

n = 2–14  $\overline{m}$ = 2–5

The amine acid salt and the oxirane adducts of Formulas IV and V are particularly important aspects of the invention where the polyesters are carboxyl terminated.

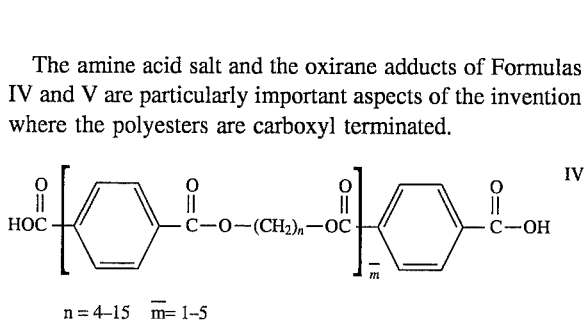

n = 4–15  $\overline{m}$ = 1–5 n = 2–16  $\overline{m}$ = 2–5

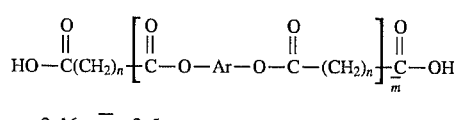

Making The Polyesters Of The Invention

Broadly the polyesters of this invention are 1,4-arylene monomers such as terephthalic acid and hydroquinone, or a 2,6-arylene monomers such as 2,6-dihydroxynaphthalene, which are reacted with a linear and unbranched aliphatic diacid or diol whose functionality will be reactive with the functionality of the arylene monomer. The polyesters of the invention may be made by condensation of a diacid with diol by transesterification such as transesterification of hydroquinone diacetate or 2,6-naphthalene diacetate with an aliphatic diacid. The polyesters of the invention generally are made by the transesterification of a dialkyl terephthalate with straight chain, saturated aliphatic diols; the transesterification of hydroquinone diacetate with straight chain, saturated aliphatic diacids, direct esterification with straight chain saturated aliphatic diacids, esterification of terephalyol chloride with straight chain, unbranched saturated diols, transesterification of 2,6-naphthalene diacetate with straight chain saturated unbranched diols and esterification using dicyclohexyl carbodiimide (DCC), diacid and diol as previously described. The alkyl is a lower alkyl having four or less carbons. In the latter reactions, any acid halide may be used in lieu of an acid chloride and propionate or butyrate (lower alkyls having four or less carbons) may be used in lieu of acetate. In this aspect of the invention, the polyesters may be defined as the reaction product of the a polymeric vehicle wherein the polyester is the reaction product of an arylene monomer selected from the group consisting of

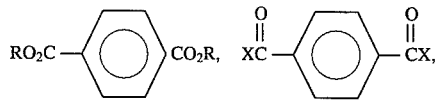

-continued hydroquinone,

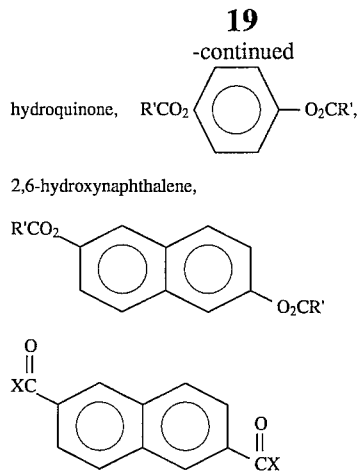

2,6-hydroxynaphthalene, and mixtures thereof and a straight chain saturated aliphatic diol or diacid having 6 to 17 carbon atoms which diol or diacid is reactive with the arylene monomer and wherein R=alkyl having 1 to 4 carbon atoms or H, R'=alkyl having 1 to 4 carbon atoms and X=halogen.

The polyesters of the invention should generally regularly alternate between aromatic substituents and the straight chain unbranched substituents which separate or space the arylene groups. As the spacing between arylene groups increases to increase overall molecular weight, the lower number of repeating units enhances the liquid crystalline like properties of the polyesters which generally will have a number average molecular weight in the range of from about 350 to about 4,000 and preferably from about 400 to about 1800 corresponding to about $\overline{m}$=1 to about 5 when n=6–10 in Formulas II through V. The degree of polymerization or the value of $\overline{m}$ is controlled by the relative proportions of monomers in the reaction. For example a 3:2 mole ratio of monomer approximately yields a polyester where $\overline{m}$=2 for the excess monomer.

Conversion Of The Polyester Of The General Formula To An Amine Salt.

In converting the polyester to the amine salt according to the invention, the polyester with a carboxylic acid functionality, or the hydroxyl terminated polyester which has been carboxylated as previously described, is neutralized with an amine to a pH of about 5.5 to about 11, with about 8 to about 8.5 being preferred, to create an amine neutralized polyester which is dispersible in aqueous media. In reacting the polyester with an amine, the polyester may be dispersed with a small to moderate amount of organic solvent which is miscible with water (e.g., propoxypropanol or ethanol) and neutralizing amine then being mixed with the dispersed polyester to form the amine salt of the polyester. Mixing may be by mild mixing or shearing. Alternatively, an amine, such as a liquid amine may be mixed with the polyester and water to create a dispersion of the amine salt of the polyester. Cross-linking agents used with the amine salts of the polyester in an aqueous media should be stable in water and will commonly be melamines.

The amines which can be used to make the amine salts in the invention include primary, secondary and tertiary alkyl amines and include triethyl amine, $NH_3$, N-ethyl morpholine, methylamine, diethylamine, aminoalcohols, such as ethanolamine, diethanolamine, triethanolamine, N-methylethanolamine, N,N-dimethyl-ethanolamine, 3-aminopropanol and their ethers, such as 3-methoxypropylamine.

Methods For Providing Anti-Sagging Shear Thinning And Thixotropic Properties.

Important aspects of the invention also include a method for providing polymeric vehicles with anti-sagging thixotropic and shear thinning properties and a method of providing polymeric vehicles with these properties.

In one aspect, the invention provides a method for increasing the viscosity of a polymeric vehicle which comprises oligomers and is substantially free of polymers having a number average molecular weight greater than about 10,000. As used herein, "substantially free of polymers" means that the polymeric vehicle prior to curing does not have a number average molecular weight greater than about 2,000 or a weight average molecular weight greater than about 6,000. According to this aspect of the invention, the invention provides a method for increasing the viscosity of a polymeric vehicle when the polymeric vehicle is heated above temperatures most preferably as low as about 25° C. The temperature from which the polymeric vehicle is heated and yet increases in viscosity during such heating preferably may be as low as about 50° C. and may be as low as about 75° C. Generally the viscosity increase will be between the latter temperatures and about 100° C. The method for increasing the viscosity of a polymeric vehicle comprises dispersing the polyester of general Formula I or amine or oxirane adducts of such polyester with a cross-linking agent and a second oligomer to provide a dispersion at about 25° C. which provides a polymeric vehicle with antisagging properties. This addition modifies the oligomeric polymeric vehicle and provides a modified polymeric vehicle comprising an amount of the composition of the general Formula I or adducts thereof in amount effective for providing a modified polymeric vehicle which has a viscosity which will increase as it is heated from about 25° C., about 50° C. or about 75° C.

Generally to practice the method of this aspect of the invention and provide novel polymeric vehicles and formulated coating compositions that are part of this invention, the polymeric vehicle will comprise at least about 30 weight percent of the polyester composition of the general Formula I and/or adducts thereof. The novel formulated coating composition will be a dispersion which includes the polyesters of Formula I and/or the amine salts of such polyesters and/or the oxirane adducts of such polyesters. The polymeric vehicle will further comprise a cross-linker resin, and may also include other polymeric components which have a number average molecular weight not greater than about 10,000 (oligomers). In a very important aspect of the invention, the cross-linker resin and/or other oligomeric components of the polymeric vehicle together with the compound of the general formula provide a low VOC formulated coating composition. Indeed, the formulated coating composition (or polymeric vehicle) may not only be low in VOCs, but may be solventless, to wit: substantially free of organic solvent which is a VOC and/or water. As a formulated coating composition, the solventless formulated coating composition includes catalysts, pigments and other additives. In this connection substantially free of water and/or organic solvent means not more than about 5 weight percent of water or VOCs separately or combined as measured by ASTM test D-1644-59.

The cross-linker agent and the oligomeric components (in addition to the compound of the general formula or adducts thereof) are reactive with each other to provide a resulting coating binder having a pencil hardness of at least 3H and a reverse impact resistance of at least 60 inch-lbs. at a binder thickness of about 1 mil. In this aspect of the invention the cross-linking agent includes any di or polyfunctional substance reactive with the polyester of the general Formula I or its adducts. The cross-linking agent has a number average molecular weight not greater than about 10,000 such substances including aminoplasts, amines regular and blocked, di and polyisocyanates. Oligomeric components which may be used additional to the cross-linking resin, but other than the composition of the general formula include polyesters from cyclohexyldiols such as K-Flex 188 and 128 which are available from King Industries, Norwalk, Conn., K-Flex 128 being the lower molecular weight product. All of the additional oligomeric components have a number average molecular weight of less than about 10,000.

The method of the invention includes dispersing the polyesters of Formula I and/or the adducts thereof with the cross-linking agent to provide a low VOC polymeric vehicle which is a dispersion substantially free of polymers having a number average weight of more than about 10,000. The polymeric vehicle and a formulated coating composition have a viscosity which increases as the temperature of the polymeric vehicle (or formulated coating) is increased from a selected temperature, about 25° C., about 50° C. or about 75° C. This viscosity increase avoids sagging after the polymeric vehicle is applied and heated to cure.

In another aspect the invention also provides a method for increasing the shear thinning of a low VOC polymeric vehicle which also may be a solventless polymeric vehicle (substantially free of water and/or organic solvent as previously defined). The method of increasing the shear thinning of a polymeric vehicle comprises dispersing the polymeric vehicle with the polyester of the general Formula I or adducts thereof. This method provides a high solids, low VOC modified polymeric vehicle comprising the polyesters of the general Formula I or adducts thereof in an amount effective for the increase in shear thinning of the polymeric vehicle. The method of the invention provides a modified polymeric vehicle with a viscosity of not more than about 5 Pa.s at a shear rate of at least about 3,000 sec$^{-1}$ at temperatures in the range of from about 25° C. to about 100° C., preferably not greater than 1.2 Pa.s and most Preferably not greater than 0.02 Pa.s. Most preferably the shear thinning will be at about 25° C., but preferably at about 50° C. or at about 75° C. To achieve the shear thinning as provided by the method, the polymeric vehicle will not require more than about 90 weight percent of the polyesters of general Formula I or adducts thereof (with the remaining amount of polymeric vehicle being about 10 weight percent cross-linking agent), but will comprise at least about 40 weight percent of these polyesters or adducts to not only provide the shear thinning as aforesaid, but also to provide a coating binder having a pencil hardness of at least 3H and a reverse impact resistance of at least 60 inch-lbs. at a binder thickness of 1 mil. In this aspect of the invention, cross-linking resins are any di or polyfunctional substance having a number average molecular weight not greater than about 10,000 and which are reactive with the polyesters of general Formula I or adducts thereof as described above. The oligomeric components which may be in addition to the composition of the general formula include K-Flex 128 and 188.

Combining the methods of shear thinning and increasing viscosity at elevated temperatures provides a truly unique polymeric vehicle, especially in the aspects of the invention which provide a low VOC formulated coating composition or a "solventless" coating composition.

Achieving an increase in viscosity at increasing temperatures without using polymers, especially with polymers with heretofore known mesogens, provides the methods and polymeric vehicles of the invention with an importance and uniqueness heretofore not known in the art pertaining to coating binders for protective paint coatings. Moreover, in view of environmental concerns, this importance is magnified when the invention provides low VOC or "solventless" formulated coating compositions.

The polymeric vehicle according to the invention may be used with formulated coatings which are dried at ambient temperature and baked formulated coatings.

The following examples set forth exemplary methods of making oligomers, polymers and coatings according to the invention.

EXAMPLE I

Transesterification of Hydroquinone diacetate with diacids for preparation of COOH-terminated oligomers.

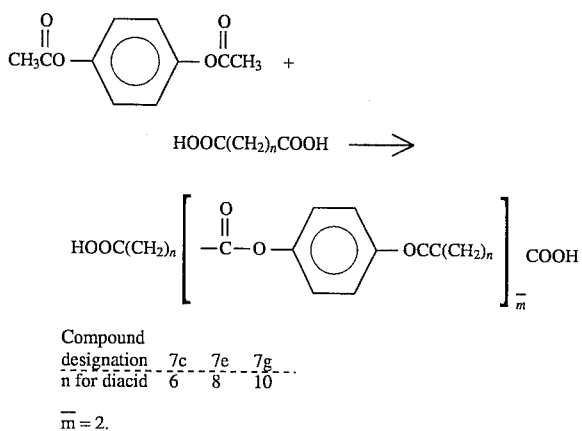

Compound
designation    7c    7e    7g
n for diacid    6    8    10

$\bar{m} = 2$.

Hydroquinone diacetate and a straight chain saturated aliphatic diacid (where n=6, 8 or 10) in a mole ratio of 2:3, zinc acetate dihydrate (0.0065 ppm) and antimony oxide (0.025 ppm) were placed in a three-neck flask equipped with stirrer, thermometer, condenser, and Dean-Stark trap and nitrogen gas inlet. The reactants were heated to 230° C. in a period of 1 hour and kept at this temperature with stirring for another 2 hours. The sample was then dissolved in $CH_2Cl_2$, precipitated by ethanol, filtered, washed by ethanol and dried in oven at 40° C. for 24 hours. Yield was 70–80%. NMR and FT-IR for 7 g: NMR($CDCl_3$) 1.35, v.s. (-$CH_2$-), 1.75, s. bro. (-$CH_2CH_2$-COO-), 2.4, m (-$CH_2$-COOH), 2.6, s. (-$CH_2OOO$-$C_6H_4$-), 7.25,s. (benzene). FT-IR, 3000 cm$^{-1}$'s.bro. (-COOH), 2919 and 2851 cm$^{-1}$,s, (-$CH_2$-), 1747 and 1191 cm$^{-1}$ s, (-COO-).

EXAMPLE Ia

Direct Esterification of Hydroquinone with Diacid for Preparation OH- or COOH- Terminated Oligomers (nHO or CnHO).

Hydroquinone and saturated aliphatic diacid in a mole ratio of 3:2 (for hydroquinone-terminated) or 2:3 (for COOH-terminated), xylene (about 8% by weight, for azeotrope with $H_2$ produced), and p-toluenesulfonic acid (p-TSA) (0.2% by weight) are mixed in a three-neck flask equipped with stirrer, thermometer, condenser, Dean-Stark trap, and nitrogen gas inlet. The mixture is heated to 140° C. in a period of 1 hour and kept at this temperature for another 6 hours. The temperature is then raised to 170° C. and kept there for 4 hours. The sample is recrystallized from hot toluene, washed with acetone, and vacuum stripped at 80° C. for 18 hours. Yields are about 60–85%.

EXAMPLE II

Esterification of 2,6-dihydroxy naphthalene with diacids for preparation of COOH-terminated oligomers.

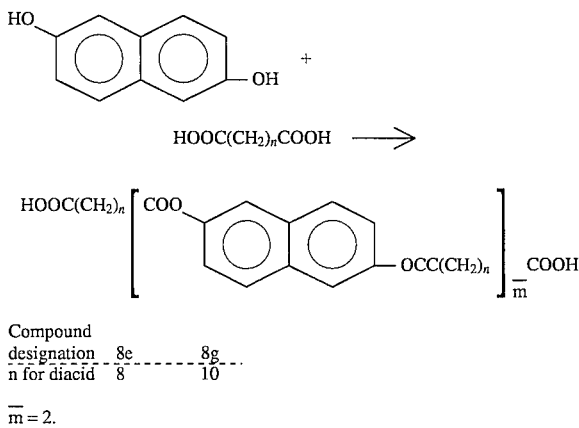

Compound
designation   8e      8g
n for diacid   8      10

$\overline{m} = 2$.

A mixture of the 2,6-dihydroxynaphthalene, straight chain saturated aliphatic diacid (where n=8 or 10) in a 2:3 mole ratio, para toluene sulfonic acid (p-TSA) (0.2% wt.) and Aromatic 150 (about 10% wt.) were heated at 230° C. for 2 hours under $N_2$ gas in three-neck flask equipped with stirrer, Dean-Stark trap, condenser, thermometer and $N_2$ inlet. Distillate was collected in the Dean-Stark trap. The reaction product was cooled down to 70°–80° C. and dissolved in $CH_2Cl_2$ under heating and stirring, the hot solution was poured into ethanol, precipitating the white product. Product was filtered, washed with two portions of ethanol and dried at 40° C. overnight. Yield was 60–70%. NMR and FT-IR for 8 g: NMR ($CDCl_3$) 1.3 s. (-$CH_2$-), 1.75 bro(-$CH_2CH_2$-COO-), 2.7 w ($CH_2$-COOH), 2.8w (-$CH_2$COO-$C_6H_4$-), 5–7 multiple (naphthalene); FT-IR 3041 cm bro. (-COOH); 2926 and 2852 $cm^{-1}$ s.(-$CH_2$-), 1757 and 1215 s.(-COO-), GPC: $M_n$=1.85×10$^3$, $M_w$=3.45×10$^3$ for 8e; $M_n$=1.64×10$^3$, $M_w$=3.94×10$^3$ for 8 g

EXAMPLE III

Esterification of 2,6-dihydroxynaphthalene with diacid using dicyclohexylcarbodiimide (DCC).

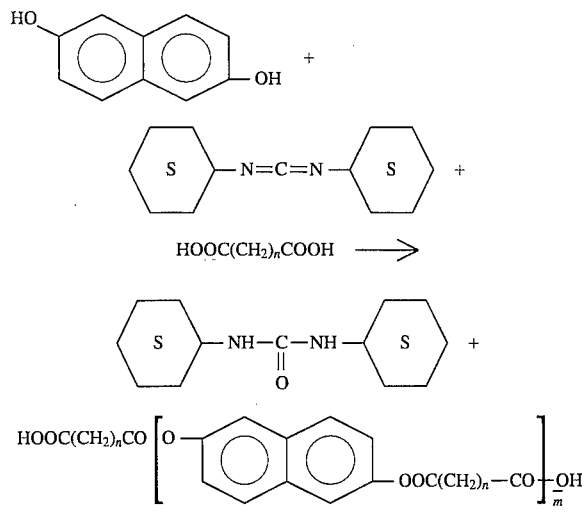

$\overline{m} = 2$.

Compound
designation   9e   9g   10e   10g
n for diacid   8   10   8     10

A solution of 2,6-dihydroxynaphthalene (0.05 mole), aliphatic diacid (where n=8 and 10) (0.075 mol), dicyclohexyl carbodiimide (DCC) (0.0733 mole), para toluene sulfonic acid (p-TSA) (0.004 mole) and pyridine (150 mL) were stirred at room temperature. After stirring 24 hrs. a white solid was filtered to remove dicyclohexane urea (DCU). The solution was concentrated on a rotary evaporator, the residue was dissolved in $CHCl_3$ and washed with two portions of 10% HCl aq. followed by water until the water was neutral. The solution was dried over anhydrous $MgSO_4$ and filtered. The residue was separated from $CHCl_3$ with ethanol, followed by filteration. Residue was dried in an oven at 40° C. overnight. Yield was 50–75%. NMR and FT-IR indicate that the products formed by the DCC have similar structure as by other methods. As for 10e and 10g, the mole ratio is 3:2 of hydroxynaphthalene and diacid.

A. Preparation of water reducible dispersion for 7c, 7e, 7g and 8e, 8g of Examples I and II.

After the above reactions were completed, the products were cooled to 160° C. under stirring. Butyl cellosolve and dimethylethanolamine (DMEA) were added to reduce the temperature to 110°–130° C. The pH was adjusted to about 8 and the latter temperature range was maintained for 30 min. Water was added to yield a water reducible dispersion, which was used without purification. Non-volatile weight (NVW) is determined after 2 hours of drying at 120° C. (the solid content is about 50%, the solvent contains 80% water).

B. Enamel preparation

The water reducible dispersion of the above samples, HMMM (Resimene 731) and p-TSA in a 70/30/0.3 wt. ratio were cast on steel panels and were baked at 175° C. for 20 min. The film thicknesses were an average of 0.004 in. (4 mil).

C. Results and discussion

DSC:DSC thermograms for 7c, 7e, 7g and 8e, 8g, 10e, 10g generally showed two or more transitions on heating and cooling, however, 9e and 9g exhibit single peak on heating. The transition temperature of these samples are listed in Table 1. However, the same polymers synthesized by different methods (such as DCC, direct transesterification) had different transition temperatures in DSC. Differences are possibly due to different molecular weight, as an increase of the oligomer molecular weight increases phase transition temperatures.

WAXS:Diagrams exhibit three peaks obtained from sample quenched from 5° C. above $T_m$. For example, the d-spacing of 16.3 Å in 8e indicates a layered structure; the d-spacing at 4.08 and 4.35 Å in 8e are attributable to lateral distances between rigid molecules in the layers. These data are listed in Table 2.

Experimental results indicate that these polymers appear to have liquid crystalline properties. Soft methylene spacers have been found to enhance liquid crystallinity in many cases. Because flexible linking groups can exist in multiple conformations, they tend to enable formation of liquid crystals under suitable circumstances.

D. Physical properties.

The coatings of water reducible dispersion made from the above polymers have good mechanical properties, as listed in Table 3.

TABLE 1

Thermal properties of oligomers for 7c,
7e, 7g, 8c, 8g, and 9c, 9g, 10c, 10g.

| No. | n | Heating | | | Cooling | |
|---|---|---|---|---|---|---|
| | | $T_1$ | $T_2$ | $T_3$ | $T_1$ | $T_2$ |
| 7c | 6 | 202.3 | 220.4 | 232.8 | 194.7 | 220.4 |
| 7e | 8 | 133.5 | | 158.6 | 148.3 | 119.2 |
| 7g | 10 | 131.8 | | 148.4 | 137.3 | 119.9 |
| 8c | 8 | 138.4 | 145.3 | 157.1 | 153.4 | 125.9 |
| 8g | 10 | 130.7 | | 145.6 | 138.2 | 122.6 |
| 9c | 8 | 133.8 | | | 138.9 | 124.1 |
| 9g | 10 | 113.9 | | | 112.7 | 102.8 |
| 10c | 8 | 115.0 | 128.0 | 143.5 | 143.1 | 104.1 |
| 10g | 10 | 113.9 | 155.1 | 164.9 | 158.4 | 146.4 |

TABLE 2

The peaks of WAXS for 7c, 7e, 7g and 8e, 8g.

| No. | n | d-spacings (Å) | | |
|---|---|---|---|---|
| 7c | 6 | 10.85 | 4.98 | 4.14 |
| 7e | 8 | 14.14 | 4.28 | 4.02 |
| 7g | 10 | 17.03 | 4.40 | 4.09 |
| 8c | 8 | 16.25 | 4.35 | 4.08 |
| 8g | 10 | 17.24 | 4.29 | 4.03 |

TABLE 3

The mechanical properties of films made from
the water reducible dispersion of 7c, 7e, 7g
and 8e, 8g.

| No. | Tukon hardness (KHN) | Impact resistance (Lb-In) | |
|---|---|---|---|
| | | Direct | Reverse |
| 7c | 22 | 160 | 60 |
| 7e | 28 | 160 | 120 |
| 7g | 27 | 160 | 60 |
| 8c | 27 | 160 | 160 |
| 8g | 18 | 160 | 160 |

EXAMPLE IV

Diol/Terephthalic Acid Polyesters

Carboxlyic acid functional polyesters were prepared from terephthalic acid (TPA) and linear aliphatic diols as shown below:

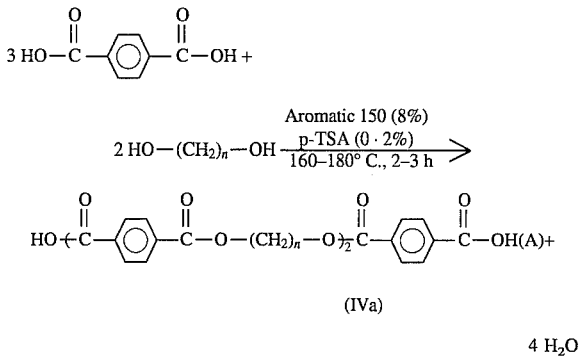

wherein n=2, 6 and 10 for the diol.

The properties of polyesters (A):

Appearance: milky white solids.

Differential Scanning Calorimetry (DSC): Two transitions for n=6, 10 (113.0° and 121.8° C. for n=6; 89.7° and 105.3° C. for n=10); capillary observation indicates solid-liquid transition at the lower transition temperature.

No transition was observed for n=2 up to 350° C. (decompose).

X-ray diffraction: Samples quenched from 5° C. above $T_m$ show several strong peaks at wide angle region, indicating crystallinity at temperatures above $T_m$.

Solubility: Insoluble in ketones, alcohols, esters, etc.; slightly soluble in chloroform.

EXAMPLE IVa

Modify the polyester A with an epoxy known as Glydexx N-10 available from the Exxon Chemical Company.

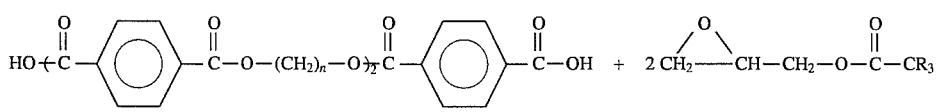

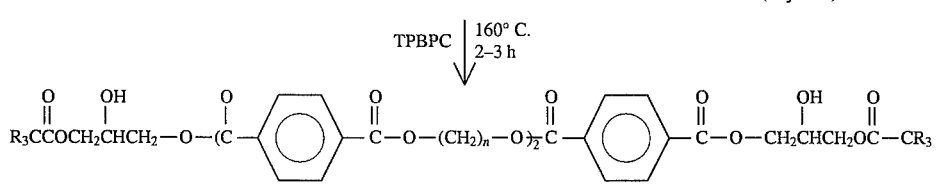

where R in Glydexx represents aliphatic groups, the three R groups having a total carbon number of 8; TPBPC is triphenyl benzyl phosphonium chloride.

Properties of (IVB):

Appearance: All grafted polyesters (n=2, 6, 10) are milky white to light yellow non-transparent viscous liquids.

X-ray diffraction: Several sharp peaks in the wide angle region, indicating crystallinity of these liquid samples.

DSC: two first order transitions at 23.5° and 60.9° C. for n=10; two first order transitions at 40.6° and 90.1° C. for n=6; no well-defined transitions were observed for n=2.

Dispersibility: All form stable high solids (60–80%) dispersions in several solvents at room temperature.

n=10: 80% solids dispersion in methylisobutylketone and butyl acetate; 70% solids in xylene and 2-heptanone.

n=6: 60% solids dispersion in methylisobutylketone, 2-heptanone, butyl acetate, and xylene; clears to transparent solution when heated to elevated temperatures below 100° C.

n=2: 80% solids dispersion in 2-heptanone and butyl acetate; becomes two phases when diluted to 60% solids (a clear top phase and a concentrated dispersion).

EXAMPLE IVb

Cross-linking Polyester IVB with hexakis (methoxymethyl) melamine resin (HMMM).

| Formulation: | |
| --- | --- |
| Polyester (IVB) | 1.4 g |
| HMMM Commercially available as Resimene 746 | 0.6 g |
| Para-toluenesulfuric acid (p-TSA) | 0.004 g (0.2%) |
| xylene | 1.0 g |

Baking condition: 150° C. for 30 minutes.

| Film properties: | n = 10 | n = 6 | n = 2 |
| --- | --- | --- | --- |
| Pencil hardness | 4H/5H | 6H/7H | 7H/8H |
| Tukon hardness (KHN) | 9 | 18 | 30 |
| Reverse impact resistance (inch-pounds) | 80 | >160 | >160 |
| Direct impact resistance (inch-pounds) | >160 | >160 | >160 |
| Appearance | glossy, no defects | glossy, pinholing | some fuzzy-looking |

Film thickness about 1 mil; same thickness for other films.

X-ray: For n=6, some weak peaks in the wide angle region, indicating some crystal domains; for n=2, several sharp peaks in the wide angle region, indicating high crystallinity.

EXAMPLE IVc

Cross-linking Polyester IVB with a toluene-diisocyanate prepolymer (Mondur CB-60)

| Formulation (as for n = 10): | |
| --- | --- |
| Polyester (IVB) | 1.27 g (0.0020 equivalents) |
| Mondur CB-60* | 0.89 g (0.0022 equivalents) |
| dibutyltine dilaurate | 0.0043 g (0.2% w/w) |
| xylene | 1.0 |

| Formulation (as for n = 10): | |
| --- | --- |

*Mondur CB-60 is an adduct of toluene diisocyanate and a triol.

Baking condition: 70° C. for 30 minutes.

| Film properties: | n = 10 | n = 6 | n = 2 |
| --- | --- | --- | --- |
| Pencil hardness | HB/H | 3H/4H | 6H/7H |
| Tukon hardness (KHN) | 10 | 18 | 30 |
| Reverse impact resistance (inch-pounds) | 80 | >160 | >160 |
| Direct impact resistance (inch-pounds) | >160 | >160 | >160 |
| Appearance | glossy, no defects | glossy, pinholing | some fuzzy-looking |

X-ray: For n=6, some weak peaks in the wide angle region, indicating some crystal domains; for n=2, several very strong sharp peaks in the wide angle region, indicating high crystallinity.

EXAMPLE V

Terephthalic acid (TPA)/diol/Polyesters.

Hydroxy functional polyesters were prepared from TPA and diols by the methods shown below.

Method I.

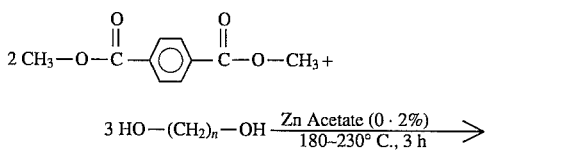

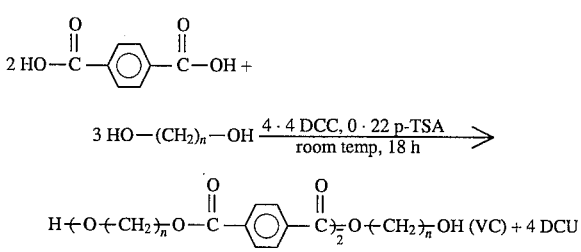

Method II.

wherein n=6, 7, 8, 9, 10, 12 or 16 where DCC represents dicyclohexylcarbodiimide and DCU represents dicyclohexylurea.

Properties of Polyesters (VC):

DSC: Two or three first order transitions on heating and one or more transitions on cooling, typical of LC polymers.

Cross-polarizing microscope: The samples quenched from 5° C. above $T_m$ shows batonnet or grain-like textures, indicating possible smectic C or nematic structure.

X-ray: Several peaks in the wide angle region and a medium peak in the small angle region, indicating possible smectic C structure.

Solubility: Soluble in chloroform and dichloromethane; insoluble in ketones, alcohols, esters, etc.

Esterification Using DCC for Preparation of Polyesters of the Type nGT, nHO, CnHO, and CnGT where nGT means -OH terminated polyester, CnGT means -COOH Terminated Polyester, nHO means -OH Terminated Polyester made with Hydroquinone and CnHO means a -COOH Polyester made with Hydroquinone.

Terephthalic acid (or saturated aliphatic diacid) (0.02 or 0.03 mol), saturated aliphatic diol (or hydroquinone) (0.02 of 0.03 mol), p-TSA (0.0024 mol), and DCC (0.044) is dissolved in 200 ml of pyridine in a single-neck flask with DCC being added last. A white precipitate begins to appear in about 2–10 min., which is dicyclohexylurea (DCU). After stirring at room temperature or elevated temperature (up to 80° C.) for 24 to 6 hours, the reaction solution is filtered to remove DCU, concentrated on a rotary evaporator, and dissolved in $CH_2Cl_2$ to remove the remaining DCU. The $CH_2Cl_2$ solution is washed with 3 portions of 10% HCl and 3 portions of water, dried over $MgSO_4$, and concentrated to a high concentration (polyester not precipitated yet). The polyester is precipitated by adding acetone. The sample is dried over vacuum at 60° C. for 8 hours. Yields are about 50–90%.

EXAMPLE Va

Modify Polyester VC with succinic anhydride and then with Glydexx N-10.

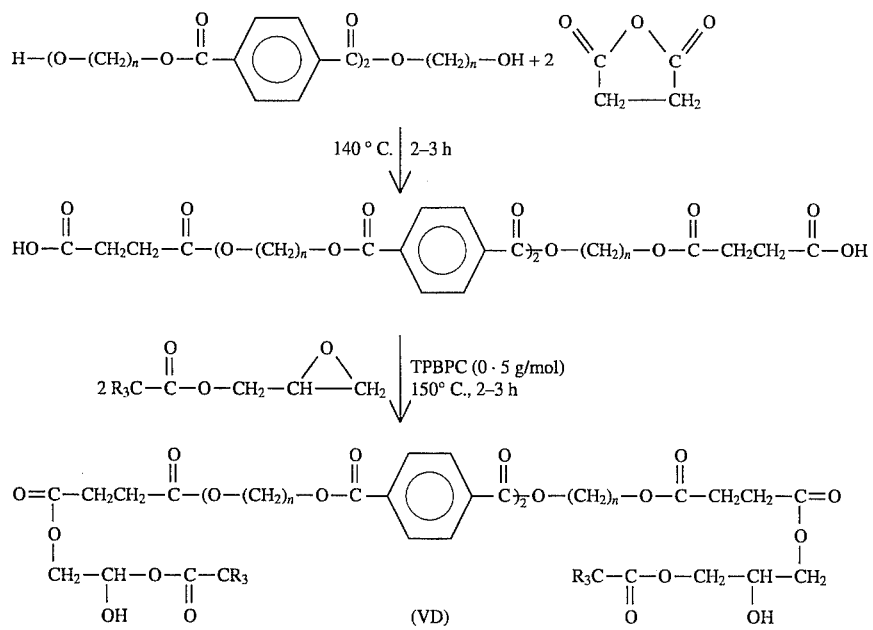

Properties of the Glydexx N-10 grafted polyester (n=10):

Appearance: Milky white to light yellow non-transparent viscous liquid, indicating crystallinity or liquid crystallinity in the liquid sample.

DSC: For n=10, two transitions (28.7° and 69.8° C.) are observed, typical of LC polymers.

Polarizing microscope of quenched sample: grain- and batonnet-like textures, indicating possible nematic or smectic C structures.

X-ray: Several strong peaks in the wide angle region and a medium peak at small angles (6.24°, 14.14 Å), suggesting possible smectic C or cybotactic nematic (nematic with short-range smectic-like ordering) structure.

Solubility: Form stable dispersion in toluene and MIBK (methyl isobutyl ketone) with 60–80% solids.

EXAMPLE Vb

Cross-linking of non-grafted polyester (VC) wherein n=10 with HMMM.

Formulation:

| | |
|---|---|
| Polyester (VC) | 1.4 g |
| HMMM (Resimene 746) | 0.6 g |
| p-TSA | 0.004 g |
| toluene | 3.0 g (soluble only at elevated temp.) |

Baking condition: 150° C. for 30 minutes.

Film properties:

| | |
|---|---|
| Pencil hardness | 6H/7H |
| Tukon hardness | 20 KHN |
| Reverse impact resistance | >160 inch-lbs. |
| Direct impact resistance | >160 inch-lbs. |
| Appearance | fuzzy-looking |

EXAMPLE Vc

Cross-linking of Glydexx N-10 grafted polyester (VD) with HMMM (Resimene 746).

Formulation:

| | |
|---|---|
| Polyester (VD) | 1.4 g |
| HMMM (Resimene 746) | 0.6 g |
| p-TSA | 0.004 g |
| toluene | 1.0 g |

Baking condition: 150° C. for 30 minutes.

Film properties:

| | |
|---|---|
| Pencil hardness | 3H/4H |
| Tukon hardness | 20 KHN |
| Reverse impact resistance | 60 inch-lbs. |
| Direct impact resistance | >160 inch-lbs. |
| Appearance | glossy- no defects |

EXAMPLE VI

Terephthalic acid/diol/Phthalic Anhydride/Glydexx N-10 modified oligomer.

Polyester (VC) (containing a repeating unit of $\bar{2}$ as the cases before) was grafted or reacted with phthalic anhydride (PA) and then with Glydexx N-10.

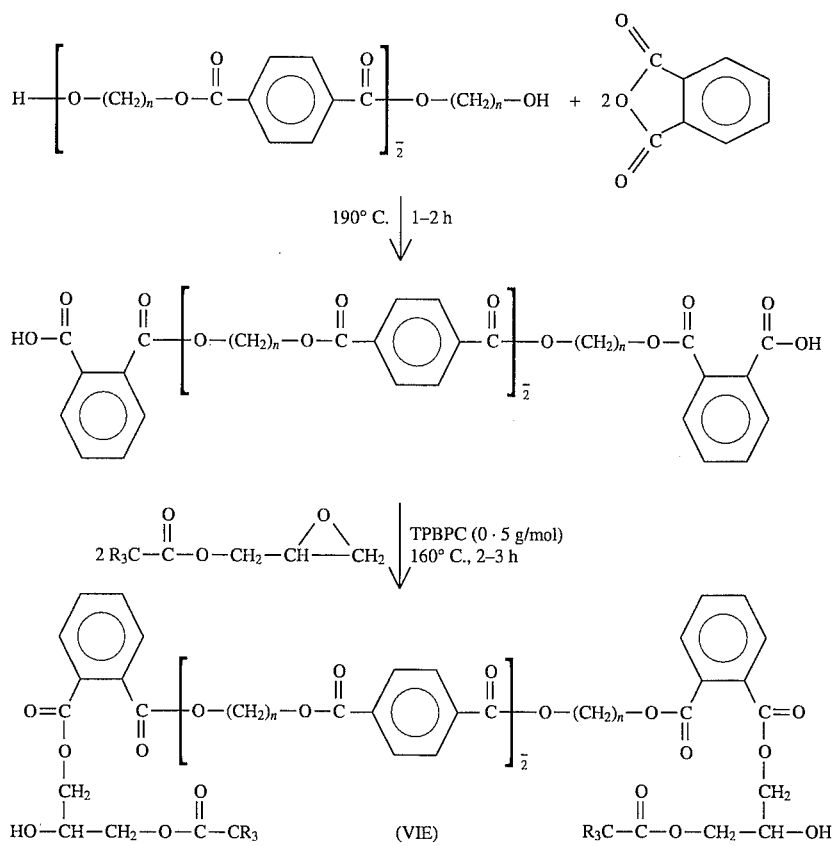

wherein n=6, 10 and 12.

The properties of the Glydexx N-10 grafted oligoester (with n= 10):

Appearance: Milky white to light yellow non-transparent viscous liquid.

X-ray: several peaks in the wide angle region and a weak peak in small angles (6.06 Å, 14.6 Å).

Solubility: Form stable dispersion in toluene with 60% solids.

EXAMPLE VIa

Cross-linking oligomer VIE with HMMM (Resimene 746).

Formulation:

| | |
|---|---|
| Oligoester (IVE) | 1.4 g |
| HMMM (Resimene 746) | 0.6 g |
| p-TSA | 0.004 g |
| toluene | 2.0 g |

Baking condition: 150° C. for 30 minutes.

Film properties:

| | |
|---|---|
| Pencil hardness | 3H/4H |
| Tukon hardness | 12 KHN |
| Reverse impact resistance | >80 inch-lbs. |
| Direct impact resistance | >160 inch-lbs. |
| Appearance | glossy- no defects |

EXAMPLE VIIa

Terephthalic Acid/diol/Trimellitic Anhydride Oligoesters.

The oligoester (VC) (containing 2 repeating units) was grafted or reacted with trimellitic anhydride (TMA) and then was grafted or reacted with Glydexx N-10 as shown below.

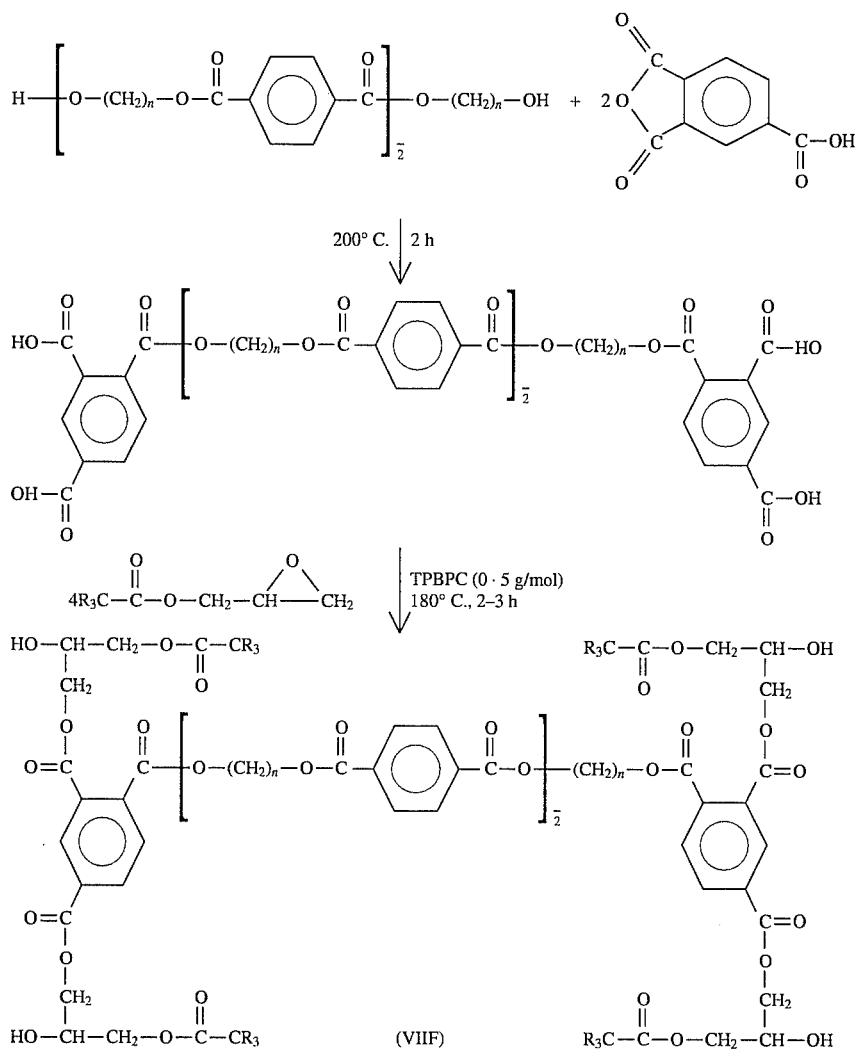

wherein n=6, 10 and 12.

The properties of the Glydexx N-10 grafted oligoester (with n=10):

Appearance: Light yellow transparent semisolid.

X-ray: Several peaks in the wide angle region and a weak peak in the small angle region (6.6°, 14.6 Å) indicating LC structure of the material.

Solubility: Form dispersions in toluene with 60–80% solids.

EXAMPLE VIIb

Cross-link oligomer VIIF with HMMM (Resimene 746).

Formulation (n = 10):

| | |
|---|---|
| Oligoester (VIIF) | 1.4 g |
| HMMM (Resimene 746) | 0.6 g |
| p-TSA | 0.004 g |
| toluene | 1.0 g |

Baking condition: 150° C. for 30 minutes.

Film properties:

| | |
|---|---|
| Pencil hardness | 6H/7H |
| Tukon hardness | 15 KHN |
| Reverse impact resistance | >80 inch-lbs. |
| Direct impact resistance | >160 inch-lbs. |
| Appearance | glossy- no defects |

EXAMPLE VIIc

Cross-link oligoester (VIIF) with a toluenediisocyanate prepolymer.

Formulation (n = 10):

| | |
|---|---|
| Oligoester (VIIF) | 1.02 g (0.0030 equivalents) |
| Mondur CB-60 | 1.33 g (0.0033 equivalents) |
| dibutyltin dilaurate | 0.005 g (0.2% w/w) |
| toluene | 1.0 g |

Baking condition: 70° C. for 30 minutes.

| Film properties: | |
| --- | --- |
| Pencil hardness | 6H/7H |
| Tukon hardness | 22 KHN |
| Reverse impact resistance | >160 inch-lbs. |
| Direct impact resistance | >160 inch-lbs. |
| Appearance | glossy, no defects |

EXAMPLE VIII

Terephthalic acid/diol/epoxy modified polyesters.

Glydexx N-10 was directly grafted onto Oligoester (C) as shown below.

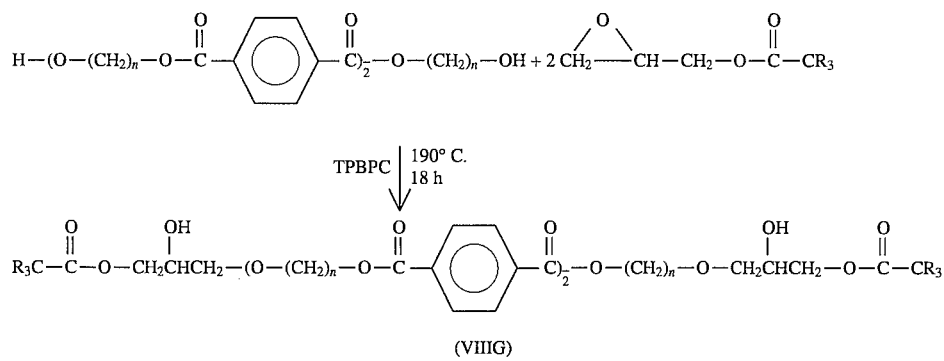

(VIIIG)

Properties:

Appearance: Light yellow, turbid, viscous liquid (for n=10, 6), typical of LC polymers.

DSC: For n=10, three transitions: 10.3°, 47.0° and 64.0° C.

Cross-polarizing microscope: Grain-like structure.

Solubility: For n=10, 30% clear solution in toluene; 70% stable dispersion in toluene.

EXAMPLE VIIIa

Polyester VIIIG cross-linked with HMMM (Resimene 746).

| Formulation: | |
| --- | --- |
| Polyester (VIIIG) | 1.4 g |
| HMMM (Resimene 746) | 0.6 g |
| p-TSA | 0.004 g |
| toluene | 1.0 g |

Baking condition: 150° C. for 30 minutes.

| Film properties: | Polyester $n = 6$ | (VIIIG) $n = 10$ |
| --- | --- | --- |
| Pencil hardness | 6H/7H | 6H/7H |
| Tukon hardness (KHN) | 25 | 20 |
| Reverse impact resistance (inch-pounds) | 80 | 160 |
| Direct impact resistance (inch-pounds) | >160 | >160 |
| Appearance | glossy, no defects | glossy, no defects |

Film thickness about 1 mil; same thickness for other films.

X-ray of Resimene 746 cross-linked film (n=10): a broad refraction peak in the wide angle region and a weak but sharp peak in small angles (4.93°, 17.9 A), indicating that the film is generally in an amorphous state but also contains some liquid crystal domains.

EXAMPLE IX

Hydroquinone/Diacid/Polyesters.

Carboxylic acid functional polyester from hydroquinone (HQ) and linear aliphatic diacids were prepared as shown below.

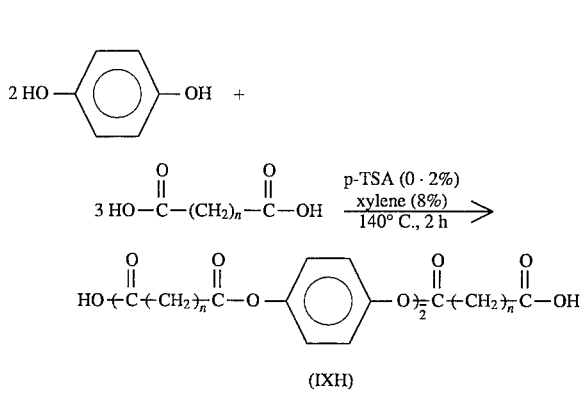

(IXH)

wherein n=10.

Properties of the polyester with n=10:

Appearance: Light brown solid.

DSC: Three first order transitions on heating (100.4°, 115.0°, and 129.8° C.) and three on cooling (93.4°, 105.1°, and 124.1° C.), indicating liquid crystal behavior.

X-ray: Two sharp peaks in the wide angle region and one sharp peak in small angles, indicating smectic structure.

EXAMPLE IXa

Polymer IXH was grafted with Glydexx N-10 as shown below.

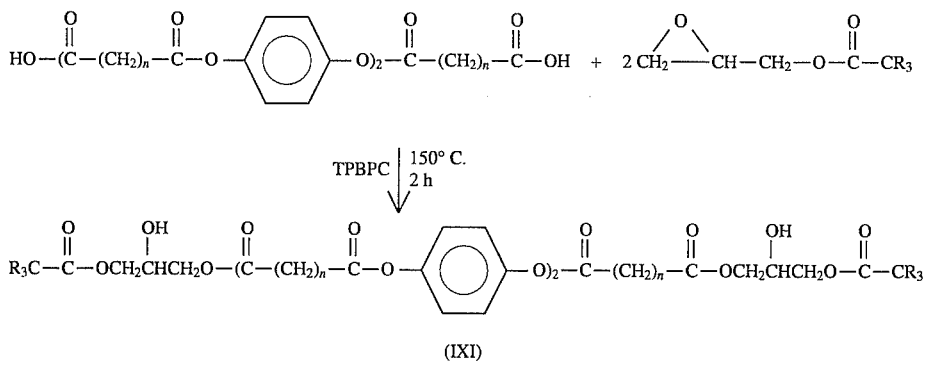

(IXI)

The material with n=10 is a yellow brown viscous liquid,

EXAMPLE IXb

Polymer IXI was cross-linked with HMMM (Resimene 746).

| Formulation (n = 10): | |
|---|---|
| Polyester (IXI) | 1.4 g |
| HMMM (Resimene 746) | 0.6 g |
| p-TSA | 0.004 g |
| toluene | 2.0 g |

Baking condition: 150° C., for 30 minutes,

| Film properties: | |
|---|---|
| Pencil hardness | 3H/4H |
| Tukon hardness | 13 KHN |
| Reverse impact resistance | 80 inch-lbs. |
| Direct impact resistance | 160 inch-lbs. |

EXAMPLE X

Diacid/Hydroquinone/Epoxy Modified Polymers

Hydroxy functional polyesters were prepared from hydroquinone (HQ) and linear saturated aliphatic diacids as shown below.

Method I.

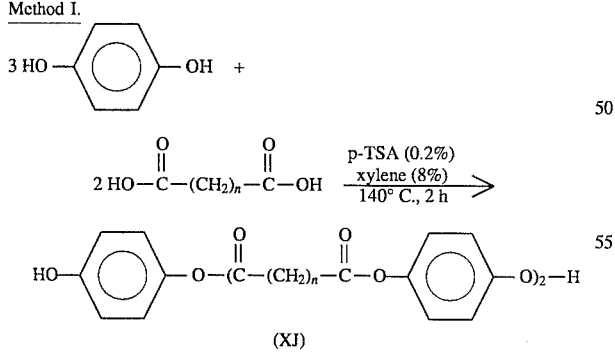

(XJ)

Method II.

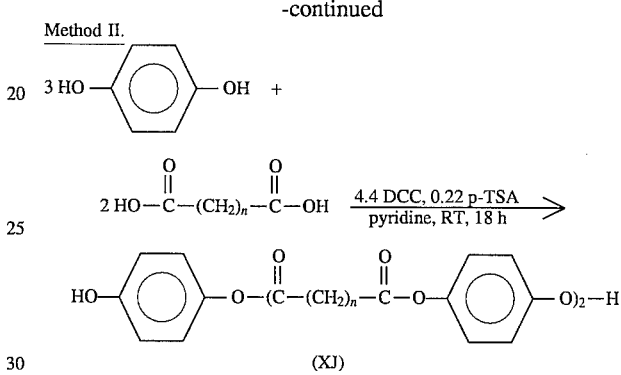

(XJ)

wherein n=4, 6 and 10.

Properties of the polyester with n=10:

Appearance: Light brown solids.

DBC: Three first order transitions on heating (85.0°, 104.7°, and 120.8° C.) and three on cooling (61.7°, 85.6°, and 103.8° C.), indicating multimesomorphous liquid crystal behavior.

Crossed polarizing microscope: Brush- and grain-like (quenched from 80° C.) and schlieren (quenched from 100° C.) textures, indicating possible smectic C and B structures.

X-ray: Three strong sharp peaks in the wide angle region and two medium sharp peaks in small angels, indicating smectic structures.

EXAMPLE Xa

Polyester X was crafted with Glydexx N-10 as shown below.

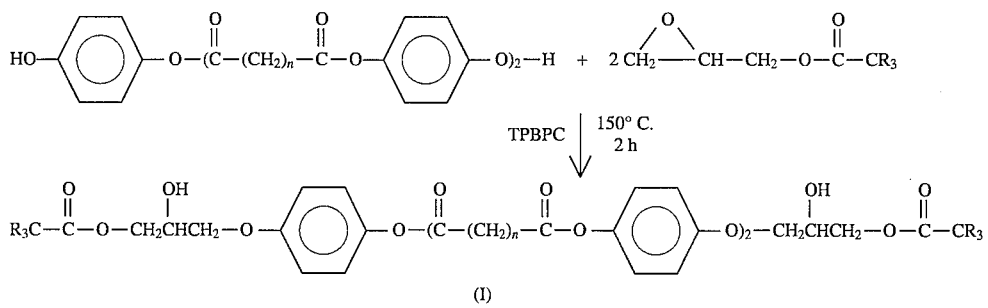

(I)

The material with n=10 is a yellow brown viscous liquid.

EXAMPLE Xb

Polyester XK was cross-linked with HMMM (Resimene 746).

| Formulation (n = 10): | |
|---|---|
| Polyester (XK) | 1.4 g |
| HMMM (Resimene 746) | 0.6 g |
| p-TSA | 0.004 g |
| toluene | 2.0 g |

Baking condition: 150° C. for 30 minutes.

| Film properties: | |
|---|---|
| Pencil hardness | 3H/4H |
| Tukon hardness | 13 KHN |
| Reverse impact resistance | 80 inch-lbs. |
| Direct impact resistance | 160 inch-lbs. |

EXAMPLE XI

Synthesis of

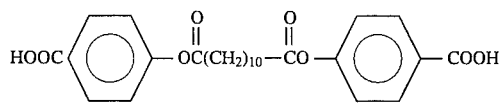

A mixture of HOOC-$(CH_2)_{10}$-COOH, p-hydroxybenzoic acid (PHBA), methansulfonic acid (MSA) and Aromatic 150 (a mixed alkyl benzene solvent commercially available from Exxon Chemical Company) are heated under $N_2$ in a 3-neck flask equipped with stirrer, Dean-Stark trap, condenser and thermometer. The PHBA/diacid mole ratio is ½ and 0.1 wt. % of methanesulfonic acid is used. The amount of Aromatic 150 is adjusted to maintain the temperature at 220°–230° C.; about 10 wt. % is needed. Distillate (cloudy $H_2$), usually 95–99% of theoretical amount, is collected in the Dean-Stark trap during 5–7 hr. The reaction mass are cooled to 115° C., and methylisobutylketone (MIBK) are added for easy handling. The reaction mass are directly poured out from flask into a sample can at about 200° C.

The crude product is dried in oven at 120° C. and cooled and ground. The product is washed 3–4 times with methanol and centrifuged if necessary. Then oven drying and grounding is applied repeatedly. The purified product is dried overnight in oven at 110° C. The yield varies, but is about 10% or higher.

EXAMPLE XII

Synthesis of poly hexanediol terephthalate.

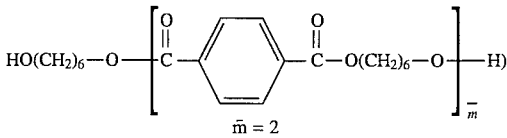

Two moles acid chloride of terephthalic acid

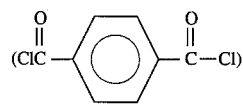

and three moles of 1,6-hexanediol [HO $(CH_2)_6$ OH] are placed in a 100 mL flask equipped with a distillation extender, a septum, and a stirring magnet. The flask is flushed with argon for 15 min. then heated in an oil bath at about 150° C. The HCl in the argon flow can be monitored by pH paper—a more quantitative method uses a basic solution of known normality and allows the argon flow to bubble through. The solution is then titrated and the extent of reaction can be calculated. The reaction time is about 4 to 8 hours.

EXAMPLE XIII

Non-Aqueous Dispersion Of Modified Polyester And Blends Of Polyester Of General Formula And Modified Polyester.

XIII(a)—polyester Having LC-Like Properties

The diol polyester having the formula

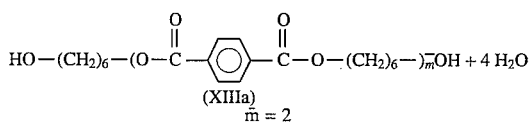

was made as follows.

59.1 g (0.50 mol) 1,6-hexanediol, 58.3 g (0.30 mol) dimethyl terephthalate

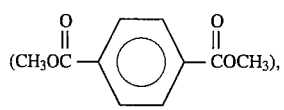

and 0.235 g (0.2% w/w) zinc acetate dihydrate (ZnAc.$2H_2O$) were charged to a 250-mL flask equipped with thermometer, stirrer, nitrogen gas inlet, and Dean-Stark trap. The mixture was heated to 200°–220° C. in about one hour and kept at this temperature range with stirring until no more condensed liquid came out (in about 1 to 2 hours). The material was dissolved in hot acetone, recrystallized, filtered, and dried at 70° C. in an oven for 5 hours. 75 g white solid was collected (yield: 76.0%); NMR indicates the expected molecular structure and a repeating unit of x=2.0. As a by-product, 15 g lower molecular weight (n<2.0) polyester was collected after evaporating the filtered acetone.

Example XIII(b)—Modified Polyester Having LC-Like Properties

The polyester (XIIIa) was modified with the mono-oxirane Glydexx N-10 by carboxylating the polyester and reacting the carboxylated polyester with the oxirane as follows.

61.5 g (0.1 mol) XIIIa and 38.4 g (0.2 mol) trimellitic anhydride were charged into a 250-mL flask equipped with stirrer, thermometer, water condenser, and nitrogen gas inlet. The mixture was heated to 180° C. in one hour and kept at this temperature for another hour. 100.0 g (0.40 mol) Glydexx N-10 and 0.20 g triphenyl benzyl phosphonium chloride (TPBPC, 0.20 g/mol epoxide) were added. The mixture was heated at 150°–180° C. for 90 minutes. The sample was diluted with 150 g toluene, poured into a 800-mL beaker, and washed with 3 portions of 400 mL petroleum ether with the supernatant liquid being recanted each time. The washed sample was then dissolved in 300 mL toluene and the precipitate (if any) was filtered out. The solution was concentrated on a rotavap and then heated to 150° C. to remove all the solvents. The final product (XIIIb) was light-yellow transparent liquid at higher temperatures and non-transparent semi-solid at room temperature. Yield was 162.0 g (81%). The expected structure, as shown above, was verified by NMR spectroscopy.

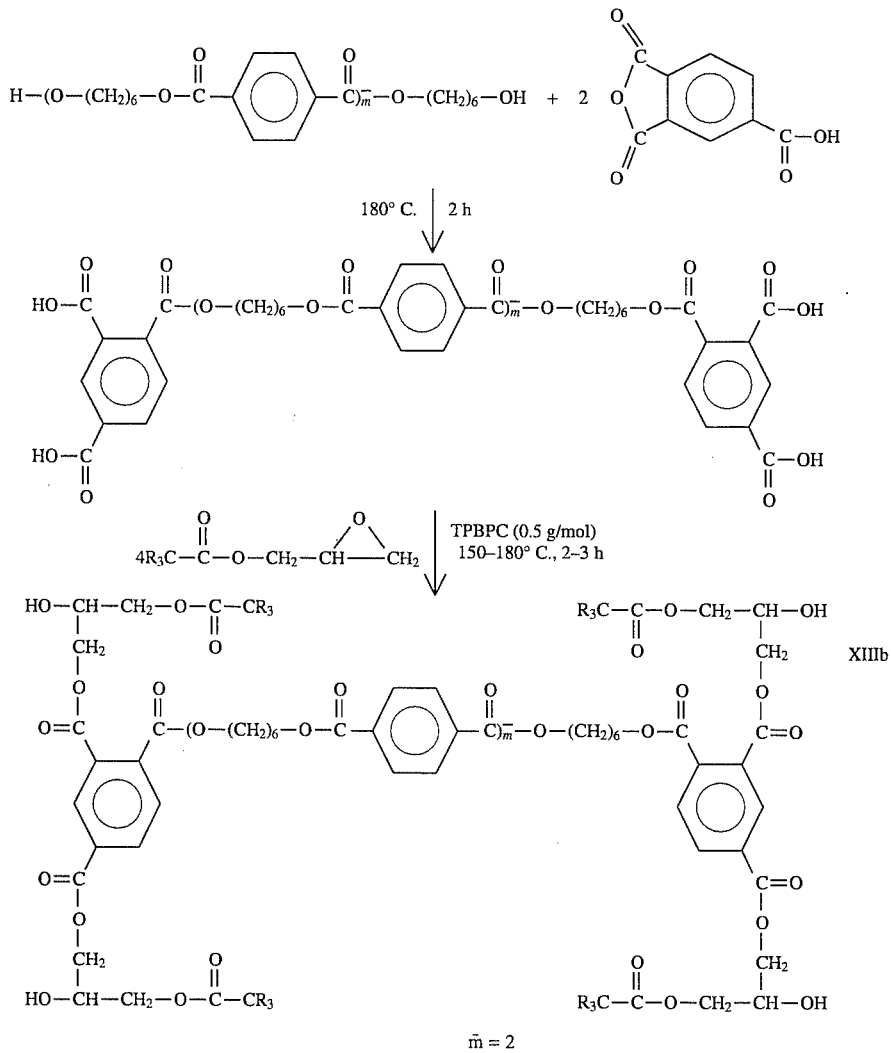

Example XIII(c)—Comparative Polyester without LC-Like Properties

A diol polyester without LC-like properties was made as shown below. That polyester was carboxylated and then modified with the oxirane Glydexx N-10 as shown below to provide the oxirane modified polyester XIIIc.

Synthesis of oxirane modified XIIIc

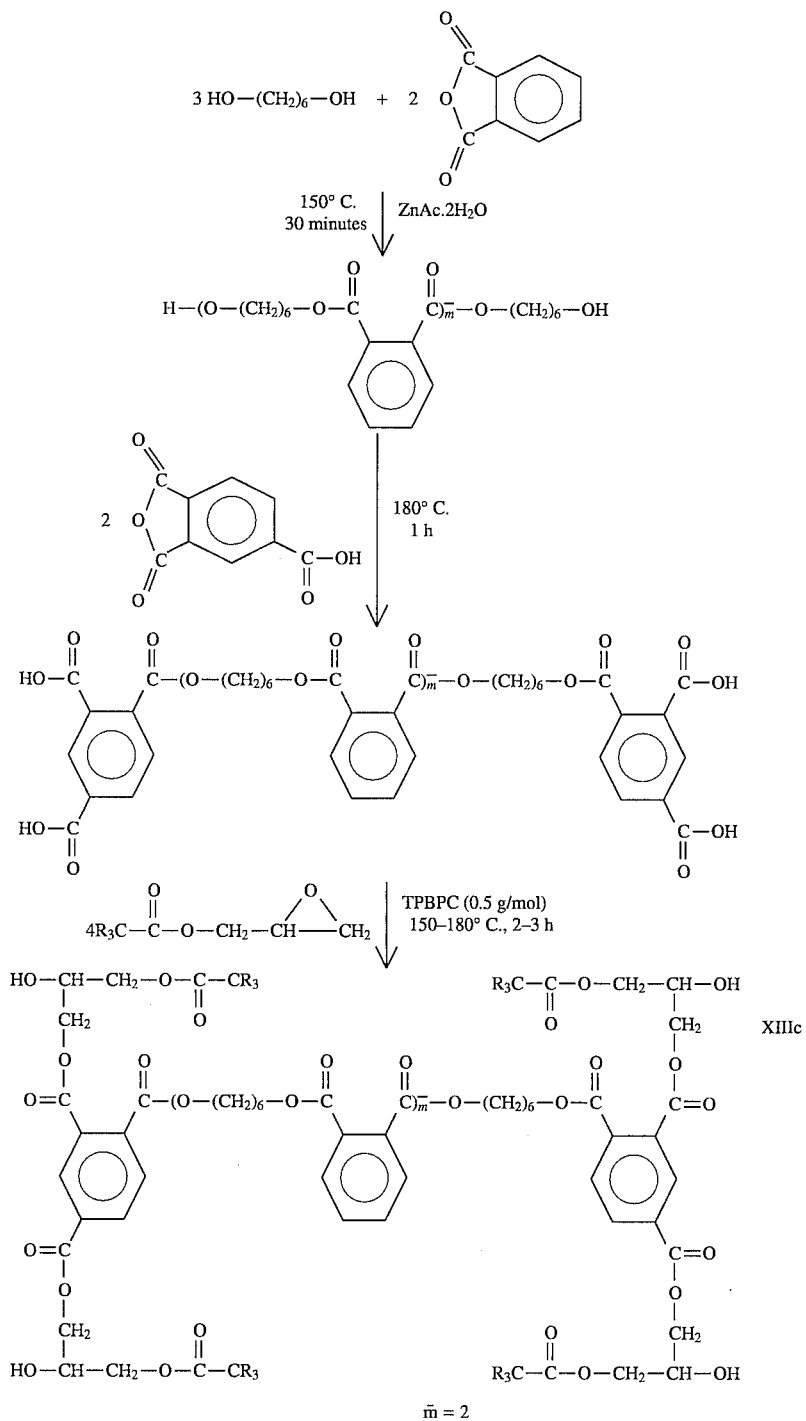

29.62 g (0.20 mol) phthalic anhydride and 35.45 g (0.30 mol) 1,6-hexanediol were charged into a 250 mL flask equipped with nitrogen gas inlet, thermometer, Dean-Stark trap, and condenser. The mixture was heated to 150° C. in 30 minutes and kept at 150° C. for another 30 minutes. 0.13 g ZnAc.H$_2$O (0.20% w/w of monomers) was added and the temperature was raised to 200°–230° C. and kept at this temperature range until no more condensed liquid came out (in about 1 hours; 2.8 g water was collected). 38.4 g (0.2 mol) trimellitic anhydride was added and the mixture was heated at 150°–180° C. for 1 hour. 100.0 g (0.40 mol) Glydexx N-10 and 0.20 g TPBPC (0.20 g/mol epoxide) were added and the mixture was heated at 150°–180° C. for an additional hour. The sample was diluted with 150 g toluene and poured into a 800 mL beaker, and washed with 3 portions of 400 mL petroleum ether with the supernatant liquid being decanted each time. The washed sample was dissolved in 300 mL toluene and the precipitate (if any) was filtered out. The solution was concentrated on a rotavap and then heated to 150° C. to remove all the solvents. The final product was light-yellow transparent liquid at room temperature. Yield was 182.0 g (91%). The expected structure of XIIIc was identified by NMR spectrum.

Properties of Dispersions of Polymers XIII a, b & c

Dispersion or Solution Preparation (A) Formation of Dispersions of XIIIa and XIII b

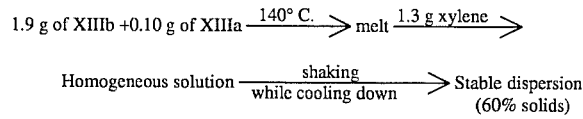

1.9 g of the modified polyester XIIIb and 0.10 g of the polyester XIIIa were charged into a glass vial (uncovered) and heated on a Bunsen burner until the polyester XIIIa completely melted. 1.33 g xylene was added slowly, forming a homogeneous solution. The solution was cooled at room temperature with good shaking (or with ultrasonication), until dispersion formed.

(B) XIIIb Only

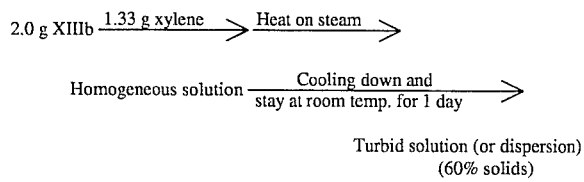

2.0 g of the polyester XIIIb and 1.33 g xylene were charged into a glass vial and heated on a steam bath until the polyester XIIIb was completely dissolved. The solution was well shaken while cooling at room temperature. A dispersion was gradually formed during cooling, while some of the polyester XIIIa precipitated on the bottom. However, the solution became a homogeneous turbid solution (or dispersion) after 24 hours.

Instrumental Methods Used In Testing Described In Example XIII $^1$H-NMR spectra were measured at 34° C. at a Varian Associates EM 390 NMR spectrometer with tetramethyl silicone (TMS) as internal standard.

Viscosity was measured by an ICI cone and plate viscometer. The sample was measured 1 day after preparation. The shear rate was about 10,000 s$^{-1}$. For shear thinning sample, the steady state viscosity was recorded.

Differential scanning calorimetry (DSC) was carried out using a Du Pont 990 thermal analyzer at a heating rate of 10° C./minute and a cooling rate of 2° C./minute. The lower cooling rate and higher heating rate were limited by the instrument. Since a specific cooling system was not available, cooling was accomplished by the atmosphere. The heating from very low temperature (precooled by dry ice) could not be too slow. The samples were prepared by drying the dispersions at 100° C. for 30 minutes and cooling to room temperature by sitting in the atmosphere. During DSC experiments, samples were contained in sealed aluminum pans and an identical empty pan was used as a reference.

Liquid crystal textures and particle distribution of the dispersions-were examined at room temperature by an Olympus model BH-2 microscope equipped with crossed polarizers. The liquid samples (as dispersions) were directly examined for particle distribution without evaporation.

Film Casting/Baking And Testing For Example XIII

The coatings were cast film on 1000 Bonderite polished steel panels with a drawdown bar. The coatings were baked at 150° C. for 20 minutes.

After baking the films were tested 1 day after crosslinking. Reverse impact resistance, Knoop hardness (KHN), acetone resistance, and crosshatch adhesion were measured according to ASTM D2794, D1474, D2792, and D3359 respectively.

Stability Of The Dispersions Of Example XIII

When hot solutions of mixed polyester XIIIb and polyester XIIIa in xylene were cooled down to room temperature with good shaking, turbid dispersions were formed; no precipitates other than dispersed particles were observed. Most of the dispersions prepared were stable for at least 1 day. After several days, some dispersions were still stable, but some separated into two layers (phase separation), the one on the top with lower concentration and the other on the bottom with higher concentration. However, after good shaking or stirring, the phase-separated samples became homogeneous dispersions again. Table 4 in this Example shows the stability of the dispersions after one week of preparation. With the increase in the insoluble polyester XIIIa content, the dispersion became less stable, possibly because less amount of soluble polyester will be available to stabilize the insoluble polyesters, causing poorer stability. Stability also increased with the polymer concentration (or percent solids), possibly because of the higher viscosity of the liquid phase at higher polyester concentration.

TABLE 4

Stability of blend of XIIIa and XIIIb in xylene dispersions after 1 week.

| XIIIa in polymer blend | 2.5% | 5% | 7.5% | 10% | 12.5% | 15% | 20% | 30% | 40% | 50% |
|---|---|---|---|---|---|---|---|---|---|---|
| 50% polymer blend-in dispersion | SD | SD | PS | PS | PS | PS | PS | PS | PS | PS |
| 60% polymer blend-in dispersion | SD | SD | SD | PS | PS | PS | PS | SS | SS | SS |
| 70% polymer blend-in dispersion | SD | SD | SD | SD | SD | SD | SD | SS | SS | SS | where
SD = stable dispersion;

TABLE 4-continued

Stability of blend of XIIIa and XIIIb in xylene dispersions after 1 week.

| XIIIa in polymer blend | 2.5% | 5% | 7.5% | 10% | 12.5% | 15% | 20% | 30% | 40% | 50% |
| --- | --- | --- | --- | --- | --- | --- | --- | --- | --- | --- |

PS = phase separation;
SS = semi-solids.

The mechanisms for the stabilization of the dispersions are not clear. However, dispersion stabilization is possibly due to the steric effect caused by the bulky alkyl groups on polyester XIIIb. Some polyester XIIIb molecules will co-crystallize with polyester XIIIa during the dispersion formation (as will be discussed later). Many of them will be on the particle surface, with the LC segment associated with the particles and the alkyl groups "dissolved" in the liquid phase, causing entropic (or steric) stabilization.

For a comparison study, non-liquid crystalline polyester XIIIc was used to replace XIIIb to prepare dispersion. When a hot solution of polyester XIIIc and polyester XIIIa (XIIIc:XIIIa=9.1) in xylene was cooled down with shaking, solid species precipitated out. No homogeneous dispersion, as for XIIIb and XIIIa in xylene system, was obtained. The crystallization of the insoluble polyester in a transitional non-aqueous dispersion caused flocculation, possibly because the dispersant (soluble polymer) could not co-crystallize with the insoluble polyesters and was excluded from the crystal. Such results suggest that in order to form stable dispersion in the current system, the soluble polyester should have a segment with similar (LC) structure to the insoluble polyester. This common structure provides the sites for association between the soluble and insoluble polyesters, possibly through LC association.

Viscosity vs. Content of Polyester IIIa In The Dispersions

Viscosity of the dispersions varies with the content of the polyester XIIIa in dispersions of the blends of polyesters XIIIa and XIIIb. In three different concentrations of the blend (50, 60 and 70%), the increase of XIIIa content caused the viscosity to decrease to a minimum and then increase again. Since polyester XIIIa is insoluble in xylene, it must stay as dispersion (in solid particles), possibly stabilized by soluble oligomer molecules. Apparently, the viscosity change is accompanied by the formation of dispersions (solid phase) and the decreasing solution concentration (liquid phase). While not intending to be bound by any theory, this can be explained as follows.

For the same percent solids, with the increase of insoluble polyester XIIIa content, the soluble polyester XIIIb is reduced. Thus, the liquid phase concentration is diluted. If the solid phase (dispersion) were not existing, the solution viscosity would decrease. However, the solid phase (dispersion) also contributes to the viscosity, causing higher viscosity than the liquid phase alone. Therefore, the viscosity change is the net result of both the decrease due to the decreasing liquid concentration and the increase due to the increasing solid phase (dispersion).

It is known that the viscosity of polymer solutions usually increases slowly at lower concentration but increases dramatically at higher concentration. This is also true in dispersions of XIIIb. Experiments demonstrate that at high concentration (50–70%), with 10% concentration increase, the viscosity increases 260%. Thus, at higher concentration, a small reduction in the concentration would reduce the viscosity greatly. On the other hand, for a solid dispersion in liquid at lower concentration (0.30%), the viscosity varies with the solid volume fraction (V) according to the Vand equation (an extension of the Einstein equation):

$$\text{Relative viscosity} = 1 + 2.5V + 7.35V^2 + \ldots$$

$$\text{where Relative viscosity} = \frac{\text{Viscosity of dispersion}}{\text{Viscosity of liquid}}.$$

According to this equation, for a dispersion at lower concentration (0–30%), the viscosity only increases moderately with the concentration. For example, when the dispersion concentration increases from 0% to 10%, the viscosity increases 32% (2.5×0.1+7.35×0.1); and when the concentration increases from 10% to 20%, the viscosity increases 47%. Such a viscosity increase is much less than the increase for a polymer solution at higher concentrations (260% increase in viscosity with 10% concentration increase (from 60% to 70%)). Thus, for the same percent solids at higher polymer concentration, with the increase in the solid phase (dispersion) to a certain extent, the viscosity should decrease.

The solid phase may be higher than expected when only considering the insoluble polymer, since some soluble polyester XIIIb may co-crystallize with polyester XIIIa and involve in the solid (dispersion) phase. Thus, the viscosity reduction may be different from prediction of the Vand equation.

The viscosity of the dispersions of blends of polyesters XIIIa and XIIIb increased again when the insoluble polyester content (relative to the total polyester) exceeded 10–20%. This is possibly because at higher dispersion concentrations the particles are too crowded to move freely, causing higher viscosity.

Liquid Crystallinity of Polyesters XIIIa and XIIIb

The DSC thermogram of polyester XIIIa showed three first-order transitions on heating and three first-order transitions on cooling, indicating its multimesomorphous property. The lower-temperature mesophase is possibly smectic and the higher-temperature mesophase is possibly nematic. The different intensity ratios among the three peaks on heating from those on cooling can be explained in terms of the different relaxation rates of the transitions on heating from those on cooling. The three transitions on heating are about the same possibly because all the three relaxation rates on heating are fast enough to be well observed at the experimental heating rate (assume the three transition energies are about the same); while on cooling the two lower transitions are much weaker than the higher-temperature transitions possibly because the relaxation rates of the two lower-temperature transitions are too low to be observed fully at this experimental cooling rate. This difference in the transition intensity ratios on heating from on cooling also indicates the good purity of the polyesters, since if each transition were due to different polyesters (varying in structure or molecular weight) there should be no difference between the transition ratios on heating and on cooling.

Polyester XIIIb was non-transparent semi-solid or viscous liquid at room temperature and transparent liquid at elevated temperatures (above 50°–60° C.). The non-transparency at room temperature is possibly due to crystal (possibly LC) formation. The DSC thermogram of polyester XIIIb has three first-order transitions (2.6, 43.0 and 59.0° C.) and a second-order transition (−18.3° C.) on heating, while no transitions were observed on cooling above 50° C. (below 50° C., DSC can not be carried out on cooling in this instrument). The two transitions at 43.0 and 59.0° C. are possible due to the phase transitions of the LC units, since the LC unit is the only part in the XIIIb molecule with such high transition temperatures (the melting/freezing point for pure Glydexx N-10 is less than −20° C.) and these two transition temperatures are close to the transition temperatures of polyester XIIIa. Also, these transition temperatures are in the same range for polyester XIIIb to become transparent. Thus these transitions must be crystal or LC transitions. The somewhat lower transition temperatures of the LC units in polyester XIIIb are due to the modification by soft spacers (Glydexx N-10). The clearly separated two transitions due to polyester XIIIa units in polyester XIIIb indicates its LC behavior, the upper temperature being clearing point and the lower temperature being melting point. The second-order transition (−18.3° C.) is typical of glass transition. The first-order transition at 2.6° C. is possibly the melting point due to the non-LC part of the material. This temperature is higher than the melting/freezing temperature of pure Glydexx N-10 (−20° C.) due to the attachment of this molecule onto the high Tm units which makes the Glydexx N-10 unit less mobile, causing higher transition temperature.

Morphology of Polyester XIIIc: A Non-LC Oligomer With Structure Similar To Polyester XIIIb Polyester XIIIc was synthesized as a non-LC oligomer for comparison studies of the LC properties of polyester XIIIb. Polyester XIIIc is transparent semi-solid or viscous liquid at room temperature instead of turbid semi-solid or viscous liquid as for polyester XIIIb, which may be due to non-crystallinity of XIIIc above room temperature. The DSC thermogram of polyester XIIIc does not have first-order double or triple transitions from −60° to 150° C., indicating non-liquid crystallinity of this polymer. The sharp first-order single transition at 8.2° C. is typical of a melting point, while the weak and broad transition at −17.6° C. is possibly a glass transition. Thus, the two carboxylic acids being in the para positions (as for terephthalate) is important for the formation of LC-like properties; similar polymers with carboxylic acids in the meta positions will not be liquid crystalline.

Co-Crystallization of Polyester XIIIb with Polyester XIIIa

In order to clarify the possible co-crystallization of polyester XIIIb with Polyester XIIIa in the dispersions, a DSC is carried out for the dry mixed sample (no solvent) containing polyester XIIIa and polyester XIIIb with different polyester XIIIa content. A dry sample is used in the DSC experiment because of the instrumental limitation. However, from the dry samples, we can know the co-crystallizability of polyester XIIIa with polyester XIIIb and thus predict the possible co-crystallization in the dispersions.

DSC thermograms of mix-melted samples of polyesters XIIIa and XIIIb were taken with different polyester XIIIa content. The DSC plot for pure polyester XIIIa and polyester XIIIb were also compared with DSC thermograms of the blends. Both the transitions due to polyester XIIIa (higher temperature region) and polyester XIIIb (lower temperature region) are seen in the thermograms for the mixed samples, indicating the existence of two types of LC domains. However, the transition temperatures for the domain for polyester XIIIb is higher than for the pure polyester XIIIa and increase with the increasing polyester XIIIa content; while the transition temperatures for the domain for polyester XIIIa is lower than for the pure polyester XIIIb and decrease with decreasing polyester XIIIa content. Also the transition temperatures are generally broader than for the pure oligomers. This indicates the involvement of the other polyester in either LC domain. That is, a polyester XIIIa LC domain also contains some polyester XIIIb molecules, while a domain for polyester XIIIb also contains some XIIIa polyester molecules. For the dispersions, the involvement of the XIIIb polyester in a XIIIa polyester LC domain will lead to the stabilization of the dispersion, since the XIIIb polyester also contains soft alkyl groups which will cause steric stabilization of the dispersions.

Crossed Polarizing Microscope Studies of Dispersions Of the XIIIa and XIIIb Polyester Blends Microscope studies have been carried out for blends of XIIIa and XIIIb polyesters in xylene dispersions with different XIIIa polyester content (10, 20 and 30 weight percent). The dispersions were 50 weight percent polyesters. Original wet samples were directly used for the studies. Without crossed polarizing lenses, the samples were found to be transparent. Thus polarizing lenses were used for all the samples, and only the birefrigerant parts of the samples showed up in the microscope observation.

Polyester XIIIb in xylene showed a few scattered birefrigerant particles in the solution or dispersion; while with the addition of polyester XIIIa, more birefrigerant particles were presented which indicates the induced LC formation by the XIIIa polyester. The particle size was very small at lower XIIIa polyester content; while larger particle size was observed when the XIIIa polyester content is high. With higher XIIIa polyester content, the particles are stabilized by less amount of polyester XIIIb and have more chance to coalesce with each other; while at lower polyester XIIIa content the particles are stabilized by more polyester XIIIb and remain as smaller particles. This also explains the better stability of the dispersions with lower polyester XIIIa content. For the dispersions with 10 and 15% polyester XIIIa contents, Brownian motion indicates these dispersions are deflocculated. This Brownian motion may also cause stability of the dispersions.

Properties Of HMMM-Cross-linked Films Made From Polyesters XIIIa and XIIIb

Table 5 in this Example shows the film properties of the polyesters cross-linked with hexakis (methoxymethyl) melamine resin (HMMN). No significant differences in film properties were observed with different polyester XIIIa contents. This indicates that polyester XIIIb gives as good properties as polyester XIIIa does. Although there are some soft groups on polyester XIIIb, it has 4 functional groups instead of 2 as for polyester XIIIa. More functional groups will give higher and more efficient cross-linking, and thus compensate the softness caused by the alkyl groups on polyester XIIIb.

At the same polyester blend concentration, the insoluble LC polyester induced dispersions showed lower viscosity than the pure soluble polyester solution. The viscosity showed a minimum when the insoluble polyester content is 10–20% of the total polyester content. This rheological behavior can be explained in terms of Vand equation together with the fact that the viscosity of polyester solutions at high concentrations increases significantly with the concentration increase. This viscosity reduction is important for making higher solids coatings.

TABLE 5

Film properties of dispersions of XIIIa and XIIIb polyester blends cross-linked with HMMM.*

| Polyester XIIIa in XIIIa and b Blend (wt. %) | Film thickness (mil) | Tukon hardness (KHN) | Pencil Hardness | Reverse Impact (in. lb.) | Cross-hatch Adhesion (%) | Resistance to Acetone | Appearance |
|---|---|---|---|---|---|---|---|
| 0  | 1.4 | 11 | 3H/4H | 160 | 100 | Excellent | Transparent |
| 10 | 1.5 | 12 | 3H/4H | 152 | 100 | Excellent | Transparent |
| 20 | 1.4 | 11 | 3H/4H | 160 | 100 | Excellent | Transparent |
| 30 | 1.4 | 12 | 3H/4H | 160 | 100 | Excellent | Transparent |
| 40 | 1.4 | 12 | 3H/4H | 160 | 100 | Excellent | Transparent |

*Coating composition: oligoesters:HMMM:p-TSA = 70:30:0.30 (w/w); solids % = 70% (wt. % in xylene); baking schedule: 150° C. for 20 minutes.

All the films are transparent and very glossy. Because these LC oligomers have lower melting and clearing points than the curing temperature, they were cured from isotropic state. The cross-linked films may remain isotropic or have smaller LC domains (smaller than light wavelength). Such a film appearance is very desirable in coatings.

All the films showed good hardness and excellent flexibility. However, the Tukon hardness of these films was not as high as for other LC coatings, possibly because the LC domains did not form after cross-linking.

Stable non-aqueous dispersions can be formed from blends of a polyester of the general formula and a modified polyester. LC association between the soluble and insoluble polymers and the steric effect of the soluble polymer may be the causes of the dispersion stabilization.

HMMM-cured films of the dispersions of the polyester/modified polyester blend showed good mechanical properties and excellent appearance (transparent). This shows that the dispersion formation does not affect the film appearance.

EXAMPLE XIV (Reactive Diluent+Diol Polyester)
XIV(a)—Synthesis of Reactive Diluent A reactive diluent having the formula

wherein R=aliphatic group with $R_3$ having a total of eight carbon atoms, was made as follows as a reaction product of terephthalic acid (TPA) and the mono-oxirane, Glydexx N-10.

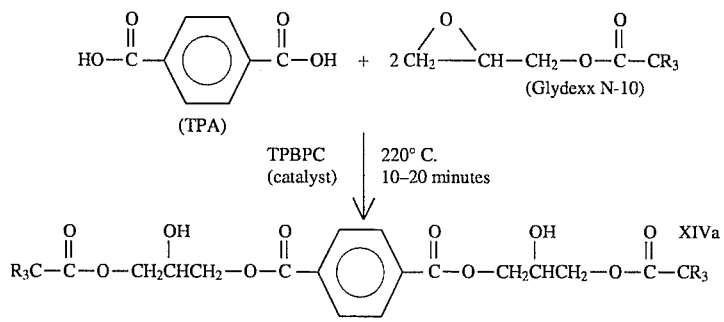
(TPA) (Glydexx N-10)

TPBPC (catalyst) | 220° C. 10–20 minutes $$R_3C-\overset{O}{\overset{\|}{C}}-O-CH_2CHCH_2-O-\overset{O}{\overset{\|}{C}}-\underset{}{\bigcirc}-\overset{O}{\overset{\|}{C}}-O-CH_2CHCH_2-O-\overset{O}{\overset{\|}{C}}-CR_3 \quad \text{XIVa}$$
(with OH on middle carbons)

33.2 g TPA (0.20 mol), 100 g Glydexx N-10 (0.40 mol), and 0.2 g triphenyl benzyl phosphonium chloride (TPBPC) (0.5 g/mol) were charged into a 250-mL flask equipped with thermometer, stirrer, and water condenser. The mixture was heated with stirring to about 220° C. in about one hour and kept at this temperature for 10 to 20 minutes (the TPA solid phase disappeared quickly after the temperature reached 220° C., indicating complete reaction). The material was poured out into a 300-mL beaker, and washed with several portions of petroleum ether which was added carefully with stirring. The supernatant liquid was decanted after each washing. The washed samples were then heated to 100° C. with stirring on a heating plate in a hood to remove all the solvent. The final product XIVa was light yellow viscous liquid. ICI viscosity: 2.4 Pa.s. at 50° C., and >10 Pa.s. at 25° C. Yield was 92.5%.

The diol polyester having the formula XIIIa was made by a procedure similar to that described in XIIIa for preparation of the non-aqueous dispersion. A second diol ester having the formula

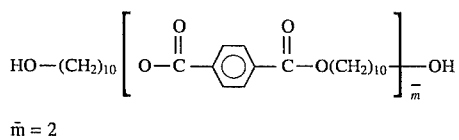

$\bar{m} = 2$ also was prepared for further preparation of a non-aqueous dispersions.

Preparation of Non-Aqueous Dispersions Using Reactive Diluent XIVa

Dispersion of Polyester XIIIa in Reactive Diluent XIVa 1.0 g polyester XIIIa + 1.0 g reactive diluent XIVa ⟶

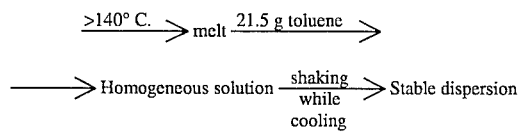

1.0 g of polyester XIIIa and 1.0 g reactive diluent XIVa were charged into a glass vial (uncovered) and heated on a Bunsen burner until the polyester XIIIa completely melted. 1.5 g toluene was added slowly, forming a homogeneous solution. The solution cooled down at room temperature with shaking (or with ultrasonication). Dispersion was gradually formed during cooling. This dispersion was very stable at room temperature and exhibited shear thinning and thixotropic behavior.

Dispersion of Polyester XIVb+Reactive Diluent XIVa 1.0 g polyester XIVb + 1.0 g reactive diluent agent

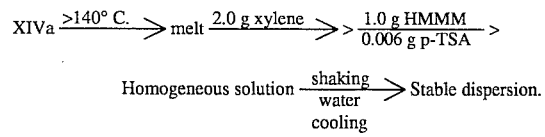

1.0 g of polyester XIVb and 1.0 g of reactive diluent XIVa were charged into a glass vial (uncovered) and heated on a Bunsen burner until the polyester completely melted. 2.0 g xylene was added slowly, forming a homogeneous solution. 1.0 g HMMM was then dissolved in the solution. The solution was well shaken while cooling down at room temperature. Dispersion was gradually formed during cooling. This dispersion was very stable at room temperature and exhibited shear thinning and thixotropic behavior.

Clear Coatings

Formulated coatings were prepared with similar procedure as described above. The formulated coatings were cast as films on a 1,000 Bonderite steel panel and baked in an oven at 150° C. for 30 minutes.

| Formulation 1: | |
|---|---|
| Polyester XIIIa | 1.0 g |
| Reactive diluent XIVa | 1.0 g |
| HMMM | 1.0 g |
| Toluene | 1.5 g |
| p-TSA | 0.006 g |
| Film properties: | |
| Tukon hardness | 10.0 KHN |
| Pencil hardness | 3H/4H |
| Reverse impact | 160 in-lbs. |
| Direct impact | 160 in-lbs. |
| Film thickness | 1.0 mil |
| Appearance | glossy, no defect |
| Formulation 2: | |
| Polyester XIIIa | 1.0 g |
| Reactive diluent XIVa | 1.5 g |
| HMMM | 1.5 g |
| Toluene | 1.5 g |
| p-TSA | 0.006 g |
| Film properties: | |
| Tukon hardness | 10.0 KHN |

-continued

| Pencil hardness | 3H/4H |
|---|---|
| Reverse impact | 120 in-lbs. |
| Direct impact | 160 in-lbs. |
| Film thickness | 1.0 mil |
| Appearance | glossy, no defect |
| Formulation 3: | |
| Polyester XIIIa | 1.5 g |
| Reactive diluent XIVa | 1.0 g |
| HMMM | 1.0 g |
| Toluene | 2.5 g |
| p-TSA | 0.006 g |
| Film properties: | |
| Tukon hardness | 12.0 KHN |
| Pencil hardness | 4H/5H |
| Reverse impact | 160 in-lbs. |
| Direct impact | 160 in-lbs. |
| Film thickness | 1.0 mil |
| Appearance | glossy, but poor leveling |
| Formulation 4 (cross-linked by polyisocyanate): | |
| Polyester XIIIa | 1.0 g |
| Reactive diluent XIVa | 1.5 g |
| Mondur CB-60 | 2.5 g |
| Toluene | 1.5 g |

| Film properties: | 150° C./ 30 min. | 90° C./ 2/hrs. |
|---|---|---|
| Tukon hardness | 18.0 KHN | 18.0 KHN |
| Pencil hardness | 4H/5H | 4H/5H |
| Reverse impact | 160 in-lbs. | 160 in-lbs. |
| Direct impact | 160 in-lbs. | 160 in-lbs. |
| Film thickness | 1.0 mil | 1.0 mil |
| Appearance | glossy, no defects | fuzzy-looking |

Pigmented Coatings

Polyester XIIIa and the reactive diluent XIVa were charged into a 300-mL aluminum can. The polyester was melted by heating on a Bunsen burner with care. Half of the calculated amount of toluene was added, followed by the HMMM and an AB dispersant, Elvacite AB-1040. While cooling down at room temperature, the ingredients were shook until the transparent material became a milky dispersion. A TiO$_2$ white pigment from du Pont, Tipure R-960, and p-TSA were added. The formulated coating was dispersed on a high speed dispersing mill for 30 minutes. The second half of the toluene was added during the dispersing. The formulated coating composition exhibited thixotropic behavior.

The formulated coating compositions were cast as a film on a 1,000 Bonderate steel panel and baked at 150° C. for 30 minutes (Formulation 1) or 10 minutes (Formulation 3, with more catalyst added).

| Formulation 1: | |
|---|---|
| Polyester XIIIa | 30.0 g |
| Reactive diluent XIIa | 30.0 g |
| HMMM | 30.0 g |
| Tipure R-960 | 48.0 g |
| Toluene | 90.0 g |
| p-TSA | 0.30 g |
| Elvacite AB-1040 | 3.60 g |
| Byk-020 (defoamer from Mallinckrodt) | 1 drop |
| Film properties: | |
| Tukon hardness | 10.0 KHN |
| Pencil hardness | 6H/7H |
| Reverse impact | 40 in-lbs. |
| Direct impact | 160 in-lbs. |
| Film thickness | 1.0 mil |
| Appearance | no evident defects, medium gloss |
| Formulation 2: | |
| Polyester XIIIa | 10.0 g |
| Reactive diluent XIIa | 20.0 g |
| HMMM | 15.0 g |
| Tipure R-960 | 22.5 g |
| Toluene | 45.0 g |
| p-TSA | 0.225 g |
| Elvacite AB-1040 | 3.38 g |
| Film properties: | |
| Tukon hardness | 10.0 KHN |
| Pencil hardness | 3H/4H |
| Reverse impact | 80 in-lbs. |
| Direct impact | 160 in-lbs. |
| Film thickness | 1.0 mil |
| Appearance | fairly glossy |

EXAMPLE XV

Nonaqueous Dispersion Coatings Using A Double Ring Cycloaliphatic Ester As A Reactive Diluent.

The LC-like polyester XIIIa of Example XIII having the structure:

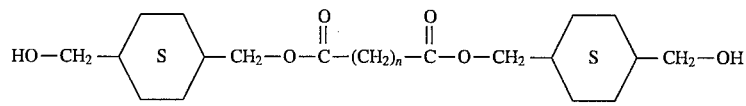

$\bar{m} = 2$ and a non-LC composition (K-Flex 188 commercially available from King Industry) having the structure:

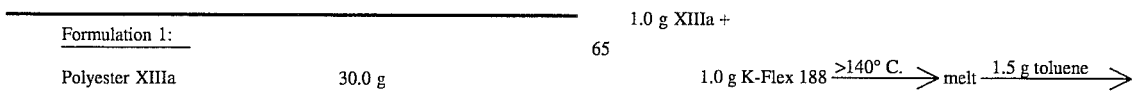

$\bar{n} = 5-7$ were made into nonaqueous conversion coating compositions and studied as described below.

Preparation of Nonaqueous Dispersion

Example 1

1.0 g XIIIa +

-continued

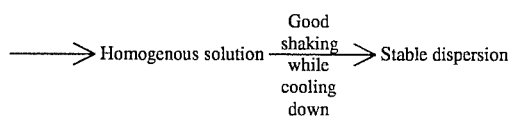

1.0 g XIIIa and 1.0 g K-Flex 188 were charged into a glass vial (uncovered) and heated on a Bunsen burner until XIIIa completely melted. 1.5 g toluene was added slowly, forming a homogenous solution. The solution was cooled at room temperature with good shaking (or with ultrasonication). Dispersion was gradually formed during cooling. After several weeks of storage, the dispersion separated into a dilute top phase and a concentrated bottom phase (no solid precipitates were observed); the solution returned to homogeneous dispersion after minor shaking or stirring. This dispersion was very stable at room temperature and no change was observed 3 months after preparation. The dispersion exhibited thixotropic behavior.

Example 2

1.0 g XIIIa + 1.0 g K-Flex 188 $\xrightarrow{>140°C.}$ melt $\xrightarrow{2.0 \text{ g xylene}}$ $\xrightarrow[0.006 \text{ g p-TSA}]{1.0 \text{ g Resimene 746}}$ Homo. solution $\xrightarrow[\text{on cooling}]{\text{Good shaking}}$ Stable dispersion 1.0 g XIIIa and 1.0 g K-Flex 188 were charged into a glass vial (uncovered) and heated on a Bunsen burner until the oligoester completely melted. 2.0 g xylene was added slowly, forming a homogenous solution. 1.0 g Resimene 746 was then dissolved in the solution. The solution was well shaken while cooling down at room temperature. Dispersion was gradually formed during cooling. This dispersion was very stable at room temperature and exhibited thixotropic behavior. No change was observed after 3 months except that the dispersion separated into a dilute top phase and a concentrated bottom phase; the phase separation disappeared after minor shaking or stirring.

Clear Coatings

A formulated coating composition was prepared with similar procedure as described above. It was cast film on a 1,000 Bonderate steel panel and baked in an over at 150° C. for 20 minutes (25° C. for 1 day and 70° C. for 2 h for Example 4).

Example 3

| Formulation: | Polyester XIIIa | 1.0 g |
| --- | --- | --- |
| | K-Flex 188 | 1.0 g |
| | Resimene 746 | 1.0 g |
| | Xylene | 1.5 g |
| | p-TSA | 0.006 g |
| Film properties: | Tukon hardness | 14.0 KHN |
| | Pencil hardness | 4H/5H |
| | Reverse impact | 160 in-lbs. |
| | Direct impact | 160 in-lbs. |
| | Film thickness | 1.0 mil |
| | Appearance | glossy, no defect |

Example 4

| Formulation: | Polyester XIIIa | 1.0 g |
| --- | --- | --- |
| | K-Flex 188 | 1.5 g |
| | Resimene 746 | 1.5 g |
| | Xylene | 1.5 g |
| | p-TSA | 0.006 g |
| Film properties: | Tukon hardness | 12.0 KHN |
| | Pencil hardness | 3H/4H |
| | Reverse impact | 160 in-lbs. |
| | Direct impact | 160 in-lbs. |
| | Film thickness | 1.0 mil |
| | Appearance | glossy, no defect |

Example 5

| Formulation: | Polyester XIIIa | 1.5 g |
| --- | --- | --- |
| | K-Flex 188 | 1.0 g |
| | Resimene 746 | 1.0 g |
| | Xylene | 2.5 g |
| | p-TSA | 0.006 g |
| Film properties: | Tukon hardness | 15.0 KHN |
| | Pencil hardness | 4H/5H |
| | Reverse impact | 120 in-lbs. |
| | Direct impact | 160 in-lbs. |
| | Film thickness | 1.0 mil |
| | Appearance | glossy, but poor leveling |

Example 6 (cross-linked by an isocyanate prepolymer)

| Formulation: | Polyester XIIIa | 1.0 g | |
| --- | --- | --- | --- |
| | K-Flex 188 | 1.5 g | |
| | Mondur CB-60 | 2.5 g | |
| | Dibutyltin dilaurate | 0.008 g | |
| | Toluene | 1.5 g | |
| | | 25° C./1 day | 70° C./2 hrs. |
| Film properties: | Tukon hardness | 16.0 KHN | 20.0 KHN |
| | Pencil hardness | 3H/4H | 4H/5H |
| | Reverse impact | 160 in-lbs. | 160 in-lbs. |
| | Direct impact | 160 in-lbs. | 160 in-lbs. |
| | Film thickness | 1.0 mil | 1.0 mil |
| | Appearance | glossy, no defect | fuzzy-looking |

Pigmented Coatings Cross-linked by HMMM

Polyester XIIIa and K-Flex 188 were charged into a 300 mL aluminum can and were melted by heating on a Bunsen burner with care. Half of the calculated amount of xylene was added, followed by Resimene 746 and Elvacite AB-1040. While cooling down in the atmosphere, the solution was kept shaking until the transparent material became a milky dispersion. Tipure R-960 and p-TSA were added. The coating composition was dispersed on a high speed dispersing mill for 30 minutes. The second half of the xylene was added during the dispersing. The formulated coating composition was very stable; no phase separation was observed after 3 months. The formulated coating composition exhibited thixotropic behavior.

The formulated coating compositions were cast film on a 1,000 Bonderate steel panel and baked at 150° C. for 20 minutes.

Example 7

| | | |
|---|---|---|
| Formulation: | Polyester XIIIa | 10.5 g |
| | K-Flex 188 | 10.0 g |
| | HMMM (Resimene 746) | 10.0 g |
| | TiO₂ White Pigment (Tipure R-960) | 15.0 g |
| | Xylene | 30.0 g |
| | p-TSA | 0.15 g |
| | Dispersant | 2.00 g |
| | (Elvacite AB-1040) | 2.00 g |
| | Defoamer (Byk-020) | 1 drop |
| Film properties: | Tukon hardness | 14.0 KHN |
| | Pencil hardness | 7H |
| | Reverse impact | 80 in-lbs. |
| | Direct impact | 160 in-lbs. |
| | Film thickness | 0.7 mil |
| | Appearance | med. gloss, some pinholing |

Example 8

| | | |
|---|---|---|
| Formulation: | Polyester XIIIa | 10.0 g |
| | K-Flex 188 | 20.0 g |
| | Resimene 746 | 15.0 g |
| | Tipure R-960 | 22.5 g |
| | Toluene | 40.0 g |
| | p-TSA | 0.23 g |
| | Elvacite AB-1040 | 3.38 g |
| | Byk-020 | 2 drops |
| Film properties: | Tukon hardness | 12.0 KHN |
| | Pencil hardness | 7H |
| | Reverse impact | 80 in-lbs. |
| | Direct impact | 160 in-lbs. |
| | Film thickness | 1.0 mil |
| | Appearance | glossy |

Pigmented Coatings Cross-linked by an Isocyanate Prepolymer.

Polyester XIIIa and K-Flex 188 were charged into a 300 mL aluminum can and were melted by heating on a Bunsen burner with care. Half of the calculated amount of toluene was added, followed by Mondur CB-60 and Elvacite AB-1040. While cooling down at room temperature, the solution was kept shaking until the transparent material became a milky dispersion. Tipure R-960, Byk-020, and dibutyltin dilaurate were added. The paint was dispersed on a high speed dispersing mill for minutes. The second half of the toluene was added during the dispersing. The formulated coating composition was very stable; no phase separation was observed. The formulated coating composition exhibited thixotropic behavior.

The formulated coating compositions were cast film on a 1,000 Bonderate steel panel and baked at 70° C. for 2 h.

Example 9

| | | |
|---|---|---|
| Formulation: | Polyester XIIIa | 10.0 g |
| | K-Flex 188 | 20.0 g |
| | Mondur CB-60 | 30.0 g |
| | Tipure R-960 | 22.5 g |
| | Toluene | 30.0 g |
| | p-TSA | 0.23 g |
| | Dibutyltin dilaurate | 0.18 g |
| | Elvacite AB-1040 | 3.00 g |
| | Byk-020 | 2 drops |
| Film properties: | Tukon hardness | 22.0 KHN |
| | Pencil hardness | 7H |
| | Reverse impact | 80 in-lbs. |
| | Direct impact | 160 in-lbs. |
| | Film thickness | 1.0 mil |
| | Appearance | fairly glossy |

EXAMPLE XVI

Properties as to viscosity, yield stress and sagging were studied as to the following compounds—

A LC-like Composition (a) having the formula

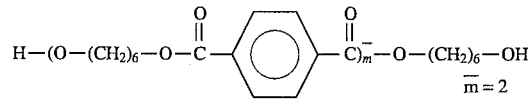

$$\overline{m} = 2$$

which was previously described in connection with polyester VC of Example V;

A LC-like Composition (b) having the formula

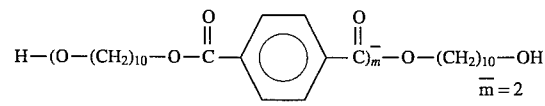

$$\overline{m} = 2$$

which was previously described in connection with polyester VC of Example V;

A LC-like Composition (c) having the formula

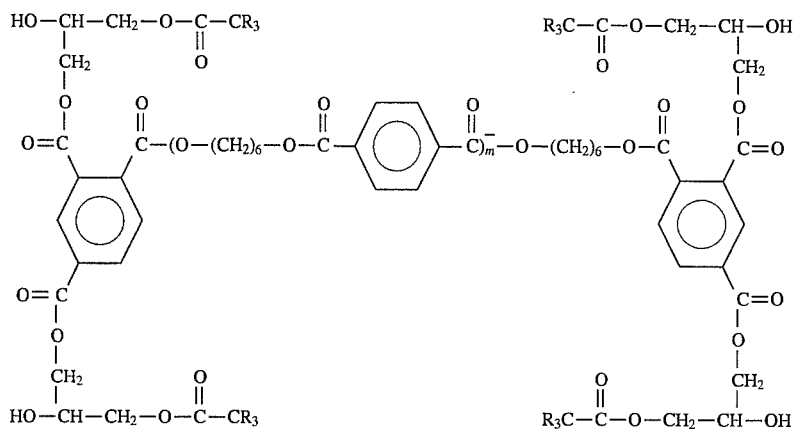

and which was previously described in connection with polyester VIIF;

A nonliquid crystalline Composition (d) having the formula

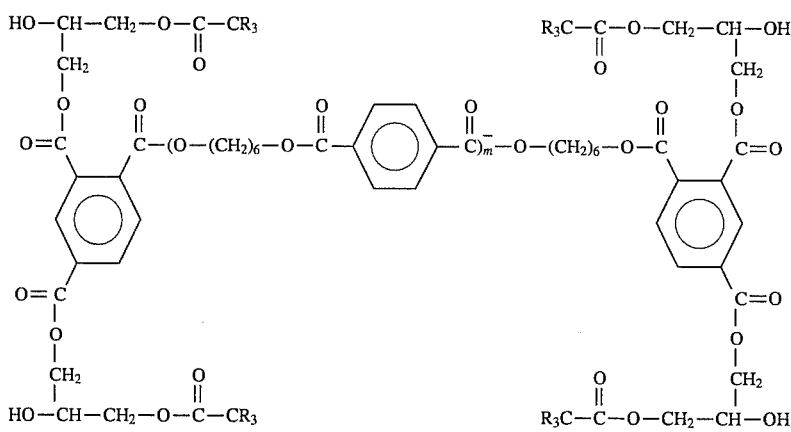

which was generally described in connection with polyester XIII C;

A LC-like Composition (e) having the formula

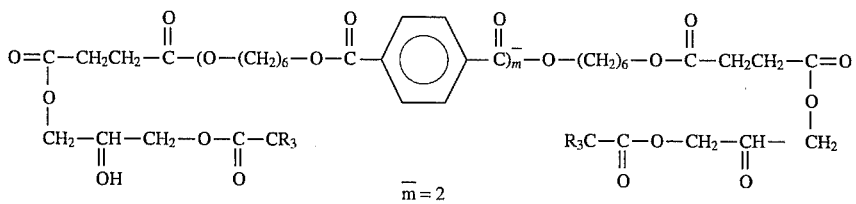

which composition was generally described in Example V.

A nonliquid crystalline Composition (f) having the general formula

which was generally described in Example XIV; and

A nonliquid crystalline Composition (g) K-Flex 188 (non-LC; commercial product from King Industry) which has the general formula

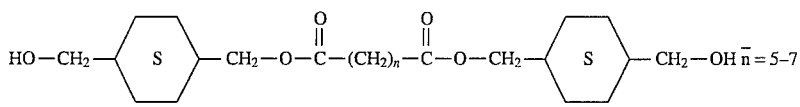

and

A nonliquid crystalline Composition (h) which has the general formula

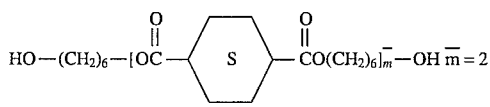

Temperature Dependence of the Viscosity of the LC-Like Oligomers

The viscosity of the LC polymers was determined with an ICI viscometer at several temperatures from 25° to 150° C. For thixotropic samples, the steady viscosity was recorded. Tables 6–9 show the viscosity vs. temperature for several LC polymers.

TABLE 6

Viscosity vs. Temperature for Composition (a)

| Temperature (°C.) | 25 | 50 | 75 | 100 | 125 | 150 |
|---|---|---|---|---|---|---|
| Viscosity (poise) (heating) | | 1.25 | 1.00 | 0.45 | 0.85 | 0.45 |
| Viscosity (poise) (cooling) | | 0.70 | 0.20 | 1.40 | 0.82 | 0.45 |

TABLE 7

Viscosity vs. Temperature for Composition (b)

| Temperature (°C.) | 50 | 75 | 100 | (115)* | 125 | 150 |
|---|---|---|---|---|---|---|
| Viscosity (poise) (heating) | >100 | 1.5 | 0.4 | 46.0 | 2.5 | 1.2 |
| Viscosity (poise) (cooling) | >100 | 1.5 | 0.6 | 12.0 | 2.5 | 1.1 |

*Estimated temperature.

TABLE 8

Viscosity vs. Temperature for Composition (c)

| Temperature (°C.) | 25 | 50 | 75 | 100 | 125 | 150 |
|---|---|---|---|---|---|---|
| Viscosity (poise) (heating) | >100 | 34.0 | >100 | 29.5 | 7.5 | 1.5 |
| Viscosity (poise) (cooling) | >100 | 89.5 | >100 | 36.5 | 9.0 | 1.5 |

TABLE 9

Viscosity vs. Temperature for Composition (e)

| Temperature (°C.) | 25 | 50 | (65)* | 75 | 100 | 125 |
|---|---|---|---|---|---|---|
| Viscosity (poise) (heating) | >100 | 12.0 | | 15.5 | 2.0 | 0.2 |
| Viscosity (poise) (cooling) | 45 | 2.0 | 57.0 | 16.2 | 2.5 | 0.1 |

TABLE 9-continued

Viscosity vs. Temperature for Composition (e)

*Estimated temperature.

It is seen from Tables 6–7 of this Example that for the LC-like polyesters the viscosity first decreases and then increases with increasing temperature until a maximum. While not intending to be bound by any theory, the unusual rheological behavior has been explained as follows. In the LC state, the polymers are oriented and may exhibit much lower viscosity than nonoriented polymers. With increase of temperature, the polymers become isotropic and the viscosity increases dramatically. On the other hand, there is a general tendency for the viscosity of polymers to decrease upon increasing temperature due to thermal motion. The results of these competing effects lead to a maxima viscosity upon increasing temperature. Alternate explanations, however, are possible.

The LC-like polymers of the invention were compared with the non-LC counterparts. The viscosity of several non-LC polymers with similar structures to the LC-like polymers of the invention was measured. Tables 10 and 11 of this Example show the temperature dependence of Composition (d) and Composition (h) (non-LC counterparts of Composition (c) and Composition (a) respectively). It is seen that the viscosity decreases steadily with increasing temperature, in contrast to the unusual viscosity behavior of the LC-like polymers.

TABLE 10

Viscosity vs. Temperature for Composition (d) (non-LC)

| Temperature (°C.) | 25 | 50 | 75 | 100 | 125 | 150 |
|---|---|---|---|---|---|---|
| Viscosity (poise) (heating) | >100 | >100 | >100 | 29.0 | 7.5 | 1.5 |
| Viscosity (poise) (cooling) | >100 | >100 | >100 | 28.0 | 5.4 | 1.8 |

TABLE 11

Viscosity vs. Temperature for Composition (h) (non-LC)

| Temperature (°C.) | 25 | 50 | 75 | 100 | 125 | 150 |
|---|---|---|---|---|---|---|
| Viscosity (poise) (heating) | >100 | 24.5 | 2.2 | 0.5 | 0.1 | 0.1 |
| Viscosity (poise) (cooling) | >100 | 28.5 | 2.4 | 0.5 | 0.1 | 0.1 |

Thixotropic Behavior of LC-Like Polymers

Table 12 of this Example shows the time dependence of the ICI viscosity of Composition (c) at different temperatures. The viscosity in the LC-like region (around 50° C.) decreases with time to a steady value, indicating thixotropic properties of the LC-like polymers. The viscosity decrease is possibly due to break-up of certain structure (possibly LC association) with time.

TABLE 12

Viscosity vs. Shear Time of Composition (c) at Different Temperature.

| Temperature (°C.) | Visc. (poise)/Shearing Time (second) | | | |
|---|---|---|---|---|
| 25 | >100/0 | >100/30 | — | — |
| 50 | >100/0 | 30/26 | 20/60 | 20/120 |
| 75 | >100/0 | 100/30 | — | — |
| 100 | 48/0 | 48/30 | 48/60 | 48/120 |
| 125 | 13/0 | 13/30 | 13/60 | 13/120 |
| 150 | 4/0 | 4/30 | 4/60 | 4/120 |

Yield Stress of LC-Like Polymers

The yield stress was determined by measuring the relative flow distance of the polymers at different temperatures. 0.2 g of sample was placed on an aluminum panel sitting at 45° angle and the flow distance of the oligomers after 10 minutes was recorded.

TABLE 13

Flow Distance of Composition (c) At Different Temperatures

| Temperature (°C.) | 25 | 50 | 60 | 90 | 150 |
|---|---|---|---|---|---|
| Flow distance (cm)/10 min. | 0.0 | 0.0 | 6.4 | 6.0 | 9.5 |

Table 12 of this Example shows the flow distance of Composition (c) after 10 minutes at different temperatures. Although the polymer is viscous liquid or semi-solid at room temperature, no flow was observed up to 50° C., indicating yield stress of the polymer below about 50° C. At 60° C. and above, Composition (c) flowed, indicating zero yield stress. Since the transition temperature of Composition (c) is 43.0 ($T_m$) and 59.0° C. ($T_c$) (FIG. 4), the flow distance data suggest that the yield stress is possibly due to LC association.

Sagging Resistance of Coatings Formulated from LC-Like Polymers.

Testing Methods

The method of ASTM 4400 was used except that an aluminum panel instead of a chart was used because of higher baking temperature. The sample was cast on an aluminum panel using Leneta anti-sag meter (The Leneta Company), and the panel was set 90° to the horizontal direction at the testing temperature for a designated time (such as 20 minutes). The thickness of the thickest unsagged strip was recorded as the anti-sagging value.

Sagging Resistance of Solvent Coatings at Elevated Temperature

Example 1 (LC)

| Formulation: | Composition (c) | 2.5 g |
|---|---|---|
| | HMMM (Resimene 746) | 0.5 g |
| | Para toluene Sulfonic acid (p-TSA) | 0.006 g |
| | Xylene | 2.0 g |

-continued

| | p-TSA | 0.006 g |
|---|---|---|

Baking conditions: 150° C. for 20 minutes.
Sagging Resistance: 6 mil.
Appearance of coating: glossy.

Example 2 (Non-LC counterpart of Example 1)

| Formulation: | Composition (d) | 2.5 g |
|---|---|---|
| | Resimene 746 | 0.5 g |
| | p-TSA | 0.006 g |
| | Xylene | 2.0 g |

Baking condition: 150° C. for 20 minutes.
Sagging Resistance: 3 mil.
Appearance of coating: glossy.

Example 3 (LC)

| Formulation: | Composition (e) | 2.0 g |
|---|---|---|
| | Resimene 746 | 1.0 g |
| | p-TSA | 0.006 g |
| | Xylene | 2.0 g |

Baking condition: 150° C. for 20 minutes.
Sagging Resistance: 10 mil.
Appearance of coating: glossy.

Example 4 (LC)

| Formulation: | Composition (c) | 1.5 g |
|---|---|---|
| | Polyisocyanate based upon toluene diisocyanate blocked with ε-Caprolactam (Desmodur BL-1185A from Mobay Corporation) | 1.9 g |
| | Dibutyltin dilaurate | 0.007 g |
| | Toluene | 1.0 g |

Curing condition: 70° C. for 1 h.
Sagging Resistance: 12 mil.
Appearance of coating: glossy.

Sagging Resistance of Solvent Coatings at Room Temperature

Example 5 (LC)

| Formulation: | Composition (c) | 2.5 g |
|---|---|---|
| | Mondur CB-60 | 1.6 g |
| | Dibutyltin dilaurate | 0.008 g |
| | Toluene | 2.0 g |

Curing condition: room temperature for 1 day.
Sagging Resistance: 10 mil.
Appearance of coating: glossy.

Example 6 (Non-LC) counterpart of Example 4

| Formulation: | Composition (c) | 2.5 g |
|---|---|---|
| | Mondur CB-60 | 1.6 g |
| | Dibutyltin dilaurate | 0.008 g |
| | Toluene | 2.0 g |

Curing condition: room temperature for 1 day.
Sagging Resistance: <3 mil.
Appearance of coating: glossy.

Sagging Resistance of LC-Like Nonaqueous Dispersion Coatings at Elevated Temperature

Example 7 (LC)

| Formulation: | Composition (a) | 1.0 g |
|---|---|---|
| | Composition (f) | 1.0 g |
| | Resimene 746 | 1.0 g |
| | p-TSA | 0.006 g |
| | Xylene | 1.5 g |

Baking condition: 150° C. for 20 minutes.
Sagging Resistance: 12 mil.
Appearance of coating: glossy.

Example 8 (Non-LC)

| Formulation: | Composition (f) | 2.0 g |
|---|---|---|
| | Resimene 746 | 1.0 g |
| | p-TSA | 0.006 g |
| | Xylene | 2.0 g |

Baking condition: 150° C. for 20 minutes.
Sagging Resistance: <3 mil.
Appearance of coating: glossy.

Example 9 (LC)

| Formulation: | Composition (a) | 1.0 g |
|---|---|---|
| | Composition (g) (K-Flex 188) | 1.0 g |
| | Resimene 746 | 1.0 g |
| | p-TSA | 0.006 g |
| | Xylene | 1.5 g |

Baking condition: 150° C. for 20 minutes.
Sagging Resistance: 12 mil.
Appearance of coating: glossy.

Example 9 (Non-LC counterpart of Example 9)

| Formulation: | Composition (g) (K-Flex 188) | 2.0 g |
|---|---|---|
| | Resimene 746 | 1.0 g |
| | p-TSA | 0.006 g |
| | Xylene | 2.0 g |

Baking condition: 150° C. for 20 minutes.
Sagging Resistance: <3 mil.
Appearance of coating: glossy.

Sagging Resistance of Nonaqueous LC-Like Dispersion Coatings Cured at Room Temperature

Example 11 (LC)

| Formulation: | Composition (a) | 1.0 g |
|---|---|---|
| | Composition (f) | 1.5 g |
| | Dibutyltin dilaurate | 0.008 g |
| | Mondur CB-60 | 2.5 g |
| | Toluene | 1.5 g |

Curing condition: room temperature for 1 day.
Sagging Resistance: 12 mil.
Appearance of coating: fairly glossy.

Example 12 (Non-LC counterpart of Example 18)

| Formulation: | Composition (f) | 2.5 g |
|---|---|---|
| | Mondur CB-60 | 2.5 g |
| | Dibutyltin dilaurate | 0.008 g |
| | Toluene | 2.0 g |

Curing condition: room temperature for 1 day.
Sagging Resistance: <3 mil.
Appearance of coating: glossy.

Example 13 (LC)

| Formulation: | Composition (a) | 1.3 g |
|---|---|---|
| | Composition (g) (K-Flex 188) | 1.2 g |
| | Dibutyltin dilaurate | 0.008 g |
| | Mondur CB-60 | 2.5 g |
| | Toluene | 1.5 g |

Curing condition: room temperature for 1 day.
Sagging Resistance: 10 mil.
Appearance of coating: fairly glossy.

Example 14 Non-LC counterpart of Example 20)

| Formulation: | Composition (g) (K-Flex 188) | 2.5 g |
|---|---|---|
| | Mondur CB-60 | 2.5 g |
| | Dibutyltin dilaurate | 0.008 g |
| | Toluene | 2.0 g |

Curing condition: room temperature for 1 day.
Sagging Resistance: <3 mil.
Appearance of coating: glossy.

Improved Sag Resistance of Composition (c) (Soluble LC-Like) Coatings with Addition of Composition (a) (Insoluble LC)

Example 15 (Soluble LC, the same as Example 1)

| Formulation: | Composition (c) | 2.5 g |
|---|---|---|
| | Resimene 746 | 0.5 g |
| | p-TSA | 0.006 g |
| | Xylene | 2.0 g |

Baking condition: 150° C. for 20 minutes.
Sagging Resistance: 6 mil.
Appearance of coating: glossy.

Example 16 (Addition of Composition (a) into Composition (c))

| Formulation: | Composition (c) | 1.8 g |
|---|---|---|
| | Composition (a) | 0.2 g |
| | Resimene 746 | 1.0 g |
| | p-TSA | 0.006 g |
| | Xylene | 2.0 g |

Baking condition: 150° C. for 20 minutes.
Sagging Resistance: 8 mil.
Appearance of coating: glossy.

Example 17 (Addition of Composition (a) into Composition (c))

| Formulation: | Composition (c) | 1.2 g |
|---|---|---|
| | Composition (a) | 0.8 g |
| | Resimene 746 | 1.0 g |
| | p-TSA | 0.006 g |
| | Xylene | 2.0 g |

Baking condition: 150° C. for 20 minutes.
Sagging Resistance: 12 mil.
Appearance of coating: glossy.

Sagging Resistance of Pigmented Coatings at Elevated Temperature

Example 18 (LC)

| Formulation: | Composition (c) | 30.0 g |
|---|---|---|
| | Resimene 746 | 15.0 g |
| | TiO$_2$ White Pigment (Tipure R-960 from du Pont) | 22.5 g |
| | p-TSA | 0.23 g |
| | Xylene | 40.0 g |
| | Dispersant (Elvacite AB-1040) | 3.4 g |
| | Defoamer (Byk-020) | 2 drops |

Baking condition: 150° C. for 20 minutes.
Sagging Resistance: 10 mil.
Appearance of coating: glossy.

Example 19 (LC)

| Formulation: | Composition (c) | 20.0 g |
|---|---|---|
| | Resimene 746 | 10.0 g |
| | Tipure R-960 | 26.7 g |
| | p-TSA | 0.17 g |
| | Toluene | 40.0 g |
| | Elvacite AB-1040 | 2.0 g |
| | Byk-020 | 1 drop |

Baking condition: 150° C. for 20 minutes.
Sagging Resistance: 12 mil.
Appearance of coating: fairly glossy.

Example 20 (LC)

| Formulation: | Composition (a) | 30.0 g |
|---|---|---|
| | Composition (f) | 40.00 g |
| | Resimene 746 | 30.00 g |
| | Tipure R-960 | 48.0 g |
| | p-TSA | 0.03 |
| | Xylene | 90.0 g |
| | Elvacite AB-1040 | 3.6 g |
| | Byk-020 | 1 drop |

Baking condition: 150° C. for 20 minutes.
Sagging Resistance: 12 mil.
Appearance of coating: fairly glossy.

Example 21 (LC)

| Formulation: | Composition (a) | 10.03 g |
|---|---|---|
| | Composition (g) (K-Flex 188) | 20.0 g |
| | Resimene 746 | 10.00 g |
| | Tipure R-960 | 15.00 g |
| | p-TSA | 0.15 a |
| | Xylene | 30.0 g |
| | Elvacite AB-1040 | 2.0 g |

Baking condition: 150° C. for 30 minutes.
Sagging Resistance: 12 mil.
Appearance of coating: fairly glossy.

Sagging Resistance of Pigmented Coatings at Lower or Room Temperature

Example 22 (LC)

| Formulation: | Composition (c) | 16.0 g |
|---|---|---|
| | Mondur CB-60 | 14.0 g |
| | Dibutyltin dilaurate | 0.05 g |
| | Tipure R-960 | 20.0 g |
| | Toluene | 20.0 g |
| | Elvacite AB-1040 | 1.4 g |
| | Byk-020 | 1 drop |

Curing condition: room temperature for 1 day.
Sagging Resistance: 12 mil.
Appearance of coating: glossy.

Example 23 (LC)

| Formulation: | Composition (e) | 26.3 g |
|---|---|---|
| | Mondur CB-60 | 22.6 g |
| | Dibutyltin dilaurate | 0.18 g |
| | Tipure R-960 | 39.2 g |
| | Toluene | 60.0 g |
| | Elvacite AB-1040 | 3.0 g. |
| | Byk-020 | 1 drop |

Curing condition: room temperature for 1 day.
Sagging Resistance: 12 mil.
Appearance of coating: glossy.

Example 24 (LC)

| Formulation: | Composition (a) | 5.0 g |
|---|---|---|

-continued

| | | |
|---|---|---|
| Composition (f) | 10.0 g | |
| Mondur CB-60 | 15.0 g | |
| Dibutyltin dilaurate | 0.05 g | |
| Tipure R-960 | 20.0 g | |
| Toluene | 20.0 g | |
| Elvacite AB-1040 | 1.4 g. | |
| Byk-020 | 1 drop | |

Curing condition: 70° C. for 12 h.
Sagging Resistance: 12 mil.
Appearance of coating: glossy.

Although the invention has been described with regard to its preferred embodiments, it should be understood that various changes and modifications as would be obvious to one having the ordinary skill in this art may be made without departing from the scope of the invention which is set forth in the claims appended hereto.

EXAMPLE XVII

Synthesis of water reducible oligoester derived from dimethylterephthalate with decanediol; coating formulation.

| | Weight used, g | Mole ratio |
|---|---|---|
| Step 1. | | |
| Decanediol | 130.0 | 1.5 |
| Dimethylterephthalate | 97.0 | 1.5 |
| Zinc acetate | 0.456 | 0.2% total weight |
| Step 2. | | |
| Oligoester (from step 1) | 65.0 | 1 |
| Trimellitic anhydride (TMA) | 3.46 | 0.3 |
| Butyl Cellosolve | 13.7 | — |
| Dimethylethanolamine | 6.0 | — |
| Water | 67.06 | — |

Step 1: Into a 0.5-L three-neck flask equipped with stirrer, condenser, Dean-Stark trap, thermometer and $N_2$ gas inlet tube were placed the materials of Step 1. The reaction mixture was stirred and heated under $N_2$ to 150° C. and then kept at this temperature for 1 hour. $CH_3OH$ was removed by distillation. After 1 hour the temperature was increased to 230° C.; 90% of theoretical amount of $CH_3OH$ was collected in the Dean-Stark strap during 5 hours. The reaction material was cooled to about 90° C. and toluene was added. The hot solution was poured into the beaker and cooled to 25° C.; the precipitate which separated was collected, dissolved in $CH_2Cl_2$, reprecipitated by addition of $CH_3OH$, and washed with $CH_3OH$. The solid was collected and dried in oven at 120° C. overnight; yield was about 78%.

Step 2. The solid from Step 1 was placed in to 250-mL three-neck flask equipped with stirrer, condenser, thermometer and $N_2$ gas inlet tube. The oligoester was heated to about 175° C. and $N_2$ gas flow, and TMA was added. The reaction mixture had an acid number of about 50 mg KOH/g. The resulting oligomer was stirred at 170°–180° C. for about 30 minutes and cooled to 130° C. Dimethylethanolamine (2 eq. per mole of trimellitic anhydride) was added at 130° C. and then butyl cellosolve was added. The mixture was stirred at 90°–100° C. for 0.5 hour, and water was added to produce an aqueous dispersion which was used without purification; NVW was determined after 2 hours drying at 120° C.

Coating formulation: The enamel binder was formulated at an oligoester/HMMM/P-TSA weight ratio of 70/30/0.3 and was pigmented at a pigment/binder ratio 0.7 with a $TiO_2$ pigment. Dow Corning paint additive 57# and BYK 020 were used at 0.1% of total paint weight to prevent foaming, and help leveling and DuPont Elvacite $AB^+$ dispersant (2% of pigment weight) was used to help stabilize the $TiO_2$. The solvent used in the paint formulation was butyl cellosolve and water. Pigment dispersion was performed on a high speed disk disperser. But the final grind corresponded to a Hegman value of about 4. The paint exhibited a thixotropic nature.

Coatings properties: The coating was drawn down with a wire-wound bar on steel panels and was baked for 20 minutes at 175° C. The baked coatings had discernable ridges and valleys. Poor leveling was attributed to the thixotropic rheology of the liquid coating. The cured coating had the following film properties.

| | |
|---|---|
| Reverse impact resistance, in-lb | 160 |
| Hardness, Knoop | 28 |
| Solvent resistance, acetone double rubs | 200 |

EXAMPLE XVIII

Rheological Behavior Study On LC-Like Oligomers.

The six compositions studied were:
1. "K-Flex" 188, a commercial reactive diluent sold by King Industries. It is an isotropic liquid. (See Table I)
2. "Resimene 747" a monomeric HMMM type melamine resin sold by Monsanto. It is also isotropic. (See Table II)
3. A blend of 10 GT (decanediol terephthalate Composition (b), $\overline{m}=2$), as described in Examples XVI and V, with K188 (50/50 w/w). This is a blend of LC-like 10GT with isotropic K188. (See Table III)
4. A blend of 10 GT, K188, and R-747 (1/1/1 w/w/w). This blend is a complete 100% solids coatings binder that would cure if baked high enough. The catalyst normally used was left out to prevent reaction in the rheometer. (See Table IV)
5. A blend of 6 GT (hexanediol terephthalate, Composition (a), $\overline{m}=2$), as described in Examples XVI and V, K188, and R-747 (1/1/1 w/w/w). (See Table V)
6. A blend of 6 GT with K188 (50/50 w/w). (See Table VI)

Instrument: HAAKE Viscometers-Rotovisco RV 100 (HAAKE Mess-Technik GmbH u. Co., Germany) was used in this study. The temperature was at the range of 25° C. to 125° C. The shear rate was at the range of 252 $s^{-1}$ to 25200 $s^{-1}$. HAAKE viscometer could not measure high viscosity at very high shear rate. This is a limitation of HAAKE viscometer. The viscosities measured by HAAKE viscometer were tabulated below.

TABLE I

Viscosities of K188 at a variety of temperatures.

| Shear Rate | Viscosity (Pa*s) | | | | |
|---|---|---|---|---|---|
| (s − 1) | T = 114.6° C. | T = 88.9° C. | T = 68.1° C. | T = 56.7° C. | T = 25.8° C. |
| 25200 | 0.05 | 0.08 | 0.21 | * | * |
| 22680 | 0.04 | 0.08 | 0.22 | * | * |
| 20160 | 0.04 | 0.08 | 0.22 | * | * |
| 17640 | 0.04 | 0.08 | 0.22 | * | * |
| 15120 | 0.05 | 0.08 | 0.22 | * | * |
| 12600 | 0.06 | 0.08 | 0.23 | 0.41 | * |
| 11340 | 0.07 | 0.08 | 0.21 | 0.42 | * |
| 10080 | 0.07 | 0.08 | 0.24 | 0.42 | * |
| 6300 | 0.07 | 0.08 | | 0.43 | * |
| 5040 | 0.08 | 0.09 | 0.22 | | 0.71 |
| 2520 | 0.10 | 0.08 | | 0.57 | 1.02 |
| 2268 | 0.11 | | | 0.60 | 1.42 |
| 2016 | | | 0.23 | 0.57 | 1.44 |
| 1613 | | 0.17 | 0.25 | | |
| 1411 | | 0.57 | 0.23 | | |

*The viscosity is too high to be measurable by HAAKE viscometer.

TABLE II

The viscosities of Resimene 747 at a variety of temperatures.

| Shear Rate | Viscosity (Pa*s) | | | |
|---|---|---|---|---|
| (s$^{-1}$) | T = 110.2° C. | T = 88.4° C. | T = 56.6° C. | T = 25.7° C. |
| 25200 | 0.03 | 0.05 | 0.18 | * |
| 22680 | 0.03 | 0.05 | 0.18 | * |
| 20160 | 0.03 | 0.05 | 0.18 | * |
| 17640 | 0.02 | 0.05 | 0.18 | * |
| 15120 | 0.02 | 0.05 | 0.18 | * |
| 12600 | 0.03 | 0.05 | 0.20 | * |
| 11340 | 0.04 | 0.05 | 0.21 | * |
| 10080 | 0.04 | | 0.21 | * |
| 8820 | 0.04 | 0.05 | 0.21 | * |
| 7560 | 0.04 | 0.05 | 0.22 | * |
| 6300 | 0.04 | | 0.22 | * |
| 5040 | | 0.05 | 0.23 | 1.07 |
| 4536 | | 0.05 | 0.22 | 1.06 |
| 4032 | | 0.04 | 0.21 | 1.04 |
| 3780 | 0.05 | | | |
| 3528 | | | 0.21 | 0.99 |
| 3402 | 0.05 | | | |
| 3024 | 0.05 | 0.04 | 0.20 | 0.99 |
| 2646 | 0.05 | | | |
| 2268 | 0.04 | | | |
| 1890 | 0.04 | | | |

*The viscosity is too high to be measurable by HAAKE viscometer.

TABLE III

The viscosities of 10GT blended with K188 (ratio 1:1 by weight).

| Shear Rate | Viscosity (Pa*s) | | | | | |
|---|---|---|---|---|---|---|
| (s$^{-1}$) | T = 114.8° C. | T = 102.7° C. | T = 94.4° C. | T = 90° C. | T = 88.4° C. | T = 83.3° C. |
| 25200 | 0.05 | 0.10 | 0.12 | * | 0.17 | * |
| 22680 | 0.06 | 0.10 | 0.12 | 0.26 | 0.17 | * |
| 21420 | | | | 0.26 | | * |
| 20160 | 0.06 | 0.10 | 0.12 | 0.28 | 0.18 | * |
| 17640 | 0.06 | 0.10 | 0.13 | 0.29 | 0.18 | * |
| 15120 | 0.06 | 0.10 | 0.13 | 0.30 | 0.19 | * |
| 12600 | 0.07 | 0.11 | 0.15 | 0.32 | 0.31 | * |
| 11340 | 0.07 | 0.11 | 0.16 | 0.33 | 0.32 | * |
| 10080 | 0.07 | 0.12 | 0.16 | 0.35 | 0.33 | * |
| 8820 | 0.08 | 0.12 | 0.17 | 0.36 | 0.34 | * |
| 7560 | 0.08 | 0.13 | 0.18 | 0.39 | 0.36 | 0.73 |
| 6300 | 0.07 | 0.14 | 0.19 | 0.41 | 0.37 | 0.85 |
| 5040 | 0.08 | 0.16 | 0.23 | 0.52 | 0.59 | 1.01 |
| 4536 | 0.07 | 0.16 | 0.24 | 0.56 | 0.61 | 1.08 |
| 4032 | 0.06 | 0.17 | 0.25 | 0.60 | 0.64 | 1.14 |
| 3528 | 0.06 | 0.17 | 0.25 | 0.63 | 0.68 | 1.23 |
| 3024 | 0.06 | 0.18 | 0.27 | 0.68 | 0.73 | 1.31 |
| 2016 | 0.11 | 0.27 | 0.37 | 0.91 | 1.24 | 1.64 |
| 1814 | 0.09 | 0.28 | 0.38 | 0.95 | 1.30 | 1.65 |

TABLE III-continued

| | The viscosities of 10GT blended with K188 (ratio 1:1 by weight). | | | | | |
|---|---|---|---|---|---|---|
| Shear Rate | Viscosity (Pa*s) | | | | | |
| ($s^{-1}$) | T = 114.8° C. | T = 102.7° C. | T = 94.4° C. | T = 90° C. | T = 88.4° C. | T = 83.3° C. |
| 1613 | 0.09 | 0.30 | 0.38 | 0.96 | 1.33 | 1.64 |
| 1411 | 0.09 | 0.32 | 0.39 | 1.02 | 1.38 | 1.63 |
| 1209 | 0.09 | 0.35 | 0.38 | 0.75 | 1.42 | 1.61 |

*The viscosity is too high to be measurable by HAAKE viscometer.

From Table III above, the high-shear viscosities at 88° C. were lower than those at 90° C. The temperature of 88 degrees was the transition temperature from one phase to another phase. This phenomenon is LC-like behavior. The material is shear thinning at temperatures of 102.7° C. and below, but is virtually Newtonian at 114.8° C.

TABLE IV

| | The viscosities of 10GT blended with K188 and Resimene 747 (Ratio 1:1:1 by weight). | | | | | | |
|---|---|---|---|---|---|---|---|
| Shear | Viscosity (Pa*s) | | | | | | |
| Rate ($s^{-1}$) | T = 120.4° C. | T = 92.1° C. | T = 86.0° C. | T = 80.0° C. | T = 74.0° C. | T = 63.4° C. | T = 55.5° C. |
| 25200 | 0.08 | * | * | * | * | * | * |
| 22680 | 0.07 | * | * | * | * | * | * |
| 20160 | 0.08 | * | * | * | * | * | * |
| 17640 | 0.08 | 0.29 | * | * | * | * | * |
| 16380 | | 0.31 | * | * | * | * | * |
| 15120 | 0.09 | 0.29 | 0.35 | * | * | * | * |
| 14742 | | 0.31 | | * | * | * | * |
| 13104 | | 0.30 | | * | * | * | * |
| 12600 | 0.08 | | 0.40 | * | * | * | * |
| 11466 | | 0.30 | | * | * | * | * |
| 11340 | 0.08 | | 0.39 | * | * | * | * |
| 10080 | 0.08 | | 0.39 | 0.55 | * | * | * |
| 9828 | | 0.29 | | | * | * | * |
| 8820 | 0.08 | | 0.38 | 0.54 | * | * | * |
| 8190 | | 0.28 | | | * | * | * |
| 7560 | 0.08 | | 0.36 | 0.52 | 0.67 | * | * |
| 6300 | 0.08 | | 0.35 | 0.49 | 0.62 | * | * |
| 5040 | 0.09 | 0.34 | 0.41 | 0.59 | 0.71 | 1.08 | * |
| 4536 | 0.09 | 0.34 | 0.40 | 0.57 | 0.70 | 1.06 | * |
| 4032 | 0.10 | 0.33 | 0.40 | 0.57 | 0.68 | 1.03 | * |
| 3528 | 0.10 | 0.32 | 0.37 | 0.54 | 0.65 | 0.98 | * |
| 3024 | 0.11 | 0.32 | 0.36 | 0.49 | 0.61 | 0.91 | * |
| 2520 | | | | 0.48 | 0.73 | | * |
| 2268 | | | | 0.46 | 0.71 | | * |
| 2016 | 0.11 | 0.74 | 0.46 | 0.58 | 0.65 | 1.14 | 1.57 |
| 1814 | 0.11 | 0.73 | | 0.57 | | 1.39 | 1.96 |
| 1764 | | | 0.59 | | 0.62 | | |
| 1613 | 0.12 | 0.75 | | 0.53 | | 1.35 | 1.92 |
| 1411 | 0.12 | 0.77 | | 0.51 | | 1.30 | 1.87 |
| 1209 | 0.13 | 0.76 | | 0.47 | | 1.23 | 1.76 |

*The viscosity is too high to be measurable by HAAKE viscometer.

A dispersion of 10 GT in K188 and R747 contains all the elements of a solventless coating binder. As shown in Table IV, such a dispersion exhibits shear thinning at temperatures (86°–92° C.) near the phase transition temperatures of 10 GT. At higher temperatures (120° C.) shear thinning is less pronounced, and at lower temperatures (74°–80° C.) the dispersions appear to have approximately Newtonian rheology. Further, at low shear rates (less than about 2100 sec$^{-1}$) the dispersion exhibits a trough in its viscosity-temperature curve, the viscosity increasing from 0.47 Pa.s to 0.76 Pa.s when the dispersion is heated from 80° to 92° C. Thus the unusual rheological characteristics of 10 GT persist even when the dispersion is diluted with Newtonian cross-linker and reactive diluent. These characteristics indicate that the dispersion could be applied as a solventless coating at temperatures of 74° to 80° C. with commercial equipment capable of applying coatings at viscosities in the range of 0.5–0.7 Pa.s and would resist sagging when heated at least to 92° C. Alternatively, it could be applied at 92° C. with equipment capable of applying coatings at a viscosity of about 0.3 Pa.s at shear rates above about 3,000 sec$^{-1}$ and would resist sagging because of its shear thinning characteristics. Thus the unusual rheological characteristics are exemplified in the following Tables.

TABLE V

The viscosities of 6GT blended with R747 and K188 (ratio 1:1:1 by weight).

| Shear Rate ($s^{-1}$) | Viscosity (Pa*s) | | | | |
|---|---|---|---|---|---|
| | T = 101.4° C. | T = 83.0° C. | T = 70.0° C. | T = 60.0° C. | T = 50.0° C. |
| 25200 | 0.11 | * | * | * | * |
| 22680 | 0.11 | 0.24 | * | * | * |
| 20160 | 0.11 | 0.23 | * | * | * |
| 17640 | 0.11 | 0.23 | * | * | * |
| 15120 | 0.11 | 0.24 | * | * | * |
| 12600 | 0.11 | 0.24 | * | * | * |
| 11340 | 0.11 | 0.25 | 0.49 | * | * |
| 10080 | 0.11 | 0.25 | 0.48 | * | * |
| 8820 | 0.11 | 0.25 | 0.48 | * | * |
| 7560 | 0.11 | 0.25 | 0.47 | * | * |
| 6300 | 0.10 | 0.25 | 0.46 | * | * |
| 5040 | 0.13 | 0.31 | 0.58 | * | * |
| 4536 | 0.13 | 0.31 | 0.57 | 1.20 | * |
| 4032 | 0.12 | 0.31 | 0.57 | 1.20 | * |
| 3528 | 0.12 | 0.32 | 0.57 | 1.21 | 1.50 |
| 3024 | 0.12 | 0.32 | 0.59 | 1.21 | 1.46 |
| 2016 | 0.18 | 0.41 | 0.85 | 1.49 | 1.96 |
| 1814 | 0.18 | 0.41 | 0.85 | 1.52 | 1.96 |
| 1613 | 0.19 | 0.43 | 0.87 | 1.56 | 1.96 |
| 1411 | 0.20 | 0.45 | 0.89 | 1.54 | 1.95 |
| 1209.9 | 0.20 | 0.45 | 0.95 | 1.52 | 1.99 |

*The viscosity is too high to be measurable by HAAKE viscometer.

TABLE VI

The viscosities of K188 blended with 6GT (Ratio 1:1:1 by weight).

| Shear Rate ($s^{-1}$) | Viscosity (Pa*s) | | | | | | |
|---|---|---|---|---|---|---|---|
| | T = 106.4° C. | T = 94.1° C. | T = 85.8° C. | T = 79.0° C. | T = 75.0° C. | T = 63.0° C. | T = 52.0° C. |
| 25200 | 0.08 | 0.14 | 0.20 | * | * | * | * |
| 22680 | 0.08 | 0.14 | 0.21 | * | * | * | * |
| 20160 | 0.09 | 0.15 | 0.21 | 0.28 | * | * | * |
| 17640 | 0.09 | 0.15 | 0.21 | 0.28 | * | * | * |
| 15120 | 0.09 | 0.15 | 0.21 | 0.28 | * | * | * |
| 12600 | 0.08 | 0.15 | 0.21 | 0.28 | * | * | * |
| 11340 | 0.07 | 0.15 | 0.21 | 0.28 | 0.48 | * | * |
| 10080 | 0.07 | 0.14 | 0.21 | 0.25 | 0.48 | * | * |
| 8820 | 0.07 | 0.14 | 0.21 | 0.24 | 0.49 | * | * |
| 7560 | 0.07 | 0.13 | 0.20 | 0.24 | 0.49 | * | * |
| 6300 | 0.06 | 0.13 | 0.19 | | 0.50 | * | * |
| 5040 | 0.11 | 0.17 | 0.25 | 0.34 | 0.57 | * | * |
| 4536 | 0.11 | 0.16 | 0.25 | 0.34 | 0.58 | 1.21 | * |
| 4032 | 0.10 | 0.16 | 0.25 | 0.35 | 0.58 | | * |
| 3528 | 0.10 | 0.16 | 0.26 | 0.36 | 0.60 | 1.20 | * |
| 3024 | 0.10 | 0.15 | 0.26 | 0.37 | 0.62 | 1.20 | * |
| 2016 | 0.15 | 0.21 | 0.32 | 0.47 | 0.82 | 1.40 | 1.74 |
| 1814 | 0.15 | 0.21 | 0.33 | 0.47 | 0.84 | 1.36 | 1.74 |
| 1613 | 0.15 | 0.21 | 0.35 | 0.50 | 0.85 | 1.32 | 1.85 |
| 1411 | 0.15 | 0.21 | 0.38 | 0.55 | 0.90 | 1.30 | 1.95 |
| 1209.9 | 0.14 | 0.22 | 0.38 | 0.59 | 0.95 | 1.19 | 1.94 |

*The viscosity is too high to be measurable by HAAKE viscometer.

As shown in Tables V and VI, rheological behavior of dispersions of 6 GT in K188 and in K188 and R747 is broadly similar to that of the dispersions of 10 GT discussed above. In this case the temperature range of greatest shear thinning behavior is lower (70° to 83° C.), and the viscosity in the approximately Newtonian temperature range (50° to 60° C.) is correspondingly higher. The trough in the viscosity-temperature curve was detected.

The various features of this invention which are believed new are set forth in the following claims.

We claim:

1. A method of providing a polymeric vehicle which is a dispersion with a viscosity which increases when the temperature of the polymeric vehicle is increased above about 25° C., the polymeric vehicle comprising oligomers having a number average molecular weight not greater than about 10,000, the method comprising dispersing with the oligomers at least one oligoester adduct having a number average molecular weight not greater than about 10,000 and selected from the group consisting of an amine salt of an oligoester of a general formula I, a mono-oxirane adduct of the oligoester of the general formula I, an amine salt of a carboxylated hydroxyl terminated oligoester of the general formula I, a mono-oxirane adduct of the carboxylated hydroxyl terminated oligoester of the general formula I and mixtures thereof to provide the polymeric vehicle, wherein the general formula I is

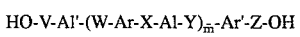

wherein

or a covalent bond;

Al'=$(CH_2)_m$ or a covalent bond;

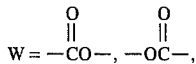

or a covalent bond;

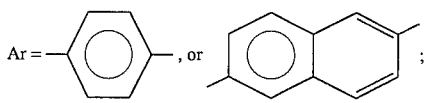

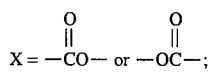

Al = (CH$_2$)$_n$;

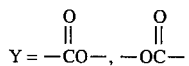

or a covalent bond,
but if

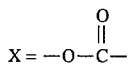

and if V=bond, and if Al'→bond,
and if W=bond and if Z=bond, then

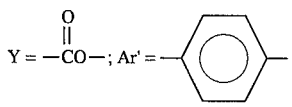

or a covalent bond; and

or a covalent bond
wherein $\overline{m}$=1 to 20, but when V=bond,
Al'=bond, W=bond and Z=bond, $\overline{m}$>2 n=2 to 20, and the polymeric vehicle comprising the oligoester adduct in an amount effective for the increase in the viscosity.

2. A method of providing a polymeric vehicle with a viscosity as recited in claim 1 wherein the oligoester adduct is selected from the group consisting of the mono-oxirane adduct of the oligoester of the general formula I, a mono-oxirane adduct of the carboxylated hydroxyl terminated oligoester of the general formula I, and mixtures thereof.

3. A method of providing a polymeric vehicle with a viscosity as recited in claim 2 wherein the mono-oxirane adduct is the oligoester of the general formula I or the carboxylated hydroxyl terminated oligoester of the general formula I covalently bonded with a mono-oxirane having not more than 25 carbon atoms.

4. A method of providing a polymeric vehicle with a viscosity as recited in claims 1 or 3, wherein the polymeric vehicle is a high solids, low VOC polymeric vehicle which is shear thinning, is substantially free of polymers having a number average molecular weight greater than about 10,000 and has a viscosity of not more than 5 Pa.s at a shear rate of at least about 3,000 sec.$^{-1}$ at a temperature in the range of from about 25° C. to about 100° C.

5. A method of providing a polymeric vehicle with a viscosity as recited in claim 4 wherein the polymeric vehicle comprises at least 30 weight percent of the oligoester adduct.

6. A method of providing a polymeric vehicle with a viscosity as recited in claim 5 wherein after the dispersion, the polymeric vehicle is substantially free of organic solvent and water.

7. A method of providing a polymeric vehicle with a viscosity as recited in claim 2 wherein the oligoester adduct is the mono-oxirane adduct of the carboxylated hydroxyl terminated oligoester of the general formula I, the hydroxyl terminated oligoester of the general formula I being reacted with a polycarboxylic acid or anhydride to provide a carboxylated oligoester of the general formula I, the carboxylated oligoester of the general formula I being reacted with a mono-oxirane to provide the mono-oxirane adduct of the carboxylated hydroxyl terminated oligoester of the general formula I.

8. A method of providing a polymeric vehicle with a viscosity as recited in claim 2 or 3 wherein the mono-oxirane adduct is a reaction product of a mono-oxirane which is selected from the group consisting of propylene oxide, ethylene oxide, butylene oxide, phenylglycidyl ether, butylglycidyl ether, styrene oxide, and glycidyl esters of monocarboxylic acids having six to 22 carbon atoms.

9. A method of providing a polymeric vehicle with a viscosity as recited in claim 2 or 7 wherein the mono-oxirane adduct is a reaction product of a mono-oxirane which has the general formula

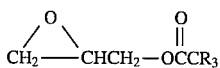

wherein R is an aliphatic group and the total number of carbon atoms in all three R groups is about 8 carbon atoms.

10. A method of providing a polymeric vehicle with a viscosity as recited in claim 1 wherein the oligoester adduct is selected from the group consisting of the amine salt of the general formula I, an amine salt of the carboxylated hydroxyl terminated oligoester of general formula I, and mixtures thereof.

11. A method of providing a polymeric vehicle with a viscosity as recited in claims 1, 2, or 10 wherein the oligoester adduct and a oligoester of the general formula I comprise the dispersion, the polyester of the general formula I being dispersed with the oligoester adduct to provide the dispersion.

12. A method of providing a polymeric vehicle with a viscosity as recited in claim 11 wherein the oligoester adduct is the product of a mono-oxirane being covalently bonded onto the oligoester of the general formula I or the carboxylated hydroxyl terminated oligoester of the general formula I, and wherein the mono-oxirane does not have more than 25 carbon atoms.

13. A method of providing a polymeric vehicle with a viscosity as recited in claim 12 wherein the mono-oxirane is selected from the group consisting of propylene oxide, ethylene oxide, butylene oxide, phenylglycidyl ether, butylglycidyl ether, styrene oxide, and glycidyl esters of monocarboxylic acids having six to 22 carbon atoms.

14. A method of providing a polymeric vehicle with a viscosity as recited in claim 13, wherein the polymeric vehicle is a high solids, low VOC polymeric vehicle which is shear thinning, is substantially free of polymers having a number of average molecular weight greater than about 10,000 and has a viscosity of not more than 5 Pa.s at a shear rate of at least about 3,000 sec.$^{-1}$ at a temperature in the range of from about 25° C. to about 100° C.

15. A method of providing a polymeric vehicle with a viscosity as recited in claim 12 wherein the mono-oxirane has the general formula

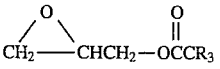

wherein R is an aliphatic group and the total number of carbon atoms in all three R groups is about 8 carbon atoms.

16. A method of providing a polymeric vehicle with a viscosity as recited in claim 12 wherein the amount of mono-oxirane covalently bonded onto the oligoester of general formula I or the carboxylated hydroxyl terminated oligoester of the general formula I is in the range of from about 0.2 to about 2.0 moles of mono-oxirane per mole of the oligoester of the general formula I or of the carboxylated oligoester of the general formula I.

17. A method of providing a polymeric vehicle with a viscosity as recited in claim 15 wherein the mono-oxirane is selected from the group consisting of propylene oxide, ethylene oxide, butylene oxide, phenylglycidyl ether, butylglycidyl ether, styrene oxide, and glycidyl esters of monocarboxylic acids having six to 22 carbon atoms.

18. A method of providing a polymeric vehicle with a viscosity as recited in claim 15 wherein the mono-oxirane has the general formula

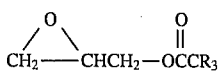

wherein R is an aliphatic group and the total number of carbon atoms in all three R groups is about 8 carbon atoms.

19. A method of providing a polymeric vehicle with a viscosity as recited in claim 12, wherein the polymeric vehicle is a high solids, low VOC polymeric vehicle which is shear thinning, is substantially free of polymers having a number average molecular weight greater than about 10,000 and has a viscosity of not more than 5 Pa.s at a shear rate of at least about 3,000 sec.$^{-1}$ at a temperature in the range of from about 25° C. to about 100° C.

20. A method of providing a polymeric vehicle with a viscosity as recited in claim 11 wherein the oligoester adduct is the mono-oxirane adduct of the carboxylated hydroxy terminated oligoester of the general formula I, the hydroxyl terminated oligoester of the general formula I being reacted with a polycarboxylic acid or anhydride to provide a carboxylated oligoester of the general formula I, the carboxylated oligoester of the general formula I being reacted with a mono-oxirane to provide the mono-oxirane adduct of the oligoester carboxylated hydroxyl terminated of the general formula I.

21. A method of providing a polymeric vehicle with a viscosity as recited in claim 11 wherein the oligoester adduct is a mono-oxirane adduct and the oligoester adduct and the oligoester of the general formula I are dispersed with an organic solvent, the amount of mono-oxirane adduct effective for making the mono-oxirane adduct and the oligoester of the general formula I dispersible in the organic solvent.

22. A method of providing a polymeric vehicle with a viscosity as recited in claim 11, wherein the polymeric vehicle is a high solids, low VOC polymeric vehicle which is shear thinning, is substantially free of polymers having a number average molecular weight greater than about 10,000 and has a viscosity of not more than 5 Pa.s at a shear rate of at least about 3,000 sec.$^{-1}$ at a temperature in the range of from about 25° C. to about 100° C.

23. A method of providing a polymeric vehicle with a viscosity as recited in claim 11, wherein the general formula I is

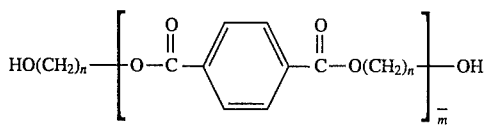

(n = 4–16  $\overline{m}$ = 2–5)

24. A method of providing a polymeric vehicle with a viscosity as recited in claim 11, wherein the general formula I is

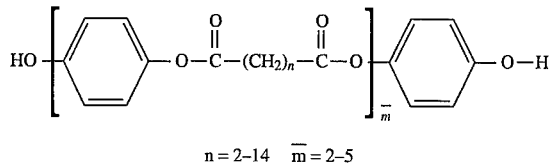

n = 2–14  $\overline{m}$ = 2–5

25. A method for providing a polymeric vehicle with a viscosity as recited in claim 11, wherein the general formula I is

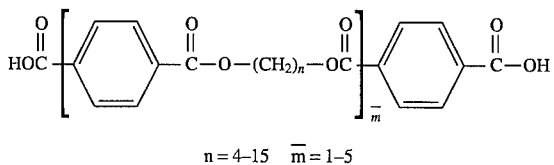

n = 4–15  $\overline{m}$ = 1–5

26. A method for providing a polymeric vehicle with a viscosity as recited in claim 11, wherein the general formula I is

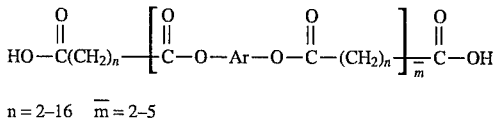

n = 2–16  $\overline{m}$ = 2–5

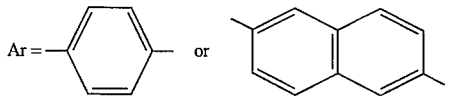

27. A method of providing a polymeric vehicle with a viscosity as recited in claims 1, 2 or 10 wherein the general formula I is

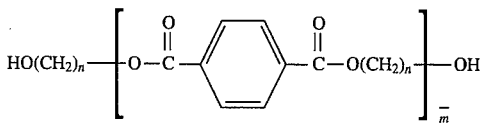

(n = 4–16  $\overline{m}$ = 2–5).

28. A method of providing a polymeric vehicle with a viscosity as recited in claim 27, wherein the oligoester adduct is an amine salt and the oligoester of the general formula I is a hydroxyl terminated oligoester of the general formula I, the hydroxyl terminated oligoester of general formula I being reacted with a polycarboxylic acid or anhydride to provide a carboxylated oligoester, the carboxylated oligoester being reacted with an amine to provide the amine salt.

29. A method of providing a polymeric vehicle with a viscosity as recited in claim 27, wherein the oligoester adduct is the carboxylated hydroxyl terminal oligoester of the general formula I, the hydroxyl terminated oligoester of the general formula I being reacted with a polycarboxylic acid or anhydride to provide a carboxylated oligoester of the general formula I, the carboxylated oligoester of the general formula I being reacted with a mono-oxirane to provide the mono-oxirane adduct.

30. A method of providing a polymeric vehicle with a viscosity as recited in claims 1, 2 or 10 wherein the general formula I is

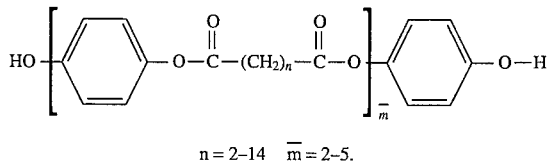

$n = 2-14 \quad \overline{m} = 2-5.$

31. A method of providing a polymeric vehicle with a viscosity as recited in claim 30, wherein the oligoester adduct is an amine salt and the oligoester of the general formula I is a hydroxyl terminated oligoester of the general formula I, the hydroxyl terminated oligoester being reacted with a polycarboxylic acid or anhydride to provide a carboxylated oligoester, the carboxylated oligoester being reacted with an amine to provide the amine salt.

32. A method of providing a polymeric vehicle with a viscosity as recited in claim 30, wherein the oligoester adduct is the carboxylated hydroxyl terminated oligoester of the general formula I, the hydroxyl terminated oligoester of the general formula I being reacted with a polycarboxylic acid or anhydride to provide a carboxylated oligoester of the general formula I, the carboxylated oligoester of general formula I being reacted with a mono-oxirane to provide the mono-oxirane adduct.

33. A method of providing a polymeric vehicle with a viscosity as recited in claim 10, wherein the oligoester adduct is an amine salt and the oligoester of the general formula I is a hydroxyl terminated oligoester, the hydroxyl terminated oligoester of the general formula I being reacted with a polycarboxylic acid or anhydride to provide a carboxylated oligoester, the carboxylated oligoester being reacted with an amine to provide the amine salt.

34. A method for providing a polymeric vehicle with a viscosity as recited in claims 1, 2 or 10, wherein the general formula I is

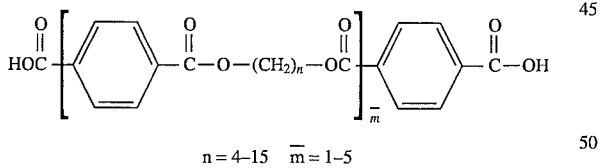

$n = 4-15 \quad \overline{m} = 1-5$

35. A method for providing a polymeric vehicle with a viscosity as recited in claims 1, 2 or 10, wherein the general formula I is

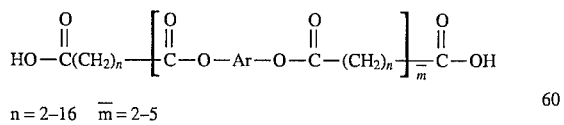

$n = 2-16 \quad \overline{m} = 2-5$

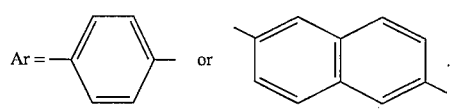

36. A method of providing a polymeric vehicle which is a dispersion with a viscosity which increases when the temperature of the polymeric vehicle is increased above about 25° C., the polymeric vehicle comprising oligomers having a number average molecular weight not greater than about 10,000, the method comprising dispersing with the oligomers at least one oligoester adduct having a number average molecular weight not greater than about 10,000 and selected from the group consisting of an amine salt of a general formula I, a mono-oxirane adduct of the oligoester of the general formula I, an amine salt of a carboxylated hydroxyl terminated oligoester of the general formula I, a mono-oxirane adduct of the carboxylated hydroxyl terminated oligoester of the general formula I and mixtures thereof to provide the polymeric vehicle, wherein the general formula I is HO-V-Al'-(W-Ar-X-Al-Y)$_{\overline{m}}$-Ar'-Z-OH wherein

or a covalent bond;

Al'=(CH$_2$)$_n$ or a covalent bond;

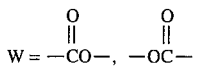

or a covalent bond;

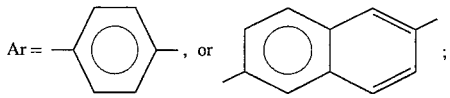

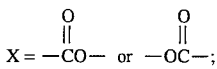

Al=(CH$_2$)$_m$;

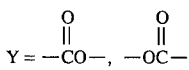

or a covalent bond,
but if

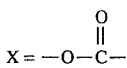

an if V=bond, and if Al'=bond,
and if W=bond and if Z=bond, then

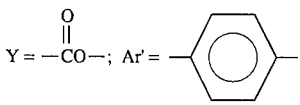

or a covalent bond; and

or a covalent bond wherein $\overline{m}=1$ to 20, but when V=bond, Al'=bond, W=bond and Z=bond, $\overline{m}>2$ n=2 to 20; and the polymeric vehicle comprising at least 30 weight percent of the oligoester adduct and in an amount effective for the increase in the viscosity and wherein the polymeric vehicle is a high solids, low VOC polymeric vehicle which is shear thinning, is substantially free of polymers having a number average molecular weight greater than about 10,000 and has a viscosity of not more than 5 Pa.s at a shear rate of at least about 3,000 sec.$^{-1}$ at a temperature in the range of from about 25° C. to about 100° C.

37. A method of providing a polymeric vehicle with a viscosity as recited in claim 36, wherein a mono-oxirane is covalently bonded onto the oligoester of the general formula I or the carboxylated hydroxyl terminated oligoester of the general formula I and wherein the mono-oxirane does not have more than 25 carbon atoms.

* * * * *

UNITED STATES PATENT AND TRADEMARK OFFICE
CERTIFICATE OF CORRECTION

PATENT NO. : 5,543,475
DATED : August 6, 1996
INVENTOR(S) : Jones et al.

It is certified that error appears in the above-indentified patent and that said Letters Patent is hereby corrected as shown below:

Column 81, line 10, change "claim 15" to --claim 16--.
Column 81, line 16, change "claim 15" to --claim 16--.

Signed and Sealed this

Twenty-fourth Day of December, 1996

Attest:

BRUCE LEHMAN

*Attesting Officer*    *Commissioner of Patents and Trademarks*